US007881957B1

(12) United States Patent
Cohen et al.

(10) Patent No.: US 7,881,957 B1
(45) Date of Patent: Feb. 1, 2011

(54) IDENTIFYING TASKS FOR TASK PERFORMERS BASED ON TASK SUBSCRIPTIONS

(75) Inventors: Peter D. Cohen, Seattle, WA (US); John B. Bravenec, Seattle, WA (US); Adam D. Bradley, Seattle, WA (US); Jessica C. Locke, Renton, WA (US)

(73) Assignee: Amazon Technologies, Inc., Reno, NV (US)

( * ) Notice: Subject to any disclaimer, the term of this patent is extended or adjusted under 35 U.S.C. 154(b) by 1160 days.

(21) Appl. No.: 11/537,508

(22) Filed: Sep. 29, 2006

Related U.S. Application Data

(63) Continuation-in-part of application No. 10/990,949, filed on Nov. 16, 2004.

(51) Int. Cl.
*G06F 9/46* (2006.01)
(52) U.S. Cl. .................. 705/9; 705/7; 705/11
(58) Field of Classification Search .......... 705/7, 705/9, 11
See application file for complete search history.

(56) References Cited

U.S. PATENT DOCUMENTS

| | | | |
|---|---|---|---|
| 5,455,875 A | 10/1995 | Chevion et al. | 382/311 |
| 5,465,308 A | 11/1995 | Hutcheson et al. | 382/159 |
| 5,805,745 A | 9/1998 | Graf | 382/291 |
| 5,826,244 A | 10/1998 | Huberman | 705/37 |
| 5,848,393 A | 12/1998 | Goodridge et al. | 705/8 |
| 5,862,223 A | 1/1999 | Walker et al. | 380/25 |
| 5,937,388 A | 8/1999 | Davis et al. | 705/8 |
| 6,012,066 A | 1/2000 | Discount et al. | 707/103 |
| 6,032,151 A | 2/2000 | Arnold et al. | 707/103 |
| 6,041,306 A | 3/2000 | Du et al. | 705/8 |
| 6,044,355 A | 3/2000 | Crockett et al. | 705/8 |
| 6,078,916 A | 6/2000 | Culliss | 707/5 |
| 6,128,380 A | 10/2000 | Shaffer et al. | 379/265 |
| 6,163,607 A | 12/2000 | Bogart et al. | 379/266 |
| 6,173,053 B1 | 1/2001 | Bogart et al. | 379/266 |
| 6,181,343 B1 | 1/2001 | Lyons | 345/358 |
| 6,182,068 B1 | 1/2001 | Culliss | 707/5 |
| 6,223,165 B1 | 4/2001 | Lauffer | 705/8 |

(Continued)

OTHER PUBLICATIONS

U.S. Appl. No. 10/990,771, filed Nov. 16, 2004, Mortensen et al.

(Continued)

*Primary Examiner*—Romain Jeanty
(74) *Attorney, Agent, or Firm*—Seed IP Law Group PLLC

(57) ABSTRACT

Techniques are described for facilitating interactions between task requesters who have tasks that are available to be performed and task performers who are available to perform tasks, such as by an intermediary electronic marketplace or other task fulfillment facilitator system. In some situations, task performer users and/or other users may create task subscriptions for use in automatically identifying tasks of interest to the users about which the users desire to receive notification. The users may be notified of the identified tasks in various ways, such as by sending electronic messages of various types to the users that include indications of the tasks identified for those users based on their subscriptions. Tasks of interest may be identified in various ways, such as based on task attributes of interest specified for a subscription that are later matched against tasks that are available at the time of the matching.

59 Claims, 33 Drawing Sheets

U.S. PATENT DOCUMENTS

| | | | |
|---|---|---|---|
| 6,393,497 B1 | 5/2002 | Arnold et al. | 709/330 |
| 6,539,377 B1 | 3/2003 | Culliss | 707/5 |
| 6,546,087 B2 | 4/2003 | Shaffer et al. | 379/90.01 |
| 6,584,192 B1 | 6/2003 | Agusta | 379/265.12 |
| 6,584,464 B1 | 6/2003 | Warthen | 707/4 |
| 6,587,556 B1 | 7/2003 | Judkins et al. | 379/219 |
| 6,603,854 B1 | 8/2003 | Judkins et al. | 379/265.06 |
| 6,636,590 B1 | 10/2003 | Jacob et al. | 379/114.05 |
| 6,704,403 B2 | 3/2004 | Lurie et al. | 379/114.1 |
| 6,707,904 B1 | 3/2004 | Judkins et al. | 379/265.06 |
| 6,763,104 B1 | 7/2004 | Judkins et al. | 379/265 |
| 6,859,523 B1 | 2/2005 | Jilk et al. | 379/32.01 |
| 6,938,048 B1 | 8/2005 | Jilk et al. | 707/102 |
| 7,062,449 B1 * | 6/2006 | Clark | 705/9 |
| 7,155,400 B1 | 12/2006 | Jilk et al. | 705/9 |
| 7,197,459 B1 | 3/2007 | Harinarayan et al. | 704/270.1 |
| 2002/0052773 A1* | 5/2002 | Kraemer et al. | 705/9 |
| 2002/0069079 A1 | 6/2002 | Vega | 705/1 |
| 2002/0083079 A1 | 6/2002 | Meier et al. | 707/104.1 |
| 2003/0078852 A1 | 4/2003 | Shoen et al. | 705/26 |
| 2003/0200156 A1 | 10/2003 | Roseman et al. | 705/27 |
| 2003/0204449 A1 | 10/2003 | Kotas et al. | 705/27 |

OTHER PUBLICATIONS

U.S. Appl. No. 10/990,951, filed Nov. 16, 2004, Cohen et al.

U.S. Appl. No. 10/991,339, filed Nov. 16, 2004, Cohen et al.

"About Spending," retrieved Nov. 23, 2004, from http://www.mypoints.com/mp/dstatial.show?isref=nmhp.popup.aboutspending.default, 1 page.

"Earning Points with MyPoints," retrieved Nov. 23, 2004, from http://www.mypoints.com/mp/dstatial.show?isref=nmhp.popup.aboutearning.default, 1 page.

"FAQs," retrieved Nov. 23, 2004, from http://www.mypoints.com/mp/dstatial.show?isref=nmhp.popup.faq.default, 1 page.

"Frequently Asked Questions about the Open Mind Initiative," retrieved Nov. 16, 2004, from http://www.openmind.org/FAQs.html, 3 pages.

"Frequently Asked Questions," TrueDater FAQ's, retrieved Apr. 4, 2005, from http://www.truedater.com/index.php?action=faqs, 2 pages.

"Grid—The Competitive Advantage," Aug. 2004, retrieved Jun. 9, 2005, from http://www.sun.com/solutions/documents/articles/grid_adv_aa.xml?null, 2 pages.

"Join MyPoints Now," retrieved Nov. 23, 2004, from http://www.mypoints.com/?MCK=ccb67d8c41a3819b, 4 pages.

"Payment-On-Line (AOL, Compuserve, Internet, etc)," Oct. 20, 1994, retrieved Dec. 6, 2004, from http://groups-beta.google.com/group/misc.entrepreneurs/browse_thread/thread/80fcf110252bb3f7/fflc8, 3 pages.

"The ESP Game," retrieved Jun. 8, 2005, from http://www.espgame.org, 1 page.

"What is BonusMail®?," retrieved Nov. 23, 2004, from http://www.mypoints.com/mp/dstatial.show?isref=nmhp.popup.bonusmail.default, 1 page.

"What is Keen," retrieved Jun. 8, 2005, from http://www.keen.com/documents/homepage/wik_pop.asp?TID=gbFQnFLPstnUuFonMtBmHw, 1 page.

"What is MyPoints," retrieved Nov. 23, 2004, from http://www.mypoints.com/mp/dstatial.show?isref=nmhp.popup.whatis.default, 1 page.

About, Inc., "Intelligent Agents," retrieved Jun. 9, 2005, from http://psychology.about.com./od/intelligentagents/, 5 pages.

About, Inc., "Our Story," retrieved Jun. 9, 2005, from http://ourstory.about.com/, 2 pages.

About, Inc., Welcome to About.com, retrieved Jun. 9, 2005, from http://www.about.com, 2 pages.

Applied Skills & Knowledge, LLC, "Make Skills-Based Routing Happen," Jun. 3, 2003, retrieved from http://www.appliedskills.com/whitepapers/files/Skills-basedRouting.pdf, 3 pages.

Barlas, D., "Hipbone Connects to Kana," Jan. 5, 2004, retrieved Jun. 8, 2005, from http://www.line56.com/print/default.asp?ArticleID=5255, 1 page.

Calishain, T., "Yahoo! Service Offers More Advice than Expertise," May 6, 2002, retrieved Jul. 16, 2004, from http://www.infotoday.com/newsbreaks/nb020506-1.htm, 2 pages.

distributed.net, "distributed.net History & Timeline," retrieved Jun. 8, 2005, from http://www.distributed.net/history.php, 7 pages.

distributed.net, "The Organization," retrieved Jun. 8, 2005, from http://www.distributed.net/, 2 pages.

Doan, A., "MongoMusic Fans Include Microsoft," Sep. 9, 2000, Forbes.com, retrieved Jun. 9, 2005, from http://www.forbes.com/2000/09/09/feat2.html, 3 pages.

DuBaud, S., "Advice Site Resort to Legal Counsel," Jan. 4, 2002, retrieved Apr. 29, 2004, from http://news.com.com/2011-1088-801359.html, 3 pages.

Elance Inc., Elance *Online*™ —Everyday Outsourcing™, retrieved Jun. 9, 2005, from http://www.elance.com/c/static/main/displayhtml.pl?file=eol.html&module=home, 2 pages.

Elance, Inc., "Elance History," retrieved Jun. 8, 2005, from http://www.elance.com/c/static/main/displayhtml.pl?file=heritage.html, 3 pages.

eLancer homepage, retrieved Jun. 8, 2005, from http://www.elancer.us/, 2 pages.

Epinions, Inc., Epinions.com homepage, retrieved Jun. 9, 2005, from http://www.epinions.com, 2 pages.

Fox, S., "Can New Technology Revolutionize the Net?," Jun. 1, 2000, CNET.com, retrieved Jun. 8, 2005, from http://web.archive.org/web/20001018221958/www.cnet.com/insider/0-121949-7-1995365.html, pp. 1-3, 3 pages.

Get a Freelancer.com homepage, retrieved Jun. 8, 2005, from http://www.getafreelancer.com, 3 pages.

gonesilent.com homepage, Aug. 22, 2000, retrieved Jun. 8, 2005, from http://web.archive.org/web/20000822122731/www.gonesilent.com/about.html, 2 pages.

Google—Answers, "Ask a question, Set your Price. Get your Answer.," retrieved Jun. 9, 2005, from http://answers.google.com/answers/, 1 page.

Google, "Your Computer's Idle Time is too Precious to Waste," retrieved Jun. 9, 2005, from http://toolbar.google.com/dc/offerdc.html, 1 page.

Gunn, S., "Hey, buddy, can you spare some cycles?," Sep. 24, 1997, retrieved Jun. 8, 2005, from http://www.cnn.com/TECH/9709/24/netly.news/, 4 pages.

Hagel, J. et al., "Go Slowly with Web Services," Feb. 15, 2002, CIO.com retrieved from http://www.cio.com/archive/021502/keynote.html, 4 pages.

Hagel, J., et al., "Your Next IT Strategy," *Harvard Business Review RI109G*:105-113, Oct. 2001, 11 pages.

Hagel, J., *Out of the Box—Strategies for Achieving Profits today and Growth Through Web Services*, Harvard Business School Publishing, Boston, Massachusetts, 2002, Front Cover through Acknowledgements, Chapter 1, "Responding to Unmet Needs," and Chapter 2, "Web Services Create New Options," pp. i-xix and 1-42, 62 pages.

Ingenio, Inc., Ingenio™ homepage, retrieved Jun. 8, 2005, from http://www.ingenio.com/default.asp?TF=1, 2 pages.

Ingenio, Inc., Introducing Ingenio™ Pay Per Call™, retrieved Jun. 8, 2005, from http://www.ingenio.com/documents/corp/home.asp, 2 pages.

Ingenio, Inc., KEEN—Your Personal Advisor, retrieved Jun. 8, 2005, from http://www.keen.com, 2 pages.

Ingenio, Inc., KEEN—Your Personal Advisor/Get Advice, retrieved Jun. 8, 2005, from http://www.keen.com/categories/get_answers.asp?SRCHT=0&search=&gid=0, 1 page.

Jupitermedia Corporation, "About jGuru.com: Overview," retrieved Jun. 9, 2005, from http://www.jguru.com/misc/about-overview.jsp, 2 pages.

Jupitermedia Corportion, jGuru homepage, retrieved Jun. 9, 2005, from http://www.jguru.com, 5 pages.

KANA Inc., "Corporate Overview," retrieved Jun. 8, 2005, from http://www.kana.com/about/about.aspx, 2 pages.

Katz, J., et al., "The Benefits of a Virtual Contact Center," MCI, Inc., May 2004, retrieved from http://global.mci.com/us/enterprise/insight/whitepapers/pdf/VirtualContactCtr.pdf, 7 pages.

Kenexa, "Call Centers," retrieved Jun. 8, 2005, from http://www.kenexa.com/ind_callcent.html, 3 pages.

Lynn, R., "Keeping Online Daters Honest," Apr. 1, 2005, retrieved on Apr. 4, 2005, from http://www.wired.com/news/print/0,1294,67083,00.html, 3 pages.

Massive Multiplayer Online Role-Playing Game—homepage, retrieved Jun. 8, 2005, from http://www.mpog.com, 2 pages.

Microsoft Corporation, "Microsoft Acquires MongoMusic," Sep. 13, 2000, retrieved Jun. 9, 2005, from http://www.microsoft.com/presspass/press/2000/sept00/mongopr.mspx, 2 pages.

Mori, G., et al., "Breaking a Visual CAPTCHA," retrieved Jun. 8, 2005, from http://www.cs.berkeley.edu/~mori/gimpy/gimpy.html, 4 pages.

Mossberg, W., "GuruNet as a Reference Tool Goes Beyond Search Engines," Mar. 6, 2003, retrieved Jul. 20, 2004, from http://ptech.wsj.com/archive/ptech-20030306.html, 3 pages.

Multiplayer Online Games Directory—homepage, retrieved Jun. 8, 2005, from http://www.mpogd.com, 1 page.

Nortel Networks, "Beyond ACD- The advantages of Skill-based Routing in Today's Contact Centers," Mar. 7, 2003, retrieved from http://www.nortelnetworks.com/solutions/ccvp/collateral/nn103640-030703.pdf, 12 pages.

Online Multiplayer Games Network—homepage, retrieved Jun. 8, 2005, from http://www.omgn.com, 2 pages.

Project Gutenberg's Distributed Proofreaders—homepage, retrieved Jun. 9, 2005 from http://www.pgdp.net/c/default.php, 4 pages.

Rhodes, B., "The Wearable Remembrance Agent: A System for Augmented Memory," Appeared in *Personal Technologies Journal Special Issue on Wearable Computing I*:218-224, 1997, retrieved Jun. 9, 2005, from http://www.bradleyrhodes.com/Papers/wear-ra-personaltech/, 10 pages.

SERENA Software, Inc., "Serena™ Automating Change," retrieved Jun. 9, 2005, from http://www.serena.com, 1 page.

SETI Institute homepage, retrieved Jun. 9, 2005, from http://www.seti.org/site/pp.asp?c=ktJ2J9MMIsE&b=178025, 3 pages.

Siebel Systems, Inc., Siebel homepage, retrieved Jun. 8, 2005, from http://www.siebel.com/, 3 pages.

Singh, P., "Open Mind: common sense—Teaching computers the stuff we all know," retrieved Jun. 9, 2005, from http://commonsense.media.mit.edu/cgi-bin/search.cgi, 2 pages.

Singh, P., "The Open Mind Common Sense Project," Jan. 2, 2002, retrieved Jun. 9, 2005, from http://www.kurzweilai.net/articles/art0371.html, pp. 1-24, 24 pages.

Spice, B., "CMU Student Taps Brain's Game Skills," Oct. 5, 2003, retrieved Jun. 8, 2005, from http://www.post-gazette.com/pg/03278/228349.stm, 5 pages.

Spogg.com—homepage, retrieved Jun. 8, 2005, from http://www.spogg.com, 2 pages.

Sun Microsystems, Inc., "Products & Technologies—Java Technology," retrieved Jun. 9, 2005, from http://java.sun.com, 2 pages.

Sun Microsystems, Inc., "The Jini Technology Series: JavaSpaces Principles, Patterns, and Practice," retrieved Jun. 9, 2005, from http://java.sun.com/docs/books/jini/javaspaces/, 2 pages.

TopCoder, Inc., Topcoder homepage, retrieved Jun. 8, 2005, from http://www.topcoder.com/, 2 pages.

University of California, "What is SETI@home?," retrieved Jun. 9, 2005, from http://setiathome.ssl.berkeley.edu./, 1 page.

Wilson, B. "Anti-Social Software,"Apr. 30, 2004, retrieved Aug. 26, 2005, from http://www.brendonwilson.com/profile/000156.shtml, 5 pages.

Wolverton, T., et al., "Yahoo Launches Advice Site," Apr. 29, 2002, CNET News.com, retrieved Apr. 29, 2004, from http://news.com.com/2102-1017_3-894968.html?tag+st.util.print, 2 pages.

* cited by examiner

Example Task Submission

```xml
<CreateTask>
    <ParticipantId>BarnabyPhoto</ParticipantId>
    <Operation>
        <TaskType>
            <Name>ImageChoice</Name>
            <Description>
                <Verbal>Select which of 4 photographs best shows a business
                            location </Verbal>
                <Compensation>
                    <CurrencyCode>USD</CurrencyCode>
                    <Amount>0.06</Amount>
                </Compensation>
                <TimeEstimate>30</TimeEstimate>
            </Description>
            <ProviderApplication> http://imagematch.abcde.com/
                </ProviderApplication>
            <ProviderCriteria>
                <AllowedProviders/>
                <DisallowedProviders>
                    <Provider>PoorProvider1</Provider>
                </DisallowedProviders/>
                <ProviderQualifications/>
            </ProviderCriteria>
            <StateTimeouts>
                <Open>172800</Open>
                <Locked>60</Locked>
            </StateTimeouts>
        </TaskType>
        <Request>
            <ImageSubject>
                <ItemID>B0000F5R9P</ItemID>
                <Name>Wildboar Tavern</Name>
                <Address>
                    <Street>1200 Main Street</Street>
                    <City>Seattle</City> <State>WA</State> <Zip>98118</Zip>
                </Address>
            </ ImageSubject>
            <Images>
                <Image> http://image.abcde.com/biz_images/10913487 </Image>
                <Image> http://image.abcde.com/biz_images/10913488 </Image>
                <Image> http://image.abcde.com/biz_images/10913489 </Image>
                <Image> http://image.abcde.com/biz_images/10913490 </Image>
            </Images>
        </Request>
    </Operation>
</CreateTask>
```

*FIG. 2A*

Example Task Request Status Query

```
   <TaskSearch>
      <ParticipantId>BarnabyPhoto</ParticipantId>
      <Operation>
3        <SearchFields>
            <Requester>BarnabyPhoto</Requester>
            <State>Completed</State>
6           <TaskType>
               <Name>ImageChoice</Name>
            </TaskType>
9        </SearchFields>
      </Operation>
12   </TaskSearch>
```

FIG. 2B

Example Task Performance Response

```
<TaskSearchResponse>
   <Task>
3     <TaskId>109234875</TaskId>
      <Requester>BarnabyPhoto</Requester>
      <Provider>BestManBryan</Provider>
6     <State>Completed</State>
      <ResponseData>
         <ItemID>B0000F5R9P</ItemID>
9        <Image> http://image.abcde.com/biz_images/10913490 </Image>
      </ResponseData>
   </Task>
12 </TaskSearchResponse>
```

FIG. 2C

Example Task Completion Notification

```
<CloseTask>
    <ParticipantId>BarnabyPhoto</ParticipantId>
    <Operation> <TaskId>10923487S</TaskId>  </Operation>
</CloseTask>
```

FIG. 2D

Example Available Task Query

```
<TaskGroupSearch>
    <Operation>
        <SearchFields> <State>Open</State>  </SearchFields>
        <RankBy>NumTasks</RankBy>
    </Operation>
</TaskSearch>
```

FIG. 2E

Example Available Task Response

```
  <TaskTypeSearchResponse>
    <TaskGroups>
3     <TaskGroup>
        <TaskType> <Name>ImageChoice</Name>  </TaskType>
        <NumTasks>400</NumTasks>
6     </TaskGroup>
      <TaskGroup>
        <TaskType> <Name>French-EnglishTranslation</Name>  </TaskType>
9       <NumTasks>80</NumTasks>
      </TaskGroup>
    </TaskGroups>
12 </TaskTypeSearchResponse>
```

FIG. 2F

Example Available Task Performance Request

```
  <LockingTaskSearch>
    <ParticipantId>BestManBryan</ParticipantId>
3   <Operation>
      <NumToLock>1</NumToLock>
      <SearchFields>
6       <TaskType> <Name>ImageChoice</Name>  </TaskType>
        <State>Open</State>
      </SearchFields>
9     <RankBy>CreateDate</RankBy>
    </Operation>
  </LockingTaskSearch>
```

FIG. 2G

Example Task

```xml
<?xml version="1.0" encoding="UTF-8" ?>
- <Question ="multi-choice">
    <Title>A sample multi-choice Task</Title>
    <Text>Which image best shows the XYZ Bank?</Text>
    - <Choices presentation="radio">
        - <Choice>
            <Media type="image/jpeg"
                width="250">imgs/00002405.jpg</Media>
            <Label>Image1</Label>
            <Text />
        </Choice>
        - <Choice>
            <Media type="image/jpeg"
                width="250">imgs/00002438.jpg</Media>
            <Label>Image2</Label>
            <Text />
        </Choice>
        - <Choice>
            <Media type="image/jpeg"
                width="250">imgs/00002458.jpg</Media>
            <Label>Image3</Label>
            <Text />
        </Choice>
        - <Choice>
            <Media type="image/jpeg"
                width="250">imgs/00003319.jpg</Media>
            <Label>Image4</Label>
            <Text />
        </Choice>
        - <Choice>
            <Media type="image/jpeg"
                width="250">imgs/00003354.jpg</Media>
            <Label>Image5</Label>
            <Text />
        </Choice>
    </Choices>
</Question>
```

*FIG. 12A*

Example Task Validation Processing Information

```
    <?xml version="1.0" encoding="UTF-8"?>
    <xs:schema xmlns:xs="http://www.w3.org/2001/XMLSchema"
       xmlns:tns="http://xml.abcd.com/tasktype/multichoice"
       targetNamespace="http://xml.abcd.com/tasktype/multichoice"
 5     elementFormDefault="qualified">
       <xs:complexType name="MediaType">
          <xs:simpleContent> <xs:extension base="xs:anyURI">
             <xs:attribute name="type" type="xs:string" use="required"/>
             <xs:attribute name="height" type="xs:positiveInteger" use="optional"/>
10           <xs:attribute name="width" type="xs:positiveInteger" use="optional"/>
          </xs:extension> </xs:simpleContent>    </xs:complexType>
       <xs:complexType name="ChoiceType">
          <xs:sequence>
             <xs:element name="Media" type="tns:MediaType"/>
15           <xs:element name="Label" type="xs:Name"/>
             <xs:element name="Text" type="xs:string" minOccurs="0"/>
          </xs:sequence>   </xs:complexType>
       <xs:simpleType name="PresentationAttr">
          <xs:restriction base="xs:string">
20           <xs:enumeration value="dropdown"/> <xs:enumeration value="radio"/>
             <xs:enumeration value="checkbox"/>
          </xs:restriction>   </xs:simpleType>
       <xs:complexType name="ChoicesType">
          <xs:sequence>
25           <xs:element name="Choice" type="tns:ChoiceType" maxOccurs="unbounded"/>
          </xs:sequence>
          <xs:attribute name="presentation" type="tns:PresentationAttr" default="radio"/>
          <xs:attribute name="default" type="xs:Name" use="optional"/>
       </xs:complexType>
30     <xs:element name="Question">
          <xs:complexType>   <xs:sequence>
             <xs:element name="Title" type="xs:string"/>
             <xs:element name="Text" type="xs:string"/>
             <xs:element name="Choices" type="tns:ChoicesType"/>
35        </xs:sequence> </xs:complexType> </xs:element>
       <xs:element name="Answer">
          <xs:complexType> <xs:sequence>
             <xs:element name="Label" type="xs:Name" maxOccurs="unbounded" minOccurs="0"/>
          </xs:sequence> </xs:complexType> </xs:element>
40  </xs:schema>
```

FIG. 12B

Example Task Information Manipulation Processing Information

```
<?xml version="1.0" encoding="UTF-8" ?>
- <xsl:stylesheet xmlns:xsl="http://www.w3.org/1999/XSL/Transform"
    version="1.0">
    <xsl:output method="html" />
    <xsl:param name="postAction" />
    <xsl:param name="assignmentId" />
  - <xsl:template match="/Question">
    - <html>
      - <head>
        - <title>
            <xsl:value-of select="Title" />
          </title>
        </head>
      - <body>
        - <h1>
            <xsl:value-of select="Title" />
          </h1>
        - <p>
            <xsl:value-of select="Text" />
          </p>
          <xsl:apply-templates select="Choices" />
        </body>
      </html>
    </xsl:template>
  - <xsl:template match="Choices">
    - <xsl:choose>
      - <xsl:when test="@presentation='radio'">
        - <form action="{$postAction}" method="post">
            <input type="hidden" name="id"
              value="{$assignmentId}" />
          - <table>
            - <tr>
                <th>Choice</th>
                <th>Subject</th>
              </tr>
            - <xsl:for-each select="Choice">
              - <tr>
                - <td>
                  - <input>
                    - <xsl:attribute name="type">
```

*FIG. 12C*

Example Task Information Manipulation Processing Information (continued)

```xml
                        <xsl:text>radio</xsl:text
                            >
                        </xsl:attribute>
                        - <xsl:attribute
                            name="name">

<xsl:text>choice</x
                                sl:text>
                            </xsl:attribute>
                        - <xsl:attribute
                            name="value">
                            <xsl:value-of
                                select="Label" />
                            </xsl:attribute>
                        </input>
                    </td>
                  - <td>
                        <xsl:apply-templates select="."
                            />
                    </td>
                </tr>
              </xsl:for-each>
            - <tr>
                - <td>
                    <input type="submit" />
                </td>
              </tr>
          </table>
        </form>
      </xsl:when>
    - <xsl:when test="@presentation='dropdown'">
      - <form action="{$postAction}" method="post">
          <input type="hidden" name="id"
              value="{$assignmentId}" />
        - <table>
          - <tr>
            - <td>
              - <select name="choice">
                - <xsl:for-each select="Choice">
                  - <option>
                    - <xsl:attribute
                          name="Label">
                          <xsl:value-of
                              select="Text" />
                      </xsl:attribute>
```

FIG. 12D

*Example Task Information Manipulation Processing Information (continued)*

```xml
        - <xsl:attribute
              name="value">
            <xsl:value-of
              select="Label"
              />
          </xsl:attribute>
        </option>
      </xsl:for-each>
     </select>
    </td>
    - <xsl:for-each select="Choice">
      - <td>
          <xsl:apply-templates select="."
            />
        </td>
      </xsl:for-each>
    </tr>
   </table>
  </form>
 </xsl:when>
 - <xsl:when test="@presentation='checkbox'">
   - <form action="{$postAction}" method="post">
       <input type="hidden" name="id"
         value="{$assignmentId}" />
     - <table>
       - <tr>
           <th>Choice</th>
           <th>Subject</th>
         </tr>
       - <xsl:for-each select="Choice">
         - <tr>
           - <td>
             - <input>
               - <xsl:attribute name="type">
                   <xsl:text>checkbox
                   </xsl:text>
                 </xsl:attribute>
               - <xsl:attribute
                   name="name">
                   <xsl:text>choice</x
sl:text>
                 </xsl:attribute>
```

FIG. 12E

Example Task Information Manipulation Processing Information *(continued)*

```
                    - <xsl:attribute
                         name="value">
                         <xsl:value-of
                             select="Label" />
                      </xsl:attribute>
                    </Input>
                  </td>
                - <td>
                    <xsl:apply-templates select="."
                        />
                  </td>
                </tr>
              </xsl:for-each>
            </table>
          </form>
        </xsl:when>
      </xsl:choose>
    </xsl:template>
  - <xsl:template match="Choice">
      <xsl:apply-templates select="Media" />
    - <xsl:if test="Text">
        <br />
        <xsl:value-of select="Text" />
      </xsl:if>
    </xsl:template>
  - <xsl:template match="Media">
    - <xsl:choose>
      - <xsl:when test="substring-before(@type, '/')='image'">
        - <img>
          - <xsl:attribute name="src">
              <xsl:value-of select="." />
            </xsl:attribute>
          - <xsl:if test="@height">
            - <xsl:attribute name="height">
                <xsl:value-of select="@height" />
              </xsl:attribute>
            </xsl:if>
          - <xsl:if test="@width">
            - <xsl:attribute name="width">
                <xsl:value-of select="@width" />
              </xsl:attribute>
            </xsl:if>
          </img>
        </xsl:when>
```

*FIG. 12F*

Example Task Information Manipulation Processing Information *(continued)*

```xml
        - <xsl:otherwise>
            - <object>
                - <xsl:attribute name="data">
                    <xsl:value-of select="." />
                </xsl:attribute>
                - <xsl:attribute name="type">
                    <xsl:value-of select="@type" />
                </xsl:attribute>
                - <xsl:if test="@height">
                    - <xsl:attribute name="height">
                        <xsl:value-of select="@height" />
                    </xsl:attribute>
                </xsl:if>
                - <xsl:if test="@width">
                    - <xsl:attribute name="width">
                        <xsl:value-of select="@width" />
                    </xsl:attribute>
                </xsl:if>
            </object>
        </xsl:otherwise>
    </xsl:choose>
</xsl:template>
</xsl:stylesheet>
```

*FIG. 12G*

Example Presentation Of Task

Which image best shows the XYZ Bank? $^{1225}$

| Choice | Subject | |
|---|---|---|
| ○ 1215a | Image 1 | } 1205a |
| ○ 1215b | Image 2 | } 1205b |
| ○ 1215c | Image 3 | } 1205c |
| ⊙ 1215d | Image 4 | } 1205d |
| ○ 1215e | Image 5 | } 1205e |

[Submit Query] $^{1220}$

*FIG. 12H*

Example Task Results Manipulation Processing Information

```xml
<?xml version="1.0" encoding="UTF-8" ?>
<xsl:stylesheet xmlns:xsl="http://www.w3.org/1999/XSL/Transform"
        version="1.0">
    <xsl:output method="xml" />
    <xsl:template match="/CGIData">
        <Answer>
            <xsl:for-each select="Parameter">
                <xsl:if test="@name='choice'">
                    <Label>
                        <xsl:value-of select="@value" />
                    </Label>
                </xsl:if>
            </xsl:for-each>
        </Answer>
    </xsl:template>
</xsl:stylesheet>
```

*FIG. 12I*

Example Manipulated Task Results Provided to Task Requester

```xml
<?xml version="1.0" encoding="UTF-8" ?>
<Answer>
    <Label>Image4</Label>
</Answer>
```

*FIG. 12J*

1402         1404         1406
                     ⌒           ⌒            ⌒              1400
                 ( My Home )   ( Tasks )  ( Qualifications )   ⌒

Welcome Back Task Performer XYZ! ⌒1408

Current Subscriptions:
                                                                    1410
                1414a              1414b         1414c              ⌒
         Name               Active     Actions
1412a ⌒  1.    Images              yes         [details] [edit] [delete]
1412b ⌒  2.    Translation         yes         [details] [edit] [delete]
1412c ⌒  3.    Mobile Phone        no          [details] [edit] [delete]
1412d ⌒  4.    ...

Create a New Subscription:
                                                                   1416a
     New subscription name:  [ Audio Transcription           ]      ⌒
                                                                   1416b
     Containing keywords:    [ audio transcription, podcast  ]      ⌒
                                                                   1416c
     Task requester:         [                               ]      ⌒
                                                                   1416d
     Task type:              [ <Any>                       ▼]      ⌒

Paying between $ [5.00]  and $ [      ]  ⌒1416e

1415 {
     [X]  For which I am qualified? ⌒1416f

[ ]  Automatically assign matching tasks? ⌒1416g

[X]  Reserve matching tasks? ⌒1416h

Notification:    [ ] Web
                      [X] E-mail ⌒1416i
                      [ ] SMS
                                     1416j
     Advanced Subscription Settings ⌒

1418a    1418b    1418c
                     ⌒        ⌒        ⌒
                 ( Preview ) ( Create ) ( Reset )

*Fig. 14A*

|  1402  |  1404  |  1406  |
| --- | --- | --- |
| My Home | Tasks | Qualifications |

1440

| Status: | unassigned | | | Earned Today: | $3.40 |
| Timer: | 00:00 of 6:00 | 1442 | 1444 | Tasks Submitted: | 24 |

Task Details: 1446a
- Requester: XXX
- Expiration: 6/30/XX at 3pm
- Reward: $2.00

1445

Task Description: 1446b

To complete this task, please take a photo of 123 Easy Street in Vermillion, SD.

You can find more information about our photography requirements here.

Task Performance Results: 1446c

Image filename: [_____]   (Upload) 1446d 1448a  1448b

Yes, I want to work on this task:   Not for me:

(Accept Task)    (Skip Task)

1450

Create a subscription for more tasks like this:

Subscription name: [Photography]  1452a

Notification:  ☐ Web
              ☐ E-mail   1452b        (Create)  1454
              ☐ SMS View/Modify Subscription  1452c

*Fig. 14C*

IDENTIFYING TASKS FOR TASK PERFORMERS BASED ON TASK SUBSCRIPTIONS

CROSS REFERENCE TO RELATED APPLICATIONS

This application is a continuation-in-part of U.S. patent application Ser. No. 10/990,949, filed Nov. 16, 2004 and entitled "Providing an Electronic Marketplace to Facilitate Human Performance of Programmatically Submitted Tasks," which is hereby incorporated by reference in its entirety.

TECHNICAL FIELD

The following disclosure relates generally to facilitating the performance of tasks by task performers, such as by automatically identifying tasks that are of interest to human task performers based at least in part on task subscriptions created for those task performers.

BACKGROUND

The Internet comprises a vast number of computers and computer networks that are interconnected through communication links, with information being exchanged using various services such as electronic mail and the World Wide Web (also referred to as the "Web"). In addition to providing access to information, the Web has increasingly become a medium that is used to search for, shop for and order items (such as products, services and/or information) that are for purchase, rent, lease, license, trade, evaluation, sampling, subscription to, etc. In many circumstances, a user can visit the Web site of a Web merchant (or a "Web store") or otherwise interact with an online retailer or electronic marketplace that provides one or more items, such as to view information about the items, give an instruction to place an order for one or more items, and provide information needed to complete the purchase (e.g., payment and shipping information). The Web merchant then fulfills the order by providing the ordered items to the indicated recipient, such as by providing product items that have been ordered through physical distribution channels (e.g., shipment via a governmental postal service or private common carrier) or electronically (e.g., via download over the Internet, such as for digital music or videos) as appropriate. Ordered service items may similarly be provided electronically (e.g., providing email service) or physically (e.g., performing cleaning services at the purchaser's house).

In addition to such Web-based interactions between computers (e.g., interactions initiated by users using Web browser applications to interactively request Web pages from Web servers), various distributed computing systems are known in which multiple computer systems interact in other manners in order to achieve a goal. For example, it is often desirable for an application program on a computer system to interact with remote systems and applications in order to obtain various types of information and functionality that are not part of the application program. By performing such interactions, an application program may be able to leverage information and functionality from vast numbers of other computer systems over the Internet or other networks. In order to enable such interactions between remote computer systems and application programs, various programmatic interaction mechanisms have been developed. For example, remote procedure call ("RPC") protocols have long existed that allow a program on one computer to cause a program on another computer to be executed, and various object-oriented and other architectures such as CORBA ("Common Object Request Broker Architecture"), Java RMI ("Remote Method Invocation"), JavaSpaces, Jini, JXTA, and UPnP ("Universal Plug and Play") and DCOM ("Distributed Component Object Model") provide similar capabilities. In addition, a variety of middleware programs have been implemented to connect separate applications (often of distinct types and from unrelated sources) to allow communication. For example, various EDI ("Electronic Data Interchange") networks exist that provide standard mechanisms to allow a computer system of one user of the network to send data to a computer system of another user of the network.

The widespread popularity of the Web has also provided additional opportunities for computers to inter-communicate in various programmatic manners. For example, there is growing use of the Web to provide so-called "Web services," which typically involve the programmatic interaction of remote applications to exchange information via defined APIs ("application program interfaces"), or the like. Web services may allow heterogeneous applications and computers to interact, and can be defined and implemented using a variety of underlying protocols and techniques. For example, some Web service implementations return data in XML ("eXtensible Markup Language") format using HTTP ("Hyper-Text Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

Unfortunately, while Web services and other programmatic interaction mechanisms allow various application programs and computers to interact, such interactions are typically limited in various ways. For example, the types of information and functionality that are available to be requested using such programmatic interactions are typically restricted to very limited types of requests that the remote computer systems and applications can automatically fulfill (e.g., to provide a specified predefined group of information, such as a Web page or file, or to perform a specified database query on a specified database). Moreover, there is a very large class of tasks which computers and application programs cannot easily automatically perform, but which humans can typically easily perform, referred to herein as "human performance tasks." This is due at least in part to various cognitive and other mental capabilities of humans that are not easily encoded in automated programs, such as the ability to use human judgment to form opinions, to perform abstract or common-sense reasoning, to perform various discernment and perception tasks (e.g., visual and aural pattern recognition, such as based on experience), to use cultural awareness and emotional intelligence, and to perform various other everyday yet highly complex kinds of perception, cognition, reasoning and thinking.

However, existing settings that allow parties to make tasks available for performance by human users also have various problems. One example of a problem that arises in the context of such human performance tasks is that of ensuring that tasks are performed, such as by enabling human users to efficiently obtain information about tasks that are available to be performed. In some situations, there may be a large number of tasks to be performed being provided by large numbers of parties, as well as a large number of users that are available to perform tasks. As such, it may be difficult for users who wish to perform tasks to identify tasks of interest by searching for and/or browsing through large numbers of available tasks. In addition, it may be difficult for parties that provide large numbers of tasks to be performed to obtain information regarding the tasks, such as status information.

BRIEF DESCRIPTION OF THE DRAWINGS

FIGS. 2A-2G illustrate examples of programmatic messages used to interact with an example embodiment of the described electronic marketplace.

FIGS. 12A-12J illustrate examples of using multiple types of user interaction processing to control performance of a task by a task performer in an example embodiment of the described electronic marketplace.

FIGS. 14A-14D illustrate examples of creating and using task subscriptions to provide information about tasks of interest.

DETAILED DESCRIPTION

Figure 1A:
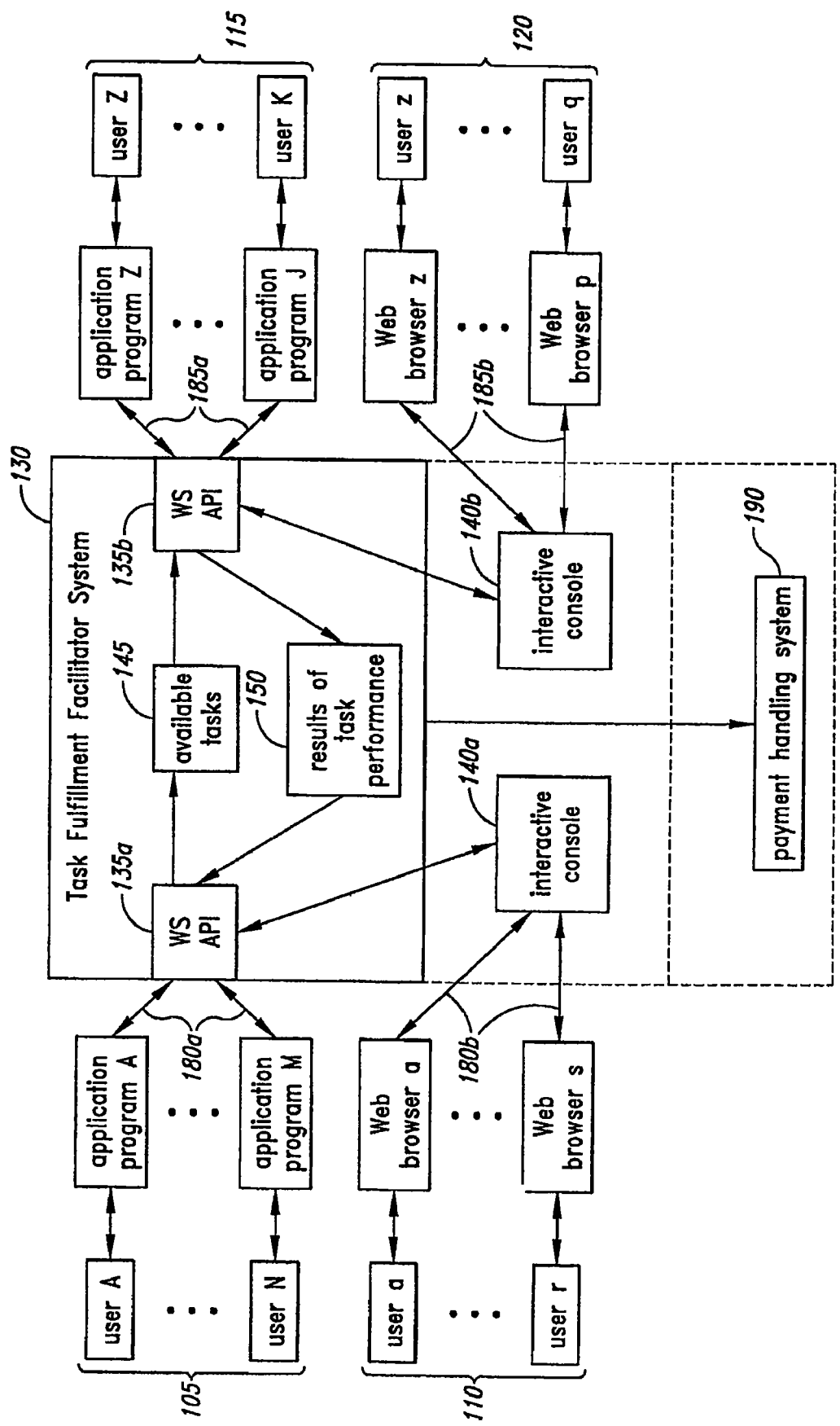
FIG. 1A is a network diagram illustrating interactions and information flow for an example embodiment of the described electronic marketplace for human performance tasks.

A software facility is described that facilitates interactions between task requesters who have tasks that are available to be performed and task performers who are available to perform tasks. In at least some embodiments, the tasks to be performed are cognitive human performance tasks that use cognitive and other mental skills of human task performers, such as to employ judgment, perception and/or reasoning skills of the human task performers. In addition, in at least some embodiments an intermediary electronic marketplace is provided that allows task requester users and task performer users to programmatically and/or interactively engage in task-related transactions and to perform various other activities related to performance of tasks.

In particular, in some embodiments one or more computing systems providing the electronic marketplace act as an intermediary to allow task requesters to programmatically request (e.g., via programmatic invocations of one or more APIs of the electronic marketplace by application programs of the task requesters) that tasks be performed by human task performers and to receive corresponding results after the tasks are performed (e.g., as responses to the programmatic invocations), thus providing a form of artificial artificial intelligence to task requesters' application programs. Similarly, human task performers can access the electronic marketplace (e.g., in a programmatic or interactive manner) to obtain information about available tasks that they can perform and to provide the results of task performance after the completion of tasks that they are assigned. By enabling large numbers of unaffiliated or otherwise unrelated task requesters and task performers to interact via the intermediary electronic marketplace in this manner, free-market mechanisms mediated by the Internet or other public computer networks can be used to programmatically harness the collective intelligence of an ensemble of unrelated human task performers.

The electronic marketplace further performs a variety of additional activities to facilitate the performance of tasks. For example, the electronic marketplace may track the progression of the tasks through various states (e.g., an "open" state for tasks that are available to be performed, an "assigned" state for each assignment of a task to one or more task performers, a "completed" state for an assignment after the task performer provides the results of performance of the task, etc.), and may further take various actions corresponding to the tasks. In addition, in some embodiments a task requester user may impose various criteria regarding performance of a task (e.g., required and/or preferred qualifications for task performers, time limits for task completion, etc.) and/or may specify various actions associated with task performance (e.g., payment of a specified fee under specified conditions), and if so the electronic marketplace may enforce those criteria and initiate those actions as appropriate for the task. Similarly, task performer users may specify various actions related to tasks, such as to request that information about available tasks and/or about other users be provided in various ways (e.g., to be notified when specified types of tasks become available, such as by creating one or more subscriptions to receive information about such types of tasks), and if so the electronic marketplace may similarly initiate those actions as appropriate.

In some embodiments, the electronic marketplace further provides a variety of types of functionality related to obtaining and using information about qualifications and other attributes of task performer users and/or task requester users, such as to allow users to identify and/or specify types of users with whom to conduct transactions. For example, the electronic marketplace may track various information about activities by task performer users and/or task requester users in some embodiments, such as to automatically generate quantitative measurements of actions taken by the users that may be used as qualifications (e.g., activities related to prior task performance). More generally, in some embodiments the electronic marketplace may support user qualifications of various types (e.g., qualifications for a user that are asserted by that user, that are specified by one or more other users, and/or that are automatically generated by the electronic marketplace). Furthermore, in some embodiments the electronic marketplace provides functionality to authenticate or otherwise corroborate information about users (e.g., users' qualifications, identities, non-qualification attributes, etc.), such as based on obtained evidence that supports that information, and may then use such corroborated information in various ways. Functionality provided by the electronic marketplace related to qualifications and corroboration of user information is discussed in greater detail below.

Interactions between the electronic marketplace and users of the marketplace can occur in a variety of ways. As previously noted, in some embodiments task requesters interact with the electronic marketplace in a programmatic manner, such as by invoking defined APIs of the marketplace (e.g., APIs based on Web services provided by the electronic marketplace) to send messages that request or supply information. The defined APIs may allow the task requesters to not only submit tasks that are available to be performed, but also to perform various other actions with respect to previously submitted tasks (e.g., check on the status of pending tasks, modify information about pending tasks, submit instructions regarding handling of pending tasks, and interactively obtain results for completed tasks). In addition, the defined APIs may allow task requesters to further perform various other types of interactions with the electronic marketplace, such as searching for and/or browsing for information of interest (e.g., to identify available task performers having specified qualifications or attributes, or to identify information about tasks submitted by other task requesters), supplying qualification information for themselves and/or for task performers, etc. In addition, while in some embodiments all communications between task requesters and task performers occur via the electronic marketplace, in other embodiments at least some communications may occur directly between a task requester and a task performer (e.g., to allow a task performer to obtain information from a task requester regarding a task to be performed, to allow a task performer to provide task results information to a task requester for a task that has been performed, etc.) or more generally between any two or more users, such as after the electronic marketplace facilitates that direct communication (e.g., by providing appropriate contact or other communication-related information to at least one of the parties to the communication).

In situations in which a final response is not immediately available to a programmatically supplied message (e.g., a final response that includes results from performing a task that is submitted with the message), the electronic marketplace may in some embodiments provide an immediate response that acknowledges receipt of the message (e.g., by providing a unique task identifier for a task being submitted), and may later provide one or more additional related electronic communications (e.g., to provide the results from performing a task to the task requester who submitted the task). Such additional electronic communications can be performed in a variety of ways, such as by initiating a new electronic message (e.g., email, instant messaging, etc.), by using a callback mechanism supplied along with the original message, etc.

In at least some embodiments, the electronic marketplace may also provide an interactive console that allows task requesters to interactively perform some or all of the various types of actions previously noted, whether instead of or in addition to a programmatic interface that is provided for those actions. For example, in some embodiments the interactive console functionality may be accessed by a task requester user via a Web browser that interacts with a Web server for the electronic marketplace (e.g., by supplying appropriate information in a form on a Web page from the electronic marketplace).

In a similar manner, task performer users may interact with the electronic marketplace in a variety of ways in order to identify available tasks of interest and to perform such tasks, whether in a programmatic and/or interactive manner. More generally, task performer users may similarly perform a variety of types of actions with respect to the electronic marketplace, including searching for and/or browsing for available tasks for which they are qualified, searching for and/or browsing for tasks from task requesters who have specified attributes, supplying qualification information, requesting assignments for available tasks of interest, supplying results from performance of tasks to which they have been assigned, requesting notifications of later-submitted tasks for which they are qualified, providing various types of preference information, etc. Additional details regarding specific types of interactions with the electronic marketplace by task requester and task performer users are discussed in greater detail elsewhere.

Task performer users and other users may indicate tasks of interest about which they desired to be notified in various ways in various embodiments. For example, in some embodiments, users may describe or otherwise indicate particular types of tasks of interest by specifying one or more attributes and/or other criteria of such tasks of interest. Task attributes may include or describe various properties, features, conditions, or other information related to a task, including the following non-exclusive list: the identity of a task requester that submitted the task; the price or payment for a task (e.g., an amount of money to be paid to a task performer user upon successful performance of the task); any tags or other keywords that are associated with the task; qualifications that are required and/or preferred for performers of the task; categories and/or task types associated with the task; information about deadlines and other times for performance of the task (e.g., a time period during which a task is to be performed, an amount of time allotted for the performance of a task once assigned to a particular task performer for performance, etc.); information about a geographic location associated with the task; information about a language associated with the task (e.g., a language in which the task is described and/or in which information to be analyzed as part of the task is specified); information about capabilities or other characteristics of one or more client devices (e.g., mobile devices) used by the task performer to perform at least portions of the task and/or to communicate regarding the task; formats and other information regarding how to perform a task and how to provide results of the performance; instructions or other criteria for performing the task; etc.

In some embodiments, users may indicate task attributes of interest by explicitly enumerating or otherwise specifying those task attributes, such as by using a user interface configured to facilitate such task attribute specification (e.g., as part of creating a subscription, as discussed below). In other embodiments, one or more task attributes may be specified by a user while the user is performing other activities. For example, after or as part of performing a search, a user may indicate to use some or all of the search criteria to indicate task attributes of interest (e.g., by using some or all of the search criteria, such as any search criteria that are task attributes). In addition, while performing browsing activities via a user interface or otherwise accessing information about one or more categories of tasks, a user may indicate to use the current task categories as task attributes of interest. In other situations, a user may be viewing or otherwise accessing information about a particular task or a collection of multiple tasks (e.g., results of a user-specified search and/or browsing), and may indicate to use some or all task attributes of those one or more tasks (e.g., task attributes common to a group of multiple tasks) as task attributes of interest. Such indicated task(s) may be used alone or in conjunction with one or more previously indicated tasks and/or later-indicated tasks (e.g., to identify some or all task attributes common to some or all of the tasks, such as all task attributes common to all of the tasks, a certain number or percentage of task attributes that are shared by a largest number of the tasks, etc.). In the various circumstances indicated above, the indication by the user of the task attributes of interest may be performed as part of creating a new task information subscription for the user and/or modifying an existing subscription, as discussed in greater detail below. In addition, in some embodiments, at least some task attributes of interest to a user may be automatically inferred by the electronic marketplace, such as by analyzing information about past activities of users (e.g., tasks previously performed) and/or attributes of the user (e.g., geographic location, qualifications obtained, etc.), with such inferred task attributes of interest being used as part of a subscription created by the user (e.g., as some or all of the task attributes of interest for the subscription) and/or as part of a subscription automatically created for the user.

Task performer users and other users may also indicate how and when to be notified about tasks of interest in various ways in various embodiments. For example, users may request to be notified of such tasks of interest (e.g., tasks with attributes matching user-specified attributes) when the tasks become available for task performance and/or in other situations (e.g., when information becomes available that tasks of interest will be available in the future, such as at an indicated future time; at an indicated time before tasks of interest become available in the future, such as an hour before or a day before; when the tasks are assigned to task performers for performance; when the tasks are accepted and/or declined for performance by task performers; when results of performance of the tasks are received; when any deadlines or other time periods specified for the task are reached; when task performance results are approved, rejected and/or validated; when payment is made for successful performance of the task; etc.). A user may also specify one or more particular notification mechanisms to be used for the notifying, such as with each notification mechanism to be used at specified times and/or in specified circumstances. For example, a particular notification mechanism may include the electronic marketplace automatically initiating one or more electronic messages or other communications of various types to the user, such as email messages, text messages, instant messages, SMS messages, RSS (or "Really Simple Syndication") feed communications, automated telephone messages, etc., and/or may include providing information to the user upon request in various ways (e.g., as part of one or Web pages sent to a device of the user). As one particular example, a particular user may specify to be notified by instant message at particular times of identified tasks that are newly available for performance, and to be notified of other identified tasks and/or at other times using email messages. Such notification communications may also each include a variety of types of information about the identified tasks, including various details about attributes and other information about tasks, user-selectable links or other controls for the user to obtain additional information and/or indicate an action related to one or more tasks (e.g., accept an assignment of the task(s) to be performed by the user, initiate performance of the task(s), etc.).

As previously noted, in at least some embodiments, the indications from users of tasks of interest and/or of how and when to be notified about such tasks are used as part of task information subscriptions for the users, such as subscriptions that are defined by or otherwise created for task performer users and/or other users. Such task information subscriptions (hereinafter referred to as "subscriptions") may be specified and used in various ways and by various kinds of users, such as to provide indicated types of information to users about indicated types of tasks at indicated times and in indicated manners. For example, as previously discussed, a task performer user or other user may create a task subscription that specifies one or more attributes of tasks and/or other criteria related to tasks that are of interest to the user, such as to request that information about such types of tasks be provided to the user. Task performers may use subscriptions in order to, for example, quickly and efficiently obtain information about tasks that are available to be performed, such as shortly after or before the tasks become available. By creating one or more subscriptions that reflect their personal interests in tasks to be performed, task performer users may be notified as desired (e.g., whenever new tasks become available, every morning, during particular times, etc.) of available tasks matching those interests. In addition, task requesters may use subscriptions to, for example, track or otherwise obtain information about the tasks that they have submitted or otherwise supplied, such as to be notified whenever tasks matching a particular subscription are accepted for performance and/or performed. Other parties may also use subscriptions in order to receive notifications about tasks having particular attributes in the electronic marketplace, such as tasks supplied by and/or performed by other particular users of interest. In addition, in at least some embodiments, functionality related to the creation and use of subscriptions may be provided for a fee (e.g., a user pays a fee to create a subscription and/or to be notified of tasks matching the subscription). Such subscriptions may further in some embodiments provide additional benefits to users who use the subscriptions to identify matching tasks, such as providing earlier access to a task performer user to review and/or accept matching tasks than is made available to other task performer users, providing additional functionality to a task performer user with respect to matching tasks than is made available to other task performer users (e.g., allowing a temporary reservation of a matching task so that other task performer users cannot accept the task for performance), etc.

A variety of other types of functionality related to task subscriptions may be provided in at least some embodiments. For example, in some embodiments, information about subscriptions that are created by task performer users may be made available to some or all other users (e.g., other task performer users) in at least certain circumstances. Some or all such created subscriptions may be made available, for example, so that other users can view some or all of the details of the subscriptions, and may further in some embodiments be made available to other task performer users so that they can subscribe to and use subscriptions created by others. Some or all of such functionality may in some embodiments be provided to the other users in exchange for a fee (e.g., for viewing or subscribing to others' subscriptions), and in some embodiments the user creators of the task subscriptions may receive compensation under certain circumstances (e.g., when others subscribe to their subscriptions, when others perform tasks that were matched using their subscriptions, when their subscriptions are displayed to other users, etc.). Furthermore, in some embodiments some or all created subscriptions may be rated using one or more measures of the usefulness of the subscription (e.g., to measure popularity, such as based on the number of users that have viewed and/or subscribed to a subscription; to measure associated monetary rewards, such as based on a total or average amount of money that task performer users have earned from performing matching tasks for the subscription; to measure relevance to tasks, such as based on a total number of tasks that currently and/or cumulatively match the subscription and/or based on average or other attributes of such matching tasks; etc.). If so, information about such ratings may be made available to other users in various ways, such as by displaying some or all of the subscriptions in a ranked or ordered manner based on one or more of the measures (e.g., to display the top 10 most popular subscriptions together on a single Web page).

Furthermore, in at least some embodiments other types of functionality related to subscriptions may be provided, such as to allow users to merge multiple existing subscriptions together and to other modify or adapt existing subscriptions to current circumstances in various ways. In other embodiments, a subscription may further be created and/or associated with a group of multiple users, such as to allow the users to collaboratively create the subscription and/or to provide notifications for the subscription to all of the users (e.g., to send each notification to each user, to send notifications to different users at different times or in other different circumstances, etc.). Furthermore, while in some embodiments the subscriptions will be created and used by the electronic marketplace, in other embodiments users may be able to create subscriptions locally on client devices that the users are using and/or may be able to locally execute or otherwise use created subscriptions to obtain and present information about available tasks that match the subscription (e.g., by interacting with the electronic marketplace to obtain information about available tasks and then determining a subset of those tasks that match a subscription, such as via a client-side extension application executing on a client device of a user). Additional details related to the creation and use of subscriptions are included below.

FIG. 1A provides a high-level overview of types of interactions by task performers and task requesters in one example embodiment. In particular, a Task Fulfillment Facilitator ("TFF") system 130 is operating in this example embodiment to facilitate task-related interactions, such as by providing an electronic marketplace for cognitive human performance tasks and/or other types of human performance tasks. In this example embodiment, the TFF system provides an API 135 for programmatic interactions with users, and an interactive console interface 140 is also available for interactive communications. The TFF system may be implemented in various ways in various embodiments, such as a software system executing on one or more computing systems or devices (e.g., in a distributed manner, such as on a peer-to-peer or grid network).

In particular, in this example a variety of human task requester users 105 are each interacting with one or more application programs to request that tasks be performed by registering or otherwise submitting the tasks to the TFF system, as well as to perform various other interactions with the TFF system. To submit the tasks or perform other interactions, the application programs each programmatically invoke 180a one or more Web services ("WSes") that are part of TFF system's API 135a in this example embodiment. As discussed in greater detail elsewhere, each of the task requests may include a variety of information about the task to be performed, including one or more qualifications needed by any human task performer who performs the tasks, one or more other criteria related to task performance (e.g., deadlines for completion and requirements for the format of results from the task performance), and one or more associated fees to be provided to the human task performers who successfully perform the task.

Similarly, in the illustrated embodiment other task requester users 110 submit available tasks and perform other interactions with the TFF system in an interactive manner via Web browser programs that communicate 180b information supplied by the users to an interactive console 140a, with the console then interacting with the API 135a of the TFF system in a manner similar to that of the interactions 180a by the application programs. In the illustrated embodiment, the console is provided as part of the TFF system (whether on the same or different computing systems used for other parts of the TFF system), such as based on one or more Web pages provided by a Web server of the TFF system. In other embodiments, however, one or more such consoles or other mechanisms to interact with the TFF system may instead by provided externally to the TFF system, such as by third parties (whether instead of or in addition to any console(s) provided by the TFF system). After receiving the information for the available tasks being submitted via the API 135a, the TFF system stores information 145 about the available tasks for use by task performers. While not illustrated here, some task requester users may be part of both group 105 and group 110 by interacting with the TFF system in both programmatic and interactive manners, such as at different times and/or for different purposes.

FIG. 1A also illustrates various human task performer users who interact with the electronic marketplace to perform available tasks. In particular, in this example various task performer users 120 each interact with a Web browser program that communicates 185b with an interactive console 140b of the TFF system, such as to identify tasks that are currently available for which they are qualified and to provide information about results of performance of tasks to which they have been assigned. As with console 140a, console 140b then interacts with an API 135b of the TFF system to provide information supplied by the task performer users to the TFF system. In this illustrated embodiment, other task performer users 115 instead directly interact programmatically with the TFF system via API 135b in order to perform activities related to task performance, such as by each using one or more application programs that programmatically invoke 185a appropriate Web services that are part of the API 135b. While illustrated separately in this example, consoles 140a and 140b may in some embodiments be part of a single console provided by the TFF system, and the APIs 135a and 135b of the TFF system may similarly each be portions of a single API 135 for the system. In addition, while not illustrated here, some task performer users may be part of both group 115 and group 120 by interacting with the TFF system in both programmatic and interactive manners, such as at different times and/or for different purposes. In addition, some users may serve as both task requesters and task performers, such as for different tasks.

Based on the interactions with the human task performers, the TFF system tracks information about the current status of tasks, such as by updating information 145 about available tasks, and stores results 150 from the performance of tasks that are received via interface 135b. After a task is performed and corresponding results are received, the TFF system can notify the task requester that supplied that task of the results in a variety of ways. For example, in some embodiments the results are provided to task requesters via the interactive console 140a when the task requesters next interact with the console. Alternatively, task performance results may instead be electronically sent to the task requesters via the API 135a as a response to a prior invocation, or may instead be sent to task requesters in any other way that provides the information to the task requesters in a timely manner (e.g., via email, telephone, fax, postal mail, etc.).

In addition, the TFF system in the illustrated embodiment facilitates the exchange of payments between parties to transactions involving tasks, such as between task requesters and task performers (e.g., to provide payments to the task performers from the task requesters for satisfactory performance of submitted tasks, such as in accordance with current task prices for those tasks). In the illustrated embodiment, the TFF system may include internal payment handling capabilities, such as via a payment handling system 190, although in other embodiments the TFF system may instead interact with an external payment handling system (whether from the same organization that provides the TFF system or instead from a third party) to provide the payments. In some situations, task performance payments may be made automatically after a task is performed (e.g., after automated verification is performed by the TFF system on received task results to ensure that any criteria for the task have been met), while in other situations the payments may instead be made only after the task requester has reviewed and accepted the results (or failed to reject the results after a specified period of time). In addition, as described in greater detail elsewhere, a variety of other types of payments may be made in other situations, such as payments from task performers, payments to or from the TFF system (e.g., for services provided by the system), and/or payments to or from one or more third parties.

Moreover, a variety of types of non-monetary compensation (e.g., for performance of tasks) and other non-monetary rewards may also be used in other embodiments, whether provided by task requesters (e.g., for performance of submitted tasks), task performers (e.g., for the opportunity to perform tasks), the TFF system (e.g., for specified types of user activities), and/or third parties to transactions related to task performance. In particular, in some embodiments compensation to one or more task performers for performance of one or more tasks may include credit and/or discounts for use at one or more online retailers (e.g., a Web merchant affiliated with the TFF system), such as to allow those task performers to purchase and/or rent goods and services for themselves and/or for others as gifts. In addition, in some embodiments such compensation and/or information about such compensation (e.g., a promise to provide such compensation at a future time when specified conditions are satisfied) may also be provided immediately or substantially immediately to a task performer or other recipient of the compensation, such as to allow the recipient to immediately use the compensation for a retail transaction. In other situations, a reward for performance of a task may include recognition of the task performer (e.g., by display information about specified activities of the task performer and/or a ranking of the task performer relative to other task performers), such as a task performed for a task requester that is a charity or that otherwise benefits a charitable cause or other beneficial entity or activity.

Figure 1B:
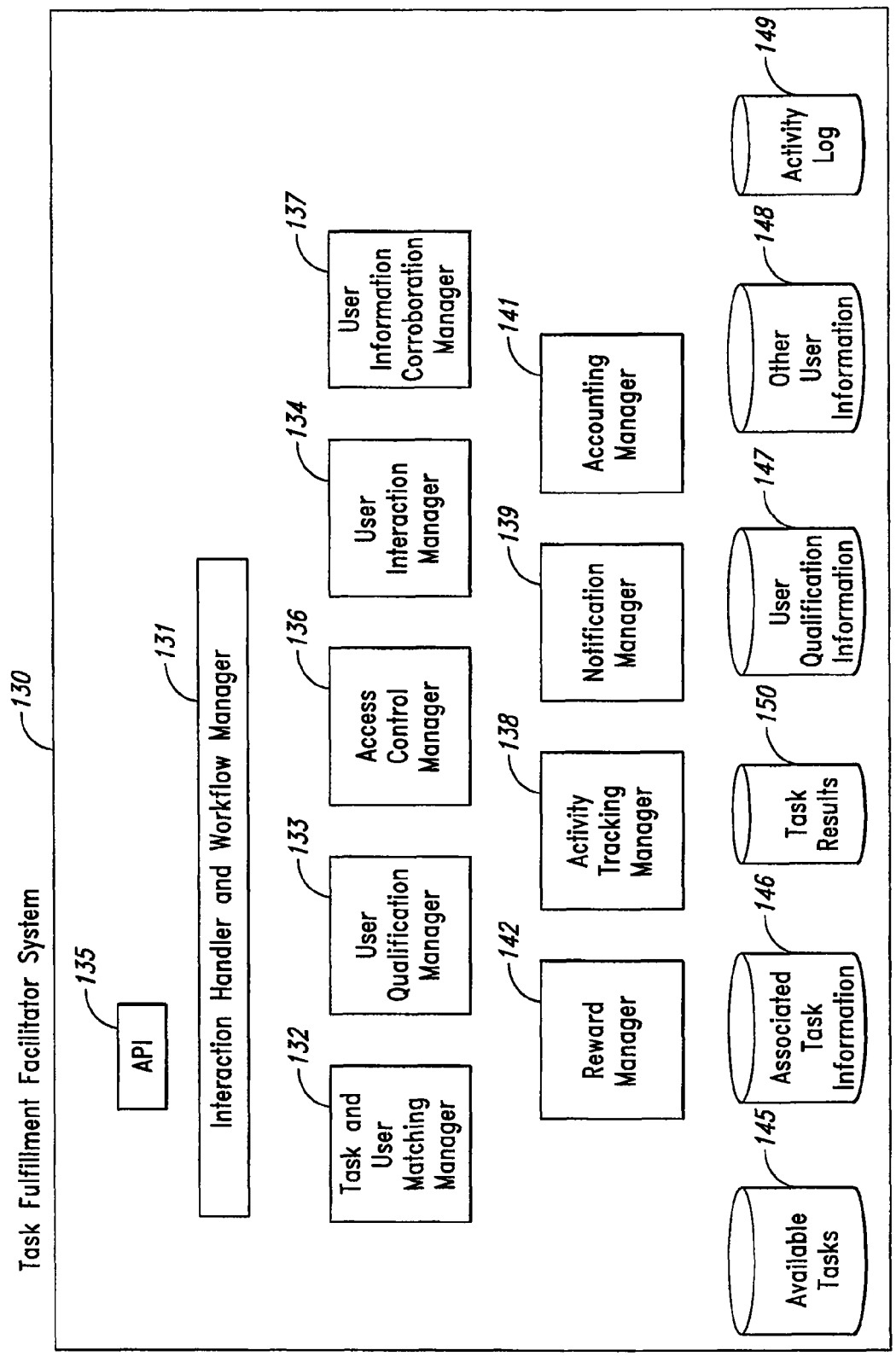
FIG. 1B is a block diagram illustrating an example embodiment of a system for providing the described electronic marketplace.

FIG. 1B illustrates examples of various types of modules and functionality for one example embodiment of the TFF system 130. In particular, the illustrated embodiment of the TFF system includes a module 131 that receives requests and information from users via the API 135 of the TFF system, and handles the requests and information as appropriate (e.g., by implementing business logic and/or workflow processing for a specific embodiment, or by providing or otherwise producing requested information, such as to produce information related to tasks to be performed and/or related to results of task performance). For example, as tasks are submitted by task requesters via the API, the module 131 stores information about the available tasks in a database 145, and further stores any additional associated information for the tasks (e.g., information to be analyzed or manipulated as part of a task) in a database 146. Information about available tasks may then be provided to users by the module 131 via the API, such as in response to requests from task performers and/or task requesters that are received via the API (e.g., requests to access information about a specified task, or to search or browse for various tasks). In addition, when task performers provide results from performance of tasks via the API, the module 131 stores the task results information in a database 150, and may further provide information about the results to users (e.g., the task requesters that submitted the tasks) as appropriate via the API.

The module 131 may also provide a variety of types of functionality other than exchanging task and task result information with users. For example, the module 131 may receive various types of information about users via the API (e.g., evidence of a user's identity, qualification information for users, payment source and/or repository information for a user, demographic information, user preferences, etc.), such as when users initially register with the TFF system to act as task performers and/or task requesters. In the illustrated embodiment, the module 131 then stores the user qualification information in database 147 and the other user information in database 148 (although in other embodiments the information may be stored in other ways), and may then provide such information to users when appropriate via the API, such as in response to search and/or browse requests. A variety of other types of information may also be available (e.g., information about users' accounts with the TFF system, aggregate information about groups of related users or all users, information about historical activities of specific users and/or groups of users, summary and overview information about tasks that have been performed, etc.), and if so the module 131 may similarly provide such information to users when appropriate via the API.

In the illustrated embodiment, the TFF system further includes various additional modules that provide additional types of functionality, such as to assist the module 131, although in other embodiments some or all of the additional modules and/or additional types of functionality may not be included, or may be combined together in different manners. As one example, the illustrated embodiment of the TFF system includes an Access Control Manager module 136 to assist in controlling access to various functionality and stored information, such as based on specific access policies specified by users for specific pieces of information and/or based on default policies of the TFF system. In particular, after a user's identity and/or other relevant information is determined (whether by the Access Control Manager module, module 131, or other entity such as an external system affiliated with the TFF system or provided by a third party), the Access Control Manager module may assist in determining whether the user is allowed to access TFF system information based on that determined user information, with the module 131 providing information to users only when they are authorized to receive it. Access control information can be specified for various types of information in various ways, such as for information about users (e.g., as specified by those users), tasks (e.g., as specified by the task requesters that submitted the tasks), results of task performance (e.g., as specified by the task requesters that submitted the tasks and/or task performers that performed the tasks), etc.

The illustrated embodiment of the TFF system also includes a User Interaction Manager module 134 to assist in managing at least some types of interactions with users. For example, in some embodiments task requesters and/or task performers may be allowed to specify preferences and/or requirements for how certain types of task-related interactions are to occur, such as to allow a task requester to specify how a submitted task is to be presented to a task performer and/or how results from the task performer are to be obtained. In embodiments in which the TFF system includes one or more consoles (not illustrated here) with which users interact during the task performance process, the User Interaction Manager module may further be included with or otherwise affiliated with one or more of the consoles to facilitate those user interactions with the consoles. In addition, while in the illustrated embodiment the User Interaction Manager module operates in conjunction with the module 131 to control particular types of interactions in a user-configurable manner, in other embodiments the module 131 may instead directly include some or all of the types of functionality provided by the User Interaction Manager module.

To facilitate the control of user interactions, the User Interaction Manager module in the illustrated embodiment provides various predefined Task Interaction Control ("TIC") types (not shown) that each include a combination of multiple types of processing related to task performance, and allows task requesters to specify a TIC type for use with each task that is submitted. When a task is later to be performed by a human task performer, the User Interaction Manager module then controls the interactions with the human task performer by performing the types of processing specified by the TIC type associated with the task. The types of user interaction processing may include, for example, manipulating information associated with a task in a specified manner before it is provided to a task performer (e.g., to format the information in a specified manner), providing the manipulated information to the task performer in a specified manner (e.g., by invoking an applet or other functionality on a computing system of the task performer that controls the display or other presentation of the manipulated task information to the task performer), obtaining results of task performance from the task performer in a specified manner (e.g., as input to a CGI ("Common Gateway Interface") program), and manipulating obtained task results before they are provided to the task requester (e.g., to format the information in a specified manner). Multiple predefined alternatives may be provided for each of the types of user interaction processing, and users may further be allowed to define new TIC types based on specified combinations of predefined alternatives and/or by using new processing information supplied by the users. Other information regarding management of task-related interactions with users is discussed in greater detail elsewhere.

The illustrated embodiment of the TFF system further includes a User Qualification Manager module 133 to assist in specifying qualifications of users, such as qualifications of task performer users related to performing tasks and/or qualifications of task requester users related to submitting available tasks and to handling results from performance of tasks. In particular, in the illustrated embodiment the User Qualification Manager module allows users to specify new qualification types, as well as to issue or assert specific qualifications of users of those qualification types (or of predefined qualification types in embodiments in which the TFF system provides them). Information about user-specified qualification types and specified user qualifications is then stored in the illustrated embodiment in database 147, and may be used by task requesters and/or task performers who have access to that information (e.g., to search for users having specified qualifications, to identify preferred or required qualifications for task performers who perform tasks, to identify preferred or required qualifications for task requesters who have submitted tasks, etc.). As discussed in greater detail elsewhere, in some embodiments the TFF system may further assist in specifying user qualifications based on numerical assessments of prior task-related activities by tracking information about the occurrences of such activities. Other information regarding qualification types and qualifications is discussed in greater detail elsewhere.

The illustrated embodiment of the TFF system also includes a User Information Corroboration Manager module 137 to assist in authenticating or otherwise corroborating information about users, such as identities of users, specified qualifications of users, and other types of attributes of users. In particular, in the illustrated embodiment the User Corroboration Manager module obtains various information that may serve as evidence for one or more pieces of information about users, such as from users that supply the evidence via the API to corroborate particular pieces of user information, and may then use that information for corroboration purposes in various ways. For example, in some embodiments corroborative information may be provided to users along with the information that it corroborates, such as to allow a recipient to evaluate the corroborative value of that information. Alternatively, in some embodiments and for some types of corroborative information, the Information Corroboration Manager module may automatically make an assessment of a degree and/or type of corroboration provided by the information. After a piece of user information has been sufficiently corroborated, it can be used in various ways, such as to provide indications to others about the degree or type of corroboration for the information, to limit some types of functionality to users who have sufficiently corroborated information (e.g., to require that task performers for a task have a sufficiently corroborated qualification, or to limit some types of access to information to users' whose identities have been sufficiently corroborated), etc. Other information regarding corroboration of user information is discussed in greater detail elsewhere.

A Task and User Matching Manager module 132 is also illustrated in the example embodiment of the TFF system to assist in matching available tasks to be performed and available task performers who can perform the tasks. The matching of tasks and task performers can be performed at various times and in various ways. For example, in some embodiments the matching may be performed in response to requests from task performer users for tasks that meet specified criteria, with the matching tasks provided to the task performer users as candidates that they can select to perform. Alternatively, in some embodiments the matching may be automatically performed for at least some types of tasks when the tasks are submitted, such as to assist in quickly identifying one or more task performers to perform the tasks. In addition, in some embodiments the matching may be performed by matching information about the tasks and the task performers, such as by identifying task performers having qualifications that meet or exceed any required qualifications specified for a task. In other embodiments the Matching Manager module may use additional information (e.g., information about task requesters that submit tasks, preferences of task performers and/or task requesters, preferred but not required criteria specified for tasks, etc.) when performing matching and/or perform various additional activities related to matching. For example, the Matching Manager module may in some embodiments identify tasks that may be of interest to users based on subscriptions for those users, and then cause the appropriate users to be notified of the identified tasks (e.g., based on interactions with the Notification Manager module 139). Other information regarding matching of tasks and task performers is discussed in greater detail elsewhere.

The illustrated embodiment of the TFF system further includes several other modules that provide additional types of functionality to assist operation of the system. For example, the illustrated embodiment includes an Activity Tracking Manager module 138 that tracks a variety of types of activities (e.g., each activity taken by a user with respect to a submitted task) and stores the tracked information in an activity log database 149. The Activity Tracking Manager module or other part of the system can then analyze the logged information to determine various types of aggregate or summary information (e.g., for specific users, groups of users, all users, types of tasks, groups of related tasks, etc.), and make that aggregate or summary information available to users as appropriate. The illustrated embodiment also includes a Notification Manager module 139 that provides notifications to users as appropriate, such as to notify task performers when new tasks that meet specified criteria become available (e.g., notifying task performer users of available tasks that match subscriptions created by those task performer users, such as when the Matching Manager module identifies such available tasks), to notify task requesters when results of performance of their previously submitted tasks are available, etc. The notifications can be performed in various ways in various embodiments, such as via a console or programmatic interface of the TFF system, or via other electronic communication mechanisms (e.g., cellphone, email, instant messaging, etc.). The illustrated embodiment also includes a Reward Manager module 142 that tracks information about compensation and other rewards for users based on their activities, such as to maintain a financial repository for each user for use in providing or receiving monetary compensation. In addition, the illustrated embodiment includes an Accounting Manager module 141 to perform various administrative functions for the system, such as to obtain financial payments or other reward information from users. While not illustrated here, in some embodiments one or more additional distinct modules may be provided to facilitate creation and use of subscriptions by users, such as a Subscription Manager module to facilitate creation of subscriptions and/or a Subscription Matcher module to facilitate use of existing subscriptions to identify matching tasks. In the illustrated embodiment, one or more of the existing modules may instead provide some or all of the corresponding types of functionality related to subscriptions, such as the Matching Manager module 132, the Notification Manager module 139, and/or the module 131. Information about subscriptions may also be stored in various ways, such as in database 148, and information about use of subscriptions may be stored in tracking database 149.

As previously noted, the illustrated embodiment of the TFF system provides functionality for identifying tasks of interest to users and for notifying users about such tasks, such as based on subscriptions created by or for those users. As discussed in greater detail elsewhere, such task identification functionality may include matching available tasks to user-created subscriptions, and to performing notifications to users in accordance with those subscriptions. Additional details related to automatically identifying appropriate tasks for a task performer user, such as based on prior activities of the user and/or similar users, are included in commonly-owned U.S. patent application Ser. No. 11/537,502, filed concurrently and entitled "Automatically Generating Task Recommendations For Human Task Performers," which is hereby incorporated by reference in its entirety. Additional details related to providing information to a task performer user about available tasks are included in commonly-owned U.S. patent application Ser. No. 11/537,491, filed concurrently and entitled "Facilitating Performance Of Tasks Via Distribution Using Third-Party Sites," and in commonly-owned U.S. patent application Ser. No. 11/537,494, filed concurrently and entitled "Facilitating Performance Of Submitted Tasks By Mobile Task Performer Users," each of which is hereby incorporated by reference in its entirety.

Figure 14B:
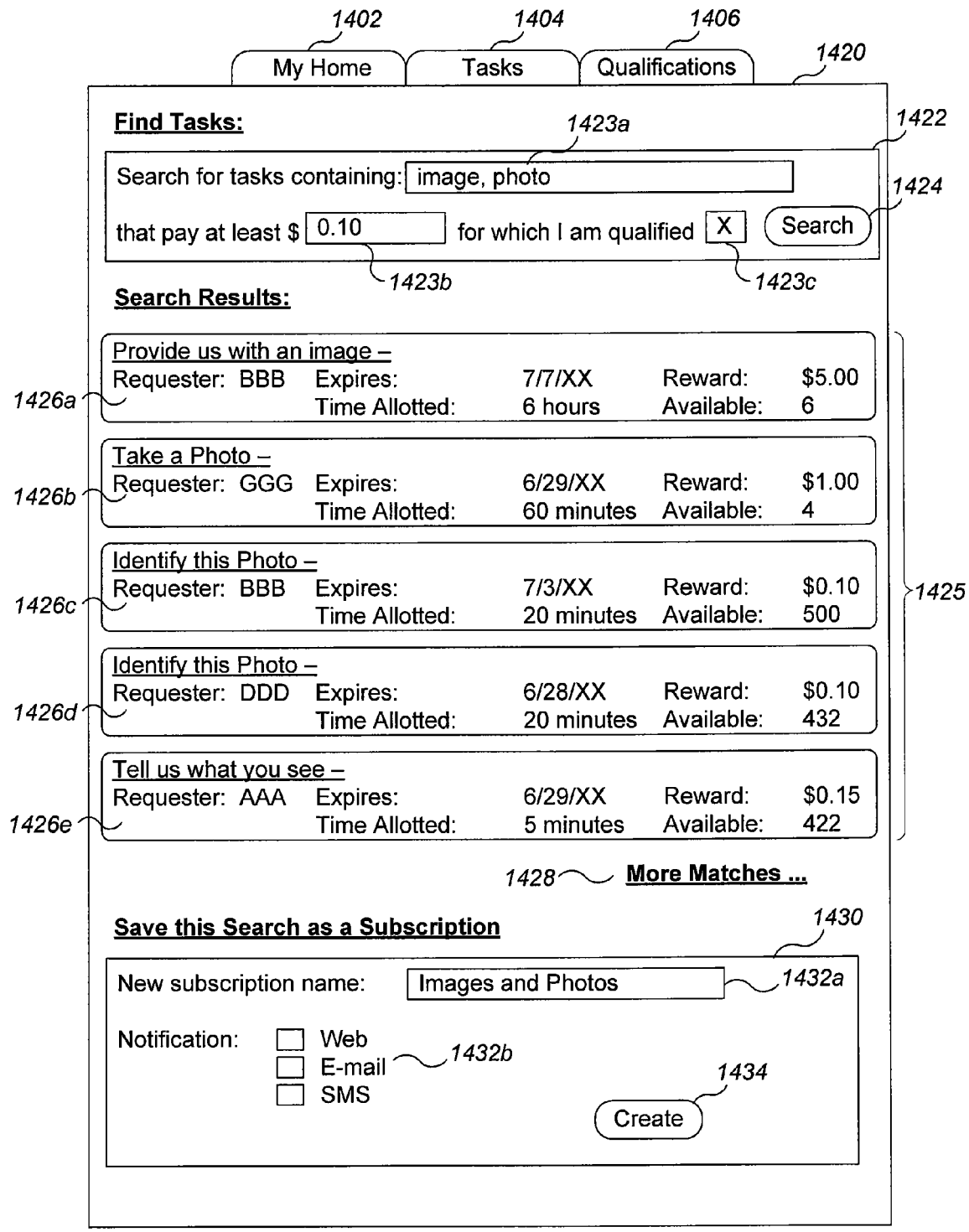

FIGS. 14A-14D illustrate examples of situations in which users may create task subscriptions in various embodiments, such as via user interfaces provided by the TFF system. In particular, FIG. 14A illustrates an example user interface 1400 being displayed to an example task performer user XYZ, and which may be used by the task performer to manage and create subscriptions by specifying task attributes of interest. The displayed user interface of FIG. 14A includes a welcome message 1408 customized for a particular task performer (task performer XYZ, in this case). The display 1400 also includes a subscription management section 1410 that provides summary information and commonly performed actions related to multiple subscriptions 1412a-1412d previously created by the task performer user. In this example, information about each of the multiple subscriptions 1412a-1412d includes a name 1414a of the subscription, an indication 1414b whether the subscription is currently active, and one or more actions 1414c that may be performed on or with the subscription. The illustrated subscription management section 1410 provides information related to a number of subscriptions, although in other embodiments only a single subscription may be allowed to exist or to be currently active. In this example, subscription 1412a is named "Images" and is currently in the active state. Subscription 1412b is named "Translation" and is currently also in the active state. Subscription 1412c is named "Mobile Phone" and is currently in the inactive state. Subscription 1412d indicates that information about additional subscriptions may be displayed in some embodiments, or that an indication may be provided to the user that information regarding additional subscriptions is not currently being displayed. In various embodiments, the subscriptions 1412a-1412d may be organized and/or presented in various ways, such as by name, creation date, active state, etc.

In the illustrated embodiment, a subscription may be in an active or inactive state. An inactive subscription is not used for purposes of notifying a user about tasks of interest, such as by not identifying those tasks or by not performing notification for identified tasks. For example, a user may manually deactivate a subscription during a period of time when he/she does not wish to be notified of tasks matching that subscription (e.g., when the user is on vacation, in a meeting, sleeping, etc.). Such deactivation may include, for example, a temporary suspension of use of the subscription, such as until the user re-activates the subscription or until a specified time or other set of specified conditions occur. In some cases, users may be provided various levels of control over the activation/deactivation of subscriptions. For example, in some embodiments, users may be provided a mechanism for manually toggling a subscription between an active and inactive state. In other embodiments, users may be able to specify conditions under which subscriptions are to automatically become active or inactive. For example, a user may specify that a particular subscription should only be active during certain times (e.g., between 9 AM and 10 AM on Monday through Friday). In addition, in some embodiments, a subscription may be automatically deactivated in response to certain conditions without input or other interaction from a user. For example, in embodiments where users pay to obtain information about tasks matching subscriptions, a subscription may be deactivated if its associated user has not made corresponding payments (e.g., is more than 30 days late making a payment).

In addition, in some embodiments, various actions, such as the actions 1414c, may be performed on subscriptions created by a user. Such actions may be performed via one or more user-selectable controls (e.g., a button or link), and may include obtaining further details or other information about a subscription, editing a subscription, deleting a subscription, etc.

The illustrated display 1400 also includes a subscription creation section 1415 that may be utilized by a user to create a new subscription. The subscription creation section 1415 includes multiple input controls 1416a-1416j for specifying attributes of tasks that are of interest to the user and/or other information, settings, and/or preferences associated with a new subscription. For example, input control 1416a is a text input control that may be utilized to specify a name for a new subscription (e.g., "Audio Transcription" in the illustrated example). Input controls 1416b-1416f are examples of controls that may be used by a user to specify attributes of interest to that user. Specifically, input control 1416b is a text input control that may be utilized to specify one or more comma-separated keywords (e.g., "audio transcription" and "podcast" in the illustrated example); input control 1416c is a text input control that may be utilized to specify a task requester that submitted tasks (although in other embodiments could be a drop-down list or have an associated search control); input control 1416d is a drop-down menu control that may be utilized to specify one of a number of predetermined task types associated with tasks; input control 1416e is a text input control that may be utilized to specify a price range for tasks (e.g. equal to or more than $5.00 in the illustrated example); input control 1416f is a checkbox control that may be utilized to indicate interest in tasks having associated qualifications matching those held by the user; input control 1416g may be utilized to indicate that tasks matching the illustrated subscription are to be automatically assigned to the user for performance; input control 1416h may be utilized to indicate that tasks matching the illustrated subscription are to be reserved for a limited time to allow selection by the user to perform the task if so desired; input control 1416i may be utilized to specify one or more notification mechanisms that are to be utilized to notify the user of tasks matching the illustrated subscription; and input control 1416j may be utilized to specify additional attributes and/or other settings associated with the subscription (e.g., particular electronic address or other contact information to be used with the notification mechanisms, such as an email or SMS address). A variety of other similar types of controls may be used in other embodiments to specify other types of task attributes and/or other information, and they existing types of task information may instead have other types of controls and/or not be available in other embodiments. In addition, in some embodiments the available controls may allow the user to specify whether a matching task is to include all specified attributes, or if tasks are to be considered to match in other ways (e.g., by exacting matching only a specified number or percentage or particular attributes, by matching some or all attributes with a sufficient degree of similarity, by a combination of all matching attributes being within a specified degree or threshold of similarity, etc.).

The illustrated user interface display 1400 also includes user-selectable controls 1418a-1418c that may be utilized to invoke various task creation functions. In this example, user-selectable control 1418a may be utilized to preview tasks matching the illustrated subscription. In this manner, a user may test a subscription prior to its creation, so that the user may determine whether the specified attributes of the subscription are appropriate (e.g., not over-inclusive and/or under-inclusive, etc.). If the user determines that the specified attributes are not appropriate, he/she may iteratively refine the subscription by adding, deleting, or otherwise modifying the specified attributes. User-selectable control 1418b may be utilized to create a new subscription having the attributes specified via user input controls 1416a-1416j. User-selectable control 1418c may be utilized to clear all values provided by a user in the user input controls 1416a-j and/or to reset all values to defaults.

In this example, several user-selectable navigation tab controls are also shown to allow a user to view other available information, such as information regarding available tasks via the Tasks tab 1404, information regarding their own or available qualifications (e.g., by searching or browsing) via the Qualifications tab 1406, and overview information regarding the user's account (e.g., contact information, payment information, etc.) or other status via the My Home tab 1402.

Once a subscription having specified attributes is created, tasks may be automatically identified that match one or more of the specified attributes. In the illustrated example, a task matches the created subscription if the task has an associated attribute that exactly matches each of the specified attributes of the subscription. Specifically, the illustrated subscription will match tasks that have associated keywords "audio transcription" and "podcast," that have been submitted by any task requester, that are of any task type, that have an associated price of at least $5.00, and for which the illustrated user (task performer XYZ) is qualified (e.g., by having qualifications that match those associated with the task).

Other embodiments may utilize and/or provide various other approaches to matching tasks to subscriptions. For example, keywords may be specified and/or matched in various ways, including word stemming, approximate matching, regular expression matching, etc. In addition, various approaches to combining multiple specified attributes are contemplated, such as by way of various logical operators such as "and", "or", etc. In some embodiments, various attributes may be weighted, such that matches of more heavily weighted attributes contribute more to an overall determination (e.g., a score calculated by counting the number of attribute matches) of similarity between a given subscription and a given task. In addition, the various techniques described above may be configurable and/or selectable by the user, such as by providing the user with the ability to specify keywords using regular expression syntax, allowing the user to select from various logical operators to use to combine various attributes, etc. In the illustrated embodiment, the user-selectable control 1416j may also be available to initiate the display of additional controls for specifying and/or configuring such subscription matching functionality. In other embodiments, such controls may be provided directly as part of the illustrated user interface display 1400.

Once a number of tasks matching the subscription illustrated in FIG. 14A are identified, the user may be notified of the matching tasks in various ways. In the illustrated example, the user may select one or more notification mechanisms via the user input control 1416i, such as Web-based (e.g., the user will periodically visit a Web site or other networked information source to request information, and will receive information regarding tasks matching one or more subscriptions created by the user), email (e.g., an email message will be sent to the user informing them of matching tasks), and SMS ("Short Message Service") (e.g., a text message including information about matching tasks will be sent to the user's cellular telephone or other device). In the illustrated example, contact information (e.g., email address, mobile telephone number, etc.) for the user may be automatically obtained from profile information previously provided by the user. If such information has not been previously provided, additional information may be requested at the time of subscription creation. As previously noted, in other embodiments a variety of other types of notification mechanisms may be used, including via instant messaging, automated telephone voice messages, RSS feed communications, etc.

In some embodiments, tasks matching a subscription may be automatically assigned for performance to the user associated with the subscription. In the illustrated example, the user may utilize user input control 1416g to indicate that tasks matching the subscription be automatically assigned for performance to the user. In this manner, a task "pipeline" may be created that provides a given user with a steady stream of incoming tasks for performance, such that the user need not periodically search, review, and explicitly accept tasks for performance. Additional details regarding automatic task assignment are provided elsewhere.

In some embodiments, tasks matching a subscription may be reserved for the user associated with the subscription, such that the associated user has an opportunity to view additional information about, and indicate whether or not they wish to perform, the matching tasks, without the tasks being available to other users for performance. Such task reservations may provide an effective technique for accounting for delays associated with some notification mechanisms. For example, when using notification mechanisms (e.g., email or text messages) that "push" information about matching tasks to a user, it may be the case the user does not immediately receive or view the contents of a message (e.g. because their mobile phone is not in service, because they do not read electronic mail as soon as it arrives in their inbox, etc.). In such cases, it may be desirable to temporarily reserve a matching task until the notified user has had an opportunity to indicate whether or not they are interested in performing the matching task (e.g., by responding with an indication that they accept/decline to perform the matching task), or until a predetermined time interval has passed (e.g., to account for users that are unable or unwilling to provide responses in a timely manner). In some embodiments, users may pay a fee (e.g., a fixed amount per task, percentage of the task price, etc.) to have tasks matching their subscriptions be reserved. Such fees may also be related to how long tasks will be reserved before they are made available to other users (e.g., higher fees for longer reservation times).

In other embodiments, task requesters may further specify whether and how tasks they submit are to be available for matching subscriptions. For example, task requesters may specify that tasks they submit are not to be matched to any subscriptions, or only to or only not to subscriptions that meet particular conditions (e.g., subscriptions that specify that an associated task performer requests that matching tasks be automatically assigned for performance, that specify that an associated task performer requests that matching tasks be automatically reserved, subscriptions whose associated task performer has particular qualifications, etc.).

FIG. 14B illustrates an example user interface 1420 via which a user may create a subscription based on a previously performed search for tasks. The example user interface includes a search control area 1422 that includes various user input controls 1423a-1423c for specifying search criteria for a search for available tasks. The illustrated user input controls 1423a-1423c include a user input control 1423a to specify one or more keywords (e.g., "image" and "photo"), a user input control 1423b to specify a minimum price (e.g., $0.10), and a user input control 1423c to specify that matching tasks have qualifications held by the user performing the search. The search control area 1422 also includes a user-selectable control 1424 to initiate a search for available tasks having attributes that match the specified search criteria. In other embodiments, a greater or lesser number of attributes of various kinds may be specified for a search.

After a search is performed, available tasks having attributes that match the specified search criteria are displayed via a search results section 1425. The illustrated search results section 1425 includes one or more descriptions of available tasks 1426a-1426e that have attributes that match the specified search criteria, along with a user-selectable control 1428 that the user may use to obtain information about additional tasks matching the specified search criteria. The illustrated descriptions of available tasks 1426a-1426e each include various information about one or more available tasks, including a brief textual description of the tasks, an indication of the identity of the task requester that submitted the tasks, an expiration date of the tasks, a reward that the task performer will be paid for the successful completion of one of the tasks, and the number of such tasks available for performance.

The example user interface 1420 also includes a subscription creation section 1430 that the user may use to create a subscription having task attributes that are based on the search criteria specified via the search control area 1422. The subscription creation section 1430 includes user input controls 1432a-1432b that may be utilized to specify additional information associated with the subscription. User input control 1432a may be utilized to specify a name for the subscription. In some embodiments, the user input control 1432a may be pre-populated with an automatically generated subscription name based on, for example, the keywords provided in user input control 1423a. User input control 1432b may be utilized to specify one or more notification mechanisms that are to be utilized to inform the user of tasks matching the illustrated subscription. The subscription creation section 1430 also includes a user-selectable control 1434 that may be utilized to initiate the creation of the subscription having the specified attributes. As previously described, a variety of other types of subscription-related information may be specified in other embodiments, including other types of notification mechanisms.

FIG. 14C illustrates an example user interface 1440 that a user may use to create a subscription based on information about a particular task. The example user interface 1440 includes information that describes a task available for performance to a potential task performer or other user. Such a display may be presented to a user, for example, after the user has browsed or searched for available tasks and selected a particular task. In this example, the user interface 1440 includes a task status section 1442 that provides information about the status of the task (which in this example is not yet assigned to a task performer for performance) and about the time remaining for a user to perform the task once it is accepted, with user-selectable controls 1448a and 1448b being available to the user for use in accepting or rejecting this task for performance, respectively. In addition, the user interface further includes a user information section 1444 that in this example provides information regarding the total amount of tasks performed and money earned by the user on the current day. A task section 1445 provides various details about the available task and user input controls that may be utilized to provide task performance results, including task details 1446a (e.g., task requester information, associated price, task expiration date, etc.) and a task description 1446b that includes instructions specific to the illustrated task. The task section 1445 also includes user input controls 1446c-1446d that may be utilized by a task performer to submit task performance results, such as by uploading results by specifying a file name via a file submission control 1446c and initiating an upload with user-selectable control 1446d. In other embodiments, task performance results may be provided in a variety of other manners, including via radio buttons, checkboxes, buttons, switches, text areas, etc.

The user interface display 1440 also includes a subscription creation section 1450 that may be utilized by the user to create a subscription having attributes that are based on the currently displayed task. In this example, the subscription creation section 1450 is similar to the subscription creation section 1430 described with reference to FIG. 14B, and includes user input controls 1452a-1452b that may be utilized to provide a name and notification mechanisms for the subscription, respectively. The subscription creation section 1450 also includes a user-selectable control 1454 that may be utilized to initiate the creation of the subscription. The illustrated subscription creation section 1450 differs from that discussed with reference to FIG. 14A, however, in that the user may not explicitly specify task attributes, with a subscription created in this example having attributes based on some or all of the attributes of the task currently displayed in the task section 1445. As such, the attributes of the illustrated subscription may not be evident or otherwise known to the user. Accordingly, a user-selectable control 1452c is provided in this example so that the user may view and/or modify the attributes of the illustrated subscription, in order to, for example, increase or decrease the generality of the subscription (e.g., by adding, removing, or editing subscription attributes).

Figure 14D:
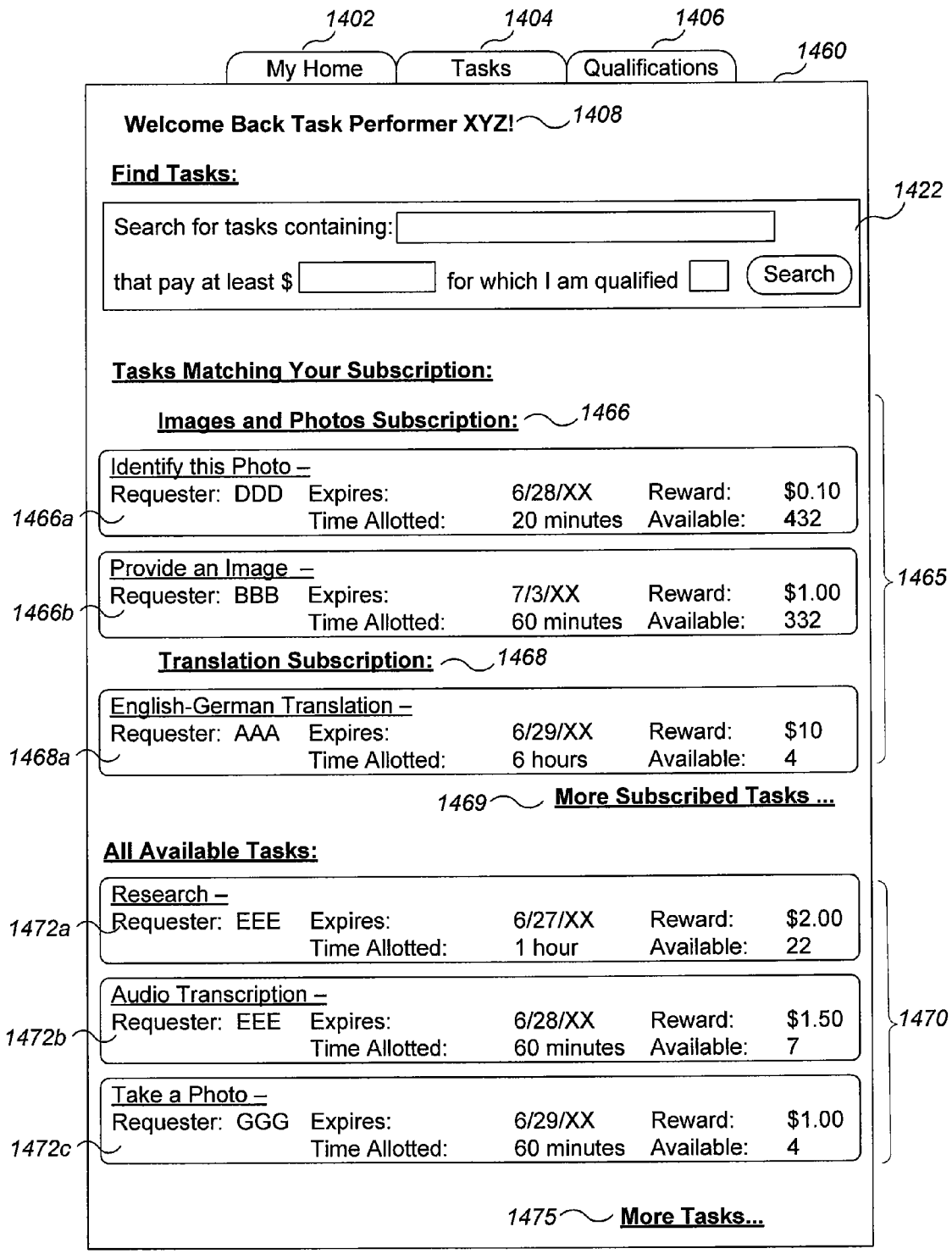

FIG. 14D illustrates an example user interface 1460 that may be utilized to provide information about tasks that match one or more subscriptions associated with a user. In this example, the user interface display includes a welcome message 1408 and a search control 1422 similar to those described with reference to FIGS. 14A and 14B, respectively. The user interface display 1460 also includes a subscription match section 1465 that includes descriptions of available tasks 1466a-1466b and 1468a matching indicated subscriptions 1466 and 1468, respectively, along with a user-selectable control 1469 that the user may utilize to obtain information about additional tasks matching subscriptions associated with the user. The illustrated descriptions of available tasks 1466a-1466b and 1468a each include various information about one or more available tasks, including a brief textual description of the tasks, an indication of the identity of the task requester that submitted the tasks, an expiration date of the tasks, a reward that the task performer will be paid for the successful performance of one of the tasks, and the number of such tasks available for performance. In this example, the user may select one or more of the available task information groups 1466a-1466b and 1468a to obtain additional information about the tasks and to optionally accept one or more of the tasks to be performed.

In this example, the user interface also illustrates various other available tasks 1472a-1472c in section 1470 that are not identified in the subscription match section 1465, although in other embodiments only one of sections 1465 and 1470 may be provided (e.g., if only section 1470 is displayed, with the available tasks shown being ordered and/or ranked in a manner based on matching one or more subscriptions, such that the descriptions of available tasks are presented in decreasing or non-increasing order of interest for the user). The illustrated descriptions of available tasks in sections 1465 and/or 1470 may also be presented in various ways. In some embodiments, tasks may be ordered and/or ranked in various ways, including based on a measure of similarity to a subscription for with the current user or in other ways, such as by age (e.g., more recently submitted tasks being presented prior to less recently submitted tasks), lexicographic ordering (e.g., by task description, task requester name, etc.), etc. In addition, in some embodiments, the ordering of presented tasks may be user-selected, such that the user viewing the display may select one or more orderings to be applied to a particular listing of tasks. In other embodiments, descriptions of available tasks may also include indications of an assessed degree of interest to or other relevance for the user, such as one or more stars indicating that that a particular task may be particularly interesting or otherwise relevant to the user based on a degree of match to one or more subscriptions associated with the user. The use may also in some embodiments specify degrees of interest to particular subscriptions, such that tasks matching one subscription may be considered to be of greater interest than tasks matching another subscription.

It will be appreciated that the displaying and other providing of information about tasks may be performed in various ways in various embodiments. For example, while not illustrated here, information about tasks matching one or more subscriptions may be sent to a user using a variety of types of electronic messages. In such situations, varying levels of information about tasks and/or associated functionality may be provided based on the type of electronic message provided. For example, an email message may include various details about tasks, as well as links or other user-selectable controls via which the message recipient may select to obtain additional information about a task and/or initiate performance of the task. Conversely, an SMS message may include only limited information about one or more tasks, or may include only an indication that information about matching tasks is available from a specified source (e.g., a Web page) or in a specified manner.

Figure 3:
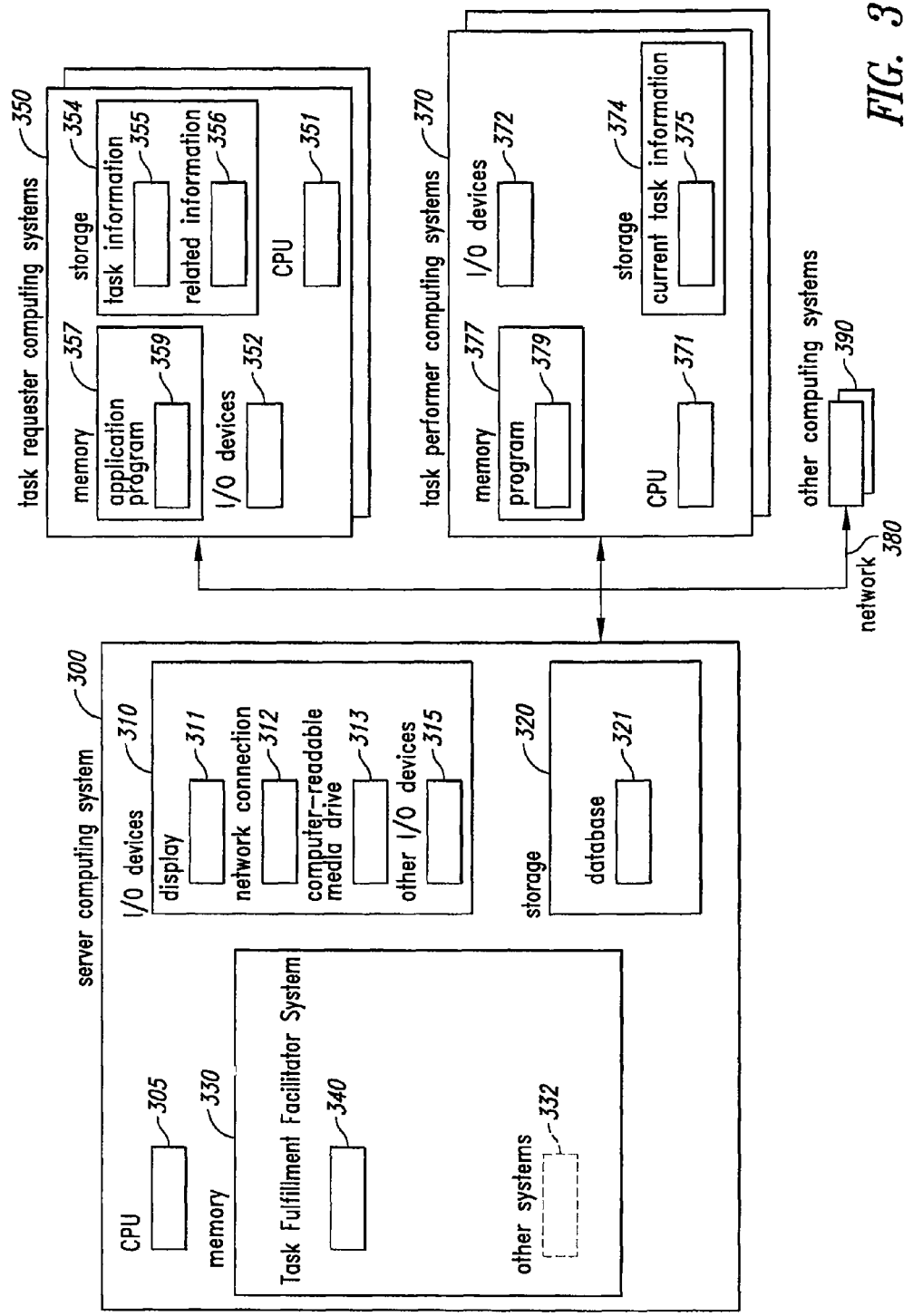
FIG. 3 is a block diagram illustrating a computing system suitable for executing an embodiment of a system for providing the described electronic marketplace.

FIG. 3 illustrates a server computing system 300 suitable for executing an embodiment of the TFF system facility that provides an electronic marketplace for human performance tasks, as well as various task requester computing systems 350, task performer computing systems 370, and other computing systems 390. In the illustrated embodiment, the server computing system 300 includes a CPU 305, various I/O devices 310, storage 320, and memory 330. The I/O devices include a display 311, a network connection 312, a computer-readable media drive 313, and other I/O devices 315.

An embodiment of the TFF system 340 is executing in memory, and it interacts with the other computing systems over the network 380 using the network connection 312 (e.g., via the Internet and/or the World Wide Web). In particular, users of task requester computing systems 350 may interact with the TFF system in order to provide information about available tasks to be performed, such as by using application program 359 executing in memory 357 to send stored task information 355 (e.g., information about the task, any associated criteria, any reward for successful performance, etc.) and related information 356 (e.g., information to be analyzed by human task performers as part of the tasks) on storage 354. Human task performer users similarly use task performer computing systems 370 to interact with the TFF system, such as via a program 379 (e.g., a Web browser) in memory 377 to programmatically or interactively obtain information about available tasks and provide results information for performed tasks. When information is received at the computing system 370 about available tasks, the information is stored in this example embodiment with current task information 375 in storage 374 (e.g., temporarily until performance of the task is completed).

The TFF system and its modules (not shown) may also access and use various task-related and user-related information on storage 320 or elsewhere, such as information stored in one or more databases 321. In addition, in some embodiments the TFF system may also interact with other optional systems 332 executing in memory 330 and/or other optional computing systems 390 to perform additional related functionality, such as to perform payment processing in order to provide payments to human task performers on behalf of task requesters and/or to obtain qualification information from third-party qualification issuing authorities.

Those skilled in the art will appreciate that computing systems 300, 350, 370 and 390 are merely illustrative and are not intended to limit the scope of the present invention. The TFF system may instead be executed by multiple interacting computing systems or devices, and computing system 300 may be connected to other devices that are not illustrated, including through one or more networks such as the Internet or via the World Wide Web ("Web"). More generally, a "client" or "server" computing system or device may comprise any combination of hardware or software that can interact, including (without limitation) desktop or other computers, network devices, PDAs, cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the discussed TFF system modules may in some embodiments be combined in fewer modules or distributed in additional modules. Similarly, in some embodiments the functionality of some of the modules may not be provided as part of the TFF system and/or other additional functionality may be available.

Those skilled in the art will also appreciate that, while various items are discussed or illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing system via inter-computer communication. Some or all of the system modules and/or data structures may also be stored (e.g., as software instructions or structured data) on a computer-readable medium, such as a hard disk, a memory, a network, or a portable media article to be read by an appropriate drive or via an appropriate connection. The system modules and data structures can also be transmitted via generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

As previously noted, in at least some embodiments human task requesters submit tasks to the electronic marketplace that are available to be performed by human task performers. The types of tasks that can be submitted and performed may vary in various embodiments. In particular, in some embodiments the tasks are each cognitive human performance tasks that use cognitive and/or other mental skills of human task performers, such as to use human judgment capabilities to form an opinion related to one or more subjective bases, to use human discernment and/or perception skills to select information (e.g., by analyzing audio and/or video information, such as to perform pattern recognition), to use human reasoning skills (e.g., based on common-sense reasoning), etc. More generally, in at least some embodiments the tasks to be performed are human performance tasks that are selected based on their susceptibility to performance by humans, whether because automated systems are not currently capable of performing the tasks or because human task performers can perform the tasks more cheaply, rapidly, and/or accurately. For example, while automated text translation tools may translate text between languages at a limited level of proficiency, human translators with appropriate qualifications may be able to perform the translations with a significantly higher proficiency level. In addition, in some embodiments some or all of the tasks include questions to be answered by the task performers, such as to select from an enumerated set of potential answers or to more generally generate an appropriate answer. The results of task performance can also take various forms in various embodiments, including answers to questions, a selection by a task performer of one or more options provided as part of the task, a manipulated form of information provided to the task performer, a categorization or other analysis of information provided to the task performer, etc. Additional information regarding tasks and task results is discussed elsewhere.

For illustrative purposes, some embodiments are described below in which a specific form of electronic marketplace provides various specific types of capabilities and functionalities with respect to various specific types of tasks, and interacts with task requesters and task performers in specific types of ways. However, those skilled in the art will appreciate that the techniques of the invention can be used in a wide variety of other situations, including with other types of tasks, with types of programmatic interfaces and/or access mechanisms that do not use Web services, and in situations other than with an electronic marketplace, and that the invention is not limited to the exemplary details provided.

FIGS. 2A-2G illustrate examples of programmatic messages used to interact with an example embodiment of an electronic marketplace for human performance tasks, with the message contents formatted in XML to use various example types of XML tags. In other embodiments, similar types of information could be formatted in other ways, and a variety of additional types of messages may similarly be used to provide other types of information and obtain other types of functionality from the electronic marketplace.

In particular, FIG. 2A illustrates an example of a task submission message that a task requester can programmatically provide to the electronic marketplace in order to describe a task that is available to be performed. In this example, the task is of a type identified by the task requester as being "ImageChoice" (as shown in line 5), such as based on a previous specification by the task requester of that task type or instead based on a predefined type of task provided by the electronic marketplace. The task in this example involves answering the question of which one of 4 specified photographs best shows a specified subject (which in this example is a business in Seattle by the name of "Wildboar Tavern," as indicated in lines 30-37), with the answer being the selected photograph. The task may be, for example, one of thousands or millions of related tasks for a task requester who is creating a directory of businesses with associated photographs. As discussed in greater detail later, FIG. 12A illustrates an alternative example of encoding task information for a similar type of task.

In this example, the message identifies the task requester in line 2 of the message as having an ID of "BarnabyPhoto", specifies details regarding the task in lines 29-44, and specifies information in lines 4-28 regarding criteria and other associated information for the task. A verbal description of the task is provided in lines 7-8, an indication of payment compensation for successful performance of the task is provided in lines 9-12 (which in this example is 6 cents, to be provided to the task performer after approval of the results of task performance by the task requester), and an estimate of the time needed to complete the task is indicated in line 13 to be 30 seconds. The message also indicates various criteria in lines 17-23 regarding task performers who are allowed to perform the task, which in this example does not include any specific qualification criteria (as shown in line 22) or any specific task performers who are identified as being allowed to perform the task (as shown in line 18), but does specify one task performer in lines 19-21 who is excluded from performing the task. Timeout information in lines 24-27 indicates that the task will remain open for performance for 172,800 seconds (or 48 hours), but that an assignment of the task to a task performer will be kept open for only 60 seconds before the task becomes available to others. The message further indicates in lines 39-42 the supplied photographs to be analyzed, and in lines 15-16 indicates an application that will provide functionality for comparing the images (e.g., by displaying all four photographs along with a control for indicating which photograph was selected). In response to submitting this message, the task requester receives a message (not shown) indicating that the task information was received and including a unique task ID of "109234875" that was generated for referencing the task.

FIG. 2B illustrates an example message that a task requester may programmatically supply to the electronic marketplace in order to determine the status of various tasks previously submitted by the task requester. In this example, the previously discussed task requester whose ID is "BarnabyPhoto" has supplied previous tasks that were also of type "ImageChoice", and is gathering information about the performance of those tasks. The message in this example identifies the task requester in line 2, and lines 3-11 indicate to perform a search and provide information about tasks of type "ImageChoice" that have been submitted by the task requester and that have been completed. In response, the task requester will receive a message (not shown) including information about each of the tasks matching those specified criteria.

FIG. 2C illustrates an example message that is later provided to the task requester to give task results from performance of the task illustrated in FIG. 2A, such as after receiving a similar message from a task performer to whom the task was assigned. In particular, line 3 of this example message indicates the task ID for the task to which the results correspond, line 5 identifies the task performer as being "BestManBryan", and in line 6 indicates that the task performance has been completed. Lines 7-10 indicate the actual results of the task, which in this example includes an indication of a particular photograph that was selected, as well as a corresponding ID supplied by the task requester for the business being identified (in line 31 of the message illustrated in FIG. 2A).

FIG. 2D next illustrates an example message sent back to the electronic marketplace from the task requester to indicate that the results are acceptable by closing the task, which in this example triggers the payment of 6 cents to be provided to the human performer for the task performance. If the task requester had instead been unsatisfied with the results, the task requester could have rejected the prior performance result and instead made the task again available for performance to other task performers.

FIGS. 2E-2G next illustrate examples of some messages that are programmatically exchanged with a task performer in order to identify and perform tasks of interest. In particular, FIG. 2E illustrates an example message that a task performer can send to the electronic marketplace in order to identify available tasks, such as by indicating in lines 2-5 of this example message to perform a search for all tasks that are open and available, and to rank the available types of tasks by the number of each type that are available.

In response, the electronic marketplace may provide an example message as illustrated in FIG. 2F, which indicates two types of available tasks. In this example, lines 3-6 of the message indicate that there are 400 available tasks related to selecting photographs or other images (e.g., to match them to business locations), and lines 7-10 of the message indicate that there 80 available tasks related to translating text between French and English. In some embodiments, all available tasks may be indicated to the task performer regardless of the qualifications of the performer, while in other embodiments only available tasks for which the performer is qualified and/or which the performer is authorized to access may be indicated (e.g., if the performer in this example has a previously established associated qualification of having French to English translation abilities).

FIG. 2G then illustrates an example message that a human task performer can use to request that an available task be assigned to them. While in some situations a human task performer may identify one or more specific tasks of interest (e.g., by the task IDs of those tasks), in this example the human task performer indicates an available task by specifying criteria related to the task. In particular, this example message requests in lines 3-10 to assign and lock one of the open tasks for selecting images, and in particular to rank tasks of that type by their creation date so as to select the oldest available task of that type. After information about the task is provided to the human task performer (such as in a message similar to that of FIG. 2A), the human task performer can make an appropriate selection and provide results of task performance to the electronic marketplace (such as in a response message similar to that of FIG. 2C). It will be apparent that a variety of other types of messages may similarly be exchanged for various other types of functionality and using various other formats, and that similar types of messages may be used for a wide variety of types of tasks.

Figure 4A:
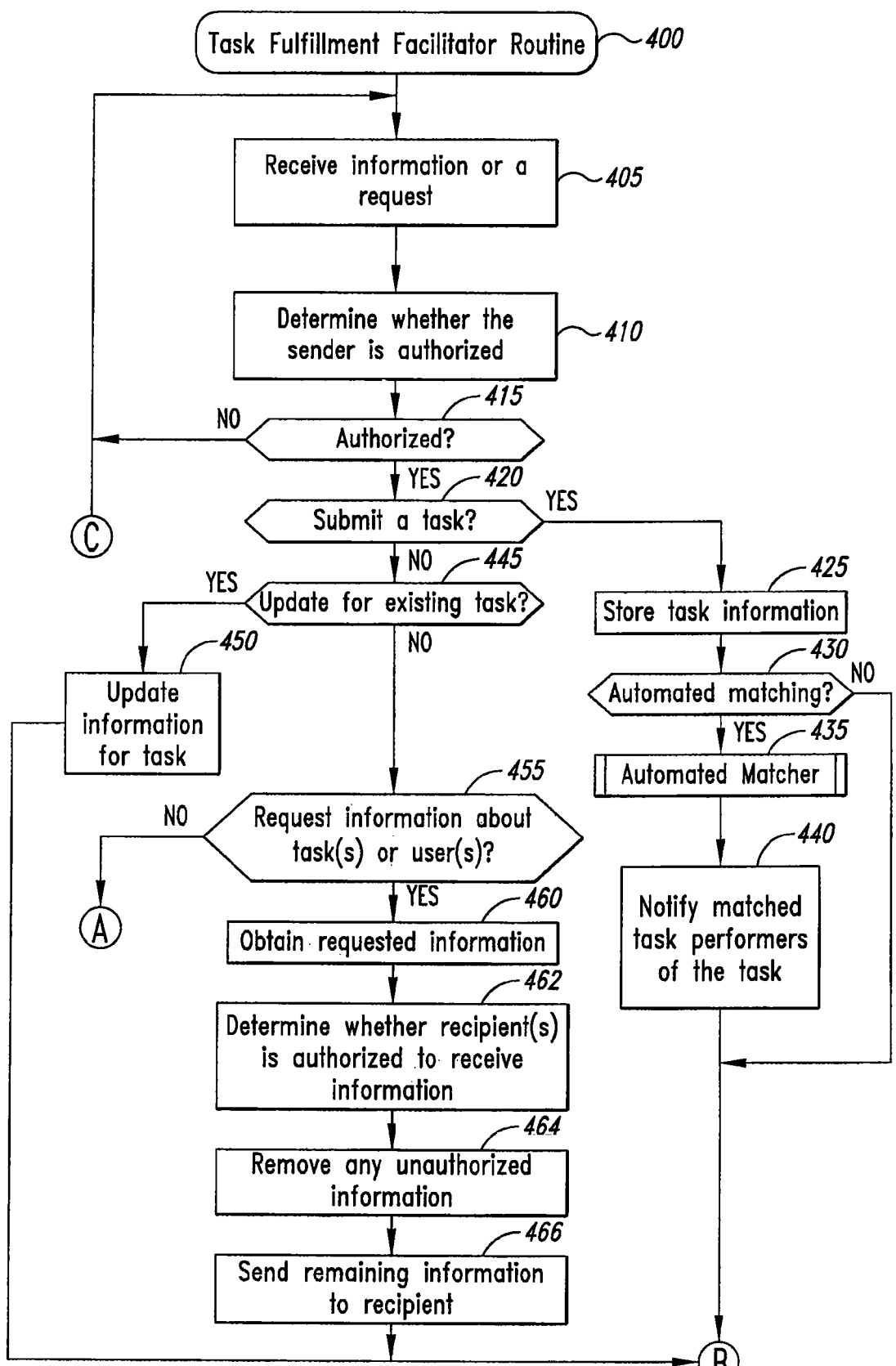
FIGS. 4A and 4B are a flow diagram of an embodiment of Task Fulfillment Facilitator routine.
Figure 4B:
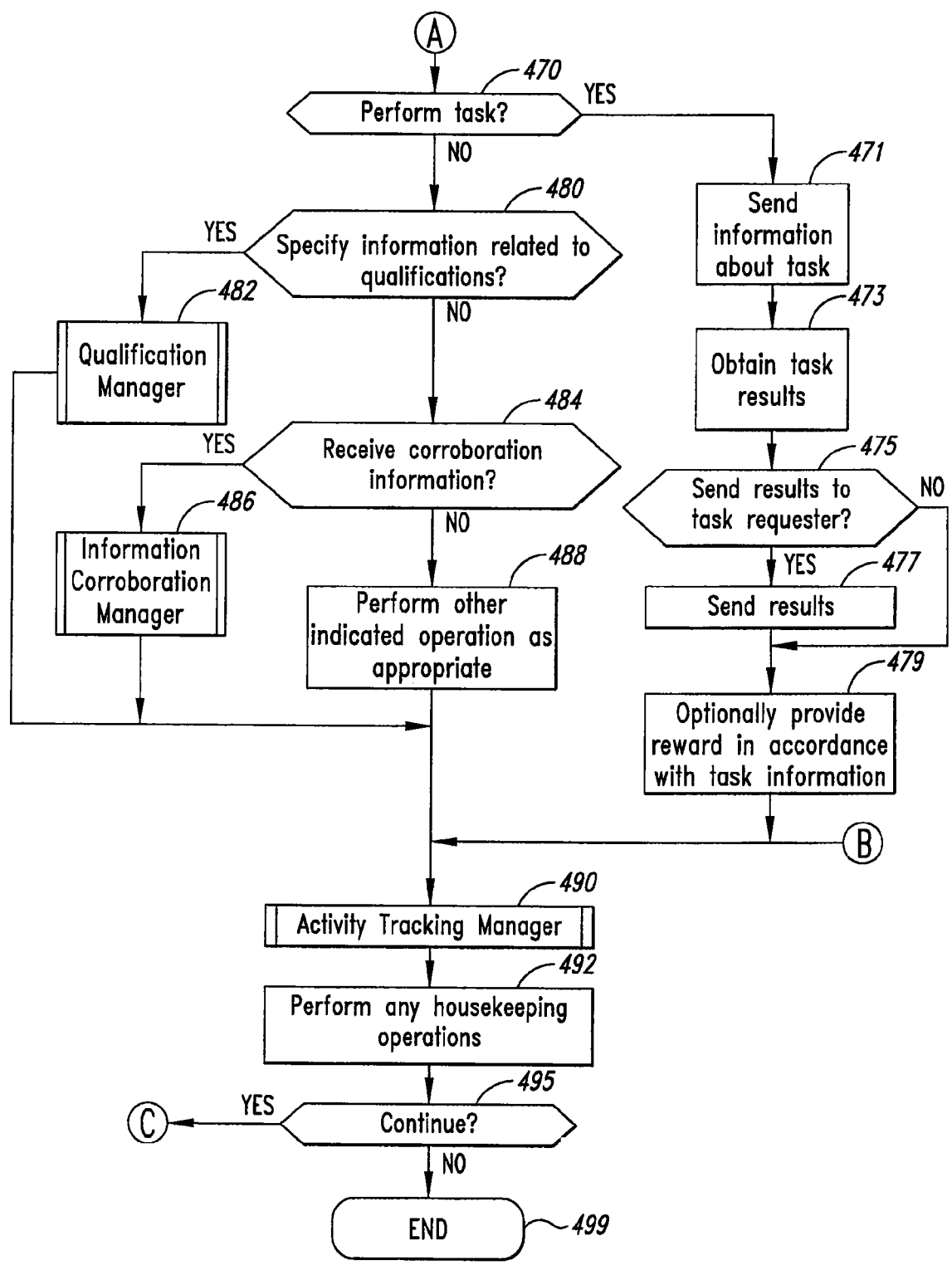

FIGS. 4A and 4B are a flow diagram of an embodiment of a Task Fulfillment Facilitator routine 400. The routine may, for example, be provided by execution of an embodiment of the TFF system 130 of FIGS. 1A and 1B and/or of TFF system 340 of FIG. 3, such as to in this illustrated embodiment provide an electronic marketplace for human performance tasks by interacting with task requesters and task performers as appropriate to facilitate performance of tasks, as well as optionally to interact with other third-party systems as appropriate.

The routine begins in step 405, where an indication is received of information or a request, and in step 410 determines whether the sender of the information or request is authorized to perform requests of that type or provide information of that type, such as based on previously defined access controls for specific users or types of users. If the routine identifies the sender as authorized in step 415, the routine continues to step 420 to determine whether the received indication was a request to submit a task. If so, the routine continues to step 425 to store task information received in step 405, including any task criteria related to task performance, information about any associated rewards for performance of the task, and any associated information to be analyzed or manipulated as part of the task.

The routine then continues to step 430 to determine whether to perform automated matching to identify task performers who are appropriate to perform the task, such as based on the type of task submitted and/or an explicit request by the submitter of the task, although in other embodiments such automated matching functionality may not be provided. In the illustrated embodiment, if automated matching is to be performed, the routine continues to step 435 to execute an Automated Matcher routine, and in step 440 then receives identifications from the Automated Matcher routine of any identified task performers. The routine then notifies those identified task performers of the task in an appropriate manner (e.g., based on previously specified user preferences for those task performers). After step 440, or if it was instead determined in step 430 that automated matching was not to be performed, the routine continues to step 490.

If it was instead determined in step 420 that the received indication was not to submit a task, the routine continues instead to step 445 to determine whether a request was received to perform an update for an existing task, and if so continues to step 450 to perform the update as appropriate. Such updates may take a variety of forms, such as to modify information about or delete a pending task that has not been performed, to perform an indicated activity related to a task (e.g., to cause a reward to be provided to a task performer after the task requester has reviewed and accepted the task results), etc. If it was instead determined in step 445 that the received indication was not to update an existing task, the routine continues to step 455 to determine whether the received indication was a request for information about one or more tasks and/or one or more users, such as for a search or browse request, a request for detailed information about a particular task or user, a request for summary or aggregate information about some or all types of tasks and/or users, etc. If so, the routine continues to step 460 to identify and obtain the requested information, and then continues to step 462 to determine whether the indicated recipient of the information is authorized to receive all of the obtained information, such as based on access controls associated with any aspects or elements of the obtained information (although in other embodiments the access determination may be made before or as part of the obtaining of the information). In step 464, the routine then removes any information for which the recipient is not authorized, and in step 466 sends any remaining information to the recipient. In some embodiments, indications may be provided to the recipient of any removed information for which they were not authorized, while in other embodiments such indications may not be provided. After steps 450 or 466, the routine continues to step 490.

If it was instead determined in step 455 that the received indication was not a request for information about tasks or users, the routine continues instead to step 470 to determine whether the received indication was a request from a task performer to perform an indicated task. If so, the routine continues to step 471 to retrieve and provide information about the task to the task performer in an appropriate manner (e.g., in a manner specified for the task), and in step 473 obtains results of performance of the task by the task performer. In step 475, the routine then determines whether to immediately send the task results to the task requester, such as based on information associated with the task and/or user preferences for the task requester. If so, the routine continues to step 477 to send the results. After step 477, or if it was instead determined in step 475 not to send the results to the task requester at this time, the routine continues to step 479 to optionally provide any reward associated with the task to the task performer in accordance with the task information, such as if such rewards are to be provided automatically upon receipt of the task results or instead if the task results satisfy any automatically verifiable criteria specified for the task that trigger the providing of the reward. After step 479, the routine continues to step 490.

While the illustrated embodiment indicates a synchronous flow in which the routine waits for and obtains task results in step 473 after sending the task information in step 471, in other embodiments the routine could be structured in other manners, such as to continue with other processing while waiting for task results (if any) to be sent. In addition, in some situations task performers may not provide task results for a task after they accept an assignment to perform the task, which may be indicated to the routine in an explicit message from the task performer that the task performer is abandoning or withdrawing from task performance or instead by not receiving task results within a specified period of time, and if so the routine would continue to handle other task-related requests and information. In addition, while not illustrated here, in other embodiments various types of notifications may be sent to task requesters related to their submitted tasks, such as when a task is assigned to a task performer for performance and/or when an assigned task is withdrawn from a task performer who has not completed the performance.

If it was instead determined in step 470 that the received indication was not to perform a task, the routine continues instead to step 480 to determine whether the received indication is to request or specify information related to user qualifications, and if so continues to step 482 to execute a Qualification Manager routine to handle the qualification-related activities. If it was instead determined in 480 that the received indication was not to request or specify qualification-related information, the routine continues instead to step 484 to determine whether information or a request was received related to corroboration of user qualifications or other user information, and if so continues to step 486 to execute an Information Corroboration Manager routine to handle the corroboration-related activities. If it was instead determined in step 484 that the received indication was not related to corroboration, the routine continues instead to step 488 to perform another indicated operation as appropriate, such as from a task performer indicating a withdrawal from or abandonment of an assignment to perform a task, to specify various types of user information (e.g., information related to a user's identity or attributes, information related to an account of a user with the TFF system, information related to specifying access controls for information and/or functionality, administrative requests related to system operations, requests for information related to monitoring performance of tasks or other operations of the system, etc.).

After steps 482, 486, or 488, the routine continues to step 490 to execute an Activity Tracking Manager routine to log information about activities that have occurred and to generate various types of review and summary aggregate information for the system related to tasks and users. After step 490, the routine continues to step 492 to perform any additional housekeeping operations, such as to take appropriate actions when events do not occur within specified periods of time (e.g., to withdraw assigned tasks from task performers who do not timely perform the tasks, to provide rewards to task performers for tasks that they have performed when task requesters do not timely reject the task results provided by the task performers, etc.). After step 492, the routine continues to step 495 to determine whether to continue. If so, or if it was determined in step 415 that the sender was not authorized, the routine returns to step 405, and if not continues to step 499 and ends. While the illustrated embodiment may include tasks being specified one at a time, in other embodiments tasks may instead be specified in other manners, such as to allow multiple tasks to be submitted together (e.g., to allow for batch processing), whether or not those tasks are related to each other.

Figure 5:
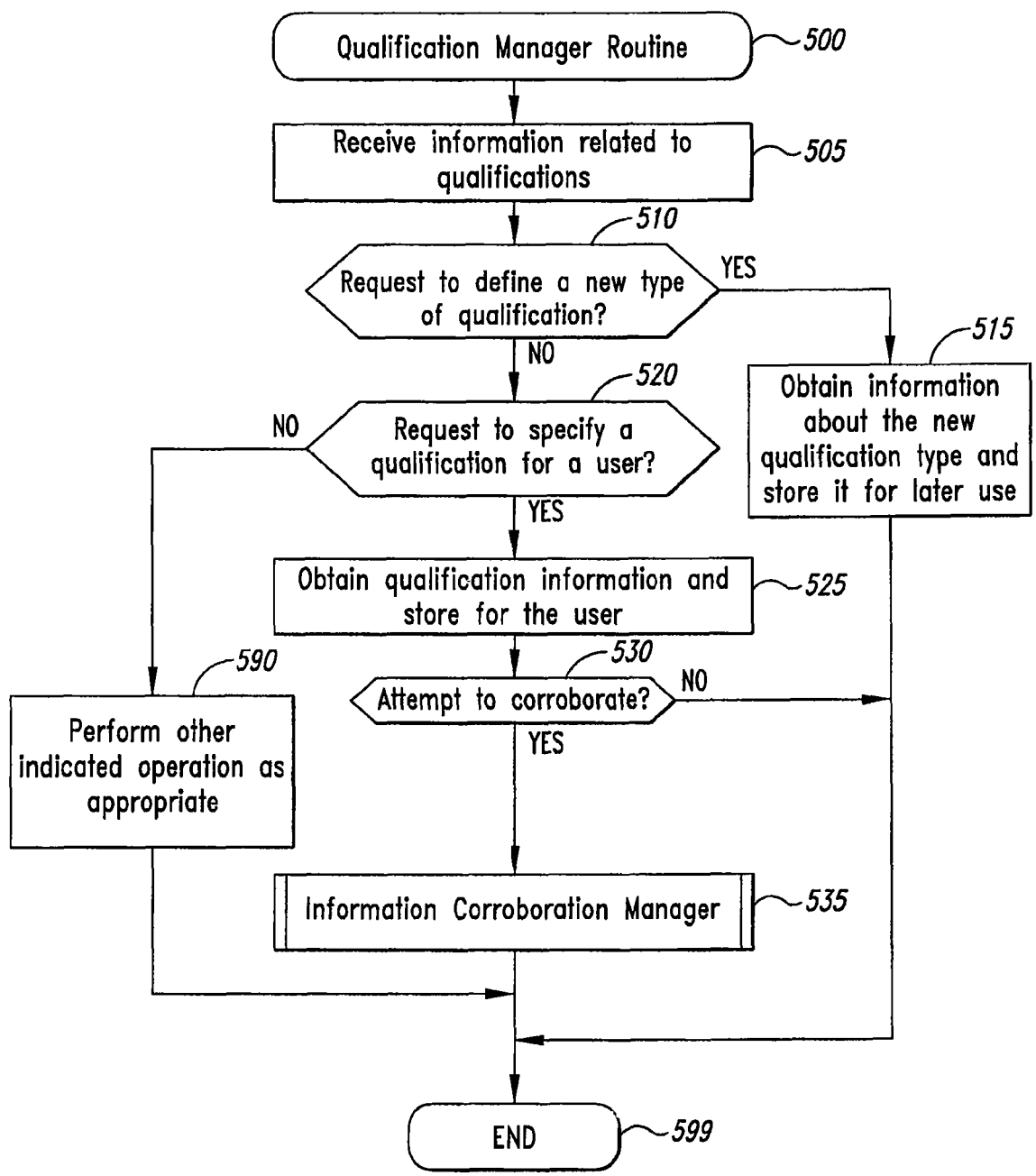
FIG. 5 is a flow diagram of an embodiment of a Qualification Manager routine.

FIG. 5 is a flow chart of an embodiment of a Qualification Manager routine 500. The routine may, for example, be provided by execution of an embodiment of the User Qualification Manager module 133 of FIG. 1B, such as to receive information related to user qualifications and handle the information as appropriate.

The routine begins in step 505, where an indication is received of information or a request related to user qualifications. In step 510, the routine then determines whether the received indication was a request from a user to define a new type of qualification for use with the system, such as for use by that user and/or other indicated users (or all users). If so, the routine continues to step 515 to obtain various information about the new qualification type and to store it for later use. As discussed in greater detail elsewhere, such qualification types may include a unique name, indications of one or more entities authorized to issue qualifications of that type, indications of a rating scale for how qualifications of that type may be rated, an indication of a particular system at which the qualification type is defined, (e.g., the TFF system), etc.

If it was instead determined in step 510 that the received indication was not a request to define a new type of qualification, the routine continues instead to step 520 to determine whether the received indication was a request to specify a particular qualification for a particular user, such as from an issuing entity for qualifications of that type. As discussed in greater detail elsewhere, in some embodiments any user is allowed to author any qualification for any user (including themselves), with other corroborative and/or reputational information able to be used to determine how much weight to give to a particular qualification. If it is determined in step 520 that the received indication was related to specifying a qualification, the routine continues to step 525 to obtain the received qualification information and to store it for the indicated user. As discussed in greater detail elsewhere, such qualifications may include an indication of a qualification type for the qualification, of a rating or value for the qualification, the issuer of the qualification, an indication of a particular system that stores the qualification (e.g., the TFF system), etc. After step 525, a determination is made in step 530 whether to attempt to corroborate the qualification information at this time, such as based on other information that may serve as evidence of the accuracy or validity of the qualification. If so, the routine continues in step 535 to execute Information Corroboration Manager routine 535, and if not continues to step 599. In other embodiments, such corroboration functionality may not be provided or may be performed at other times.

If it was instead determined in step 520 that the received indication was not a request to specify a qualification for a user, the routine continues instead to step 590 to perform another indicated operation as appropriate, such as to update information about or remove existing qualifications, or to provide information about user qualifications to a user or other system. In addition, in some embodiments the routine may issue qualifications to at least some users, such as based on past activities of the user with regard to the TFF system that had been tracked, such as automatically (e.g., on a periodic basis) and/or in response to a received request from a user to issue one or more qualifications of a specified type for one or more specified user based on specified types of tracked activity, and if so could perform such qualification issuance in step 590. After steps 515, 535, or 590, the routine continues to step 599 and ends. While the illustrated embodiment may include qualifications and qualification type definitions being specified one at a time, in other embodiments qualifications and/or qualification type definitions may instead be specified in other manners, such as to allow multiple qualifications and/or qualification type definitions to be submitted together (e.g., to allow for batch processing).

Figure 6:
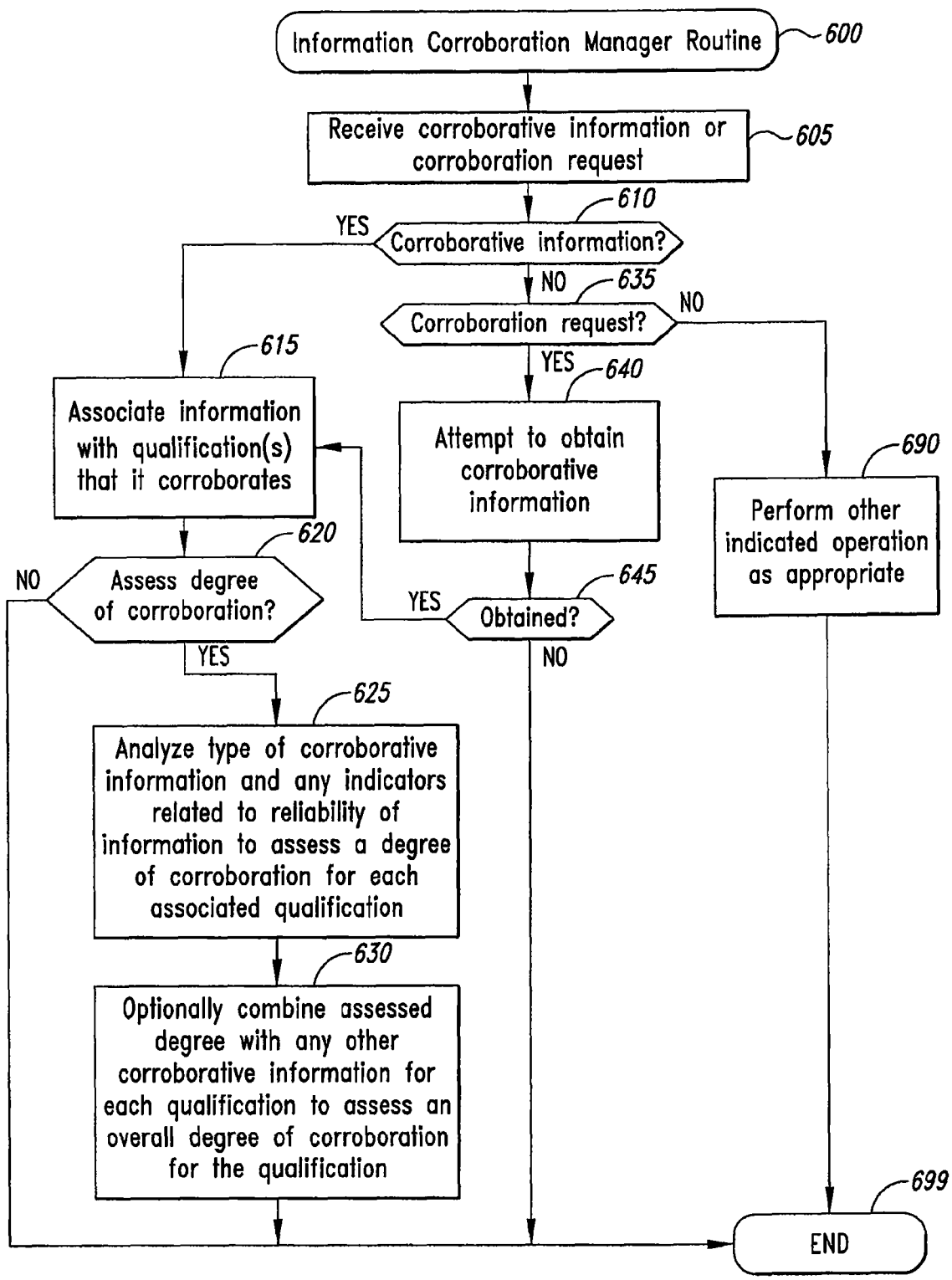
FIG. 6 is a flow diagram of an embodiment of an Information Corroboration Manager routine.

FIG. 6 is a flow diagram of an embodiment of an Information Corroboration Manager routine 600. The routine may, for example, be provided by execution of an embodiment of the User Information Corroboration Manager module 137 of FIG. 1B, such as to receive information and requests related to corroborating user qualifications and other types of user information, and to respond as appropriate.

The routine begins at step 605, where an indication is received of a corroboration request or of corroborative information for a specified type of user information. In step 610, the routine determines whether corroborative information was received, such as for a particular user qualification or other piece of user information. If so, the routine continues to step 615 to associate the corroborative information with the user qualification or other user information that it corroborates, such as for later presentation to others along with that user information to allow the recipient to assess its credibility.

The routine then continues to step 620 to determine whether to automatically assess a degree of corroboration provided by the corroborative information if possible, although in some embodiments such automatic assessment functionality may not be provided. In the illustrated embodiment, if the corroboration is to be automatically assessed, the routine continues in step 625 to analyze information about the corroborative information in order to assess a degree of corroboration that the information provides for the user qualification or other information to which the corroborative information applies. For example, the analysis may be based at least in part on the type of corroborative information and indicators about the reliability of that information, such as the source of the information (and other associated information about the source, such as a reputation of the source). After step 625, the routine continues to step 630 to optionally combine the assessed degree of corroboration for the newly received corroborative information with any other corroborative information for each user qualification or other user information to which it applies in order to assess an overall degree of corroboration for those user qualifications or other user information, such as by using any of various information combination techniques (e.g., averaging, weighted averaging, etc.).

If it was instead determined in step 610 that the received indication was not corroborative information, the routine continues instead to step 635 to determine whether a request was received to attempt to perform corroboration for indicated user information at this time, although in other embodiments such requests may not be handled. In the illustrated embodiment, if a corroboration-related request was received, the routine continues to step 640 to attempt to obtain appropriate corroborative information, and if it is determined in step 645 that it was obtained, the routine returns to step 615 to process the corroborative information. Attempts to obtain corroborative information may be performed in a variety of ways, such as based on the type of information to be corroborated (e.g., attempting to corroborate a user's identity based on querying the user to provide evidence of the identity in various forms, attempting to corroborate a qualification of the user by testing the user with respect to that qualification, attempting to obtain information from a third party that may have additional related information, etc.).

If it was instead determined in step 635 that a corroboration-related request was not received, the routine continues instead to step 690 to perform another indicated operation related to corroboration as appropriate, such as to provide corroborative information or an assessed degree of corroboration to users or other systems. After steps 630 or 690, or if it was instead determined in step 620 not to assess the degree of corroboration or in step 645 that corroborated information was not obtained, the routine continues to step 699 and ends. While not illustrated here, in other embodiments additional types of functionality could be provided, such as to provide a response to the sender that provided the corroborative information or corroboration-related request in step 605, such as to indicate the results of the analysis of provided corroborative information and/or the results of attempting to satisfy a received corroboration-related request. While the illustrated embodiment may include corroborative information being specified one piece at a time, in other embodiments corroborative information may instead be specified in other manners, such as to allow multiple pieces of corroborative information to be submitted together (e.g., to allow for batch processing).

Figure 7:
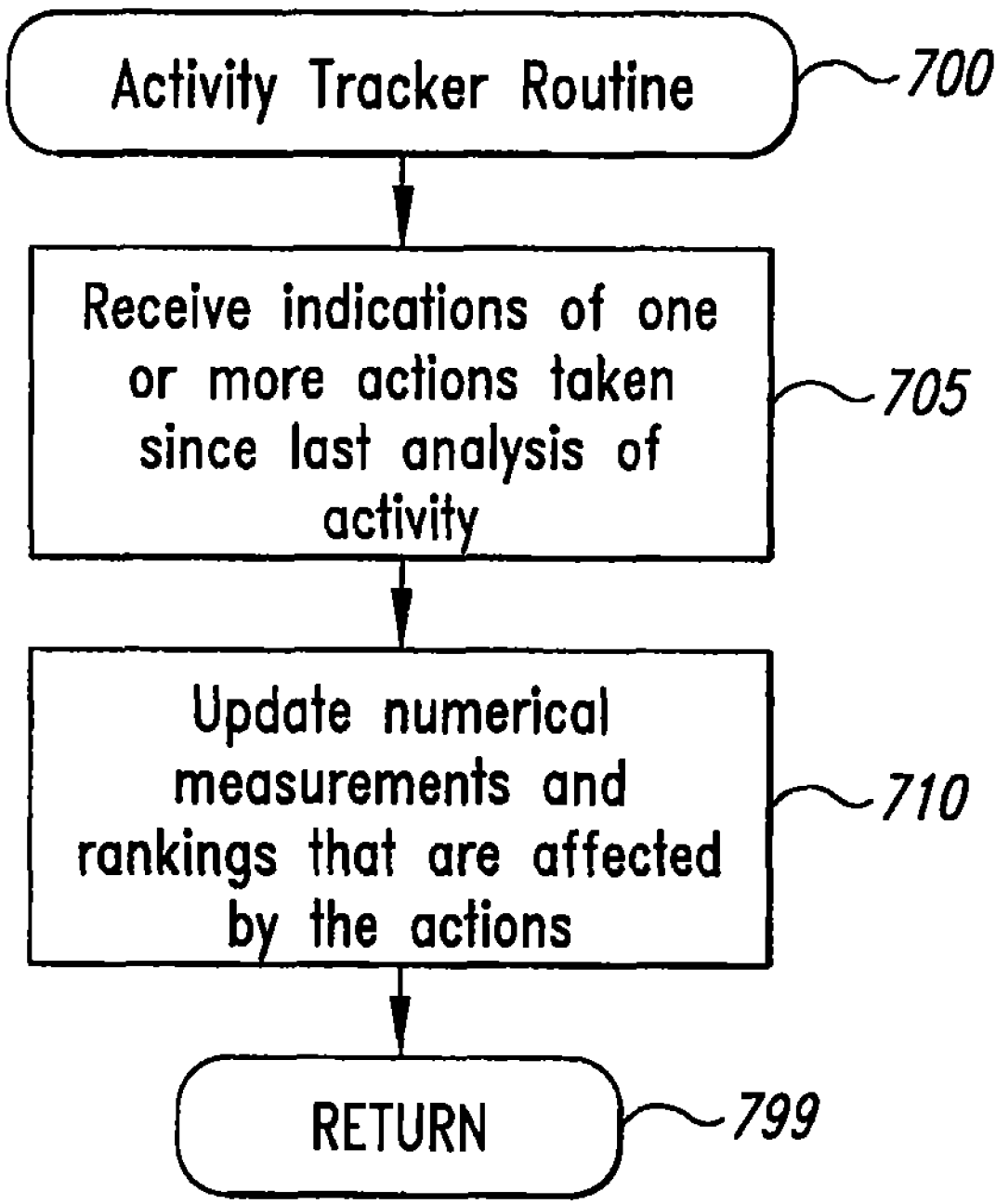
FIG. 7 is a flow diagram of an embodiment of an Activity Tracker routine.

FIG. 7 is a flow diagram of an embodiment of an Activity Tracker routine 700. The routine may, for example, be provided by execution of an embodiment of the Activity Tracking Manager module 138 of FIG. 1B, such as to track user activities related to task performance. The routine begins at step 705, where an indication is received of one or more actions taken by task requesters and/or task performers since a last activity tracking analysis. The routine continues in step 710 to store the activity information and to update quantitative measurements and/or rankings for users that are affected by the indicated actions. The routine then continues to step 799 and ends. In some embodiments, the routine may be executed at various times, such as periodically, in response to an activity to be tracked and/or in response to a request to perform the routine.

Figure 8:
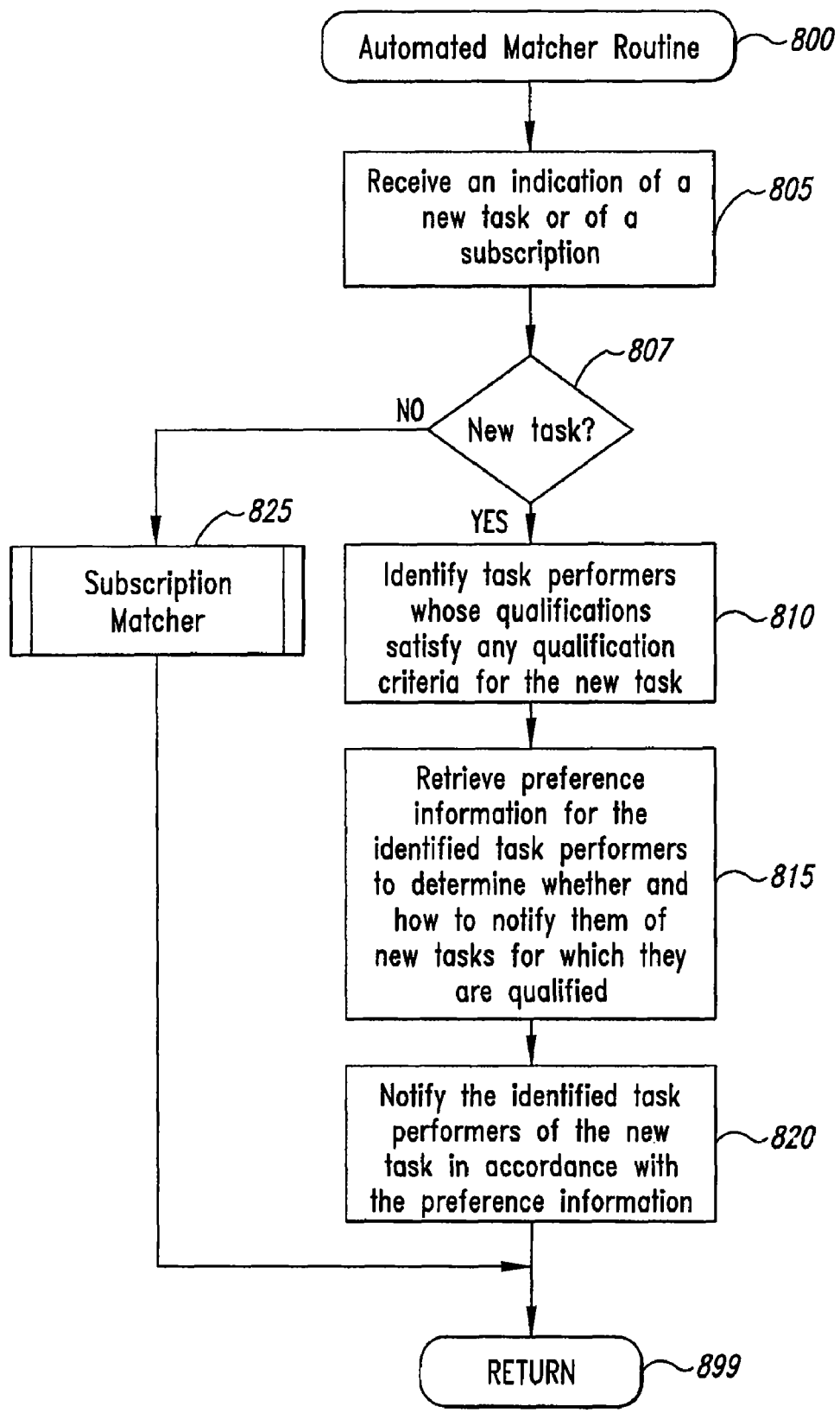
FIG. 8 is a flow diagram of an embodiment of an Automated Matcher routine.

FIG. 8 is a flow diagram of an Automated Matcher routine 800. The routine receives indications of new task requests and attempts to automatically match the tasks to appropriate task performers. The routine may, for example, be provided by execution of an embodiment of the Task and User Matching Manager module 132 of FIG. 1B, such as to match tasks and task performers as appropriate. In some embodiments, the routine may be performed in response to receiving new submissions of some or all tasks and/or at other times (e.g., in response to requests to perform the matching). In addition, in some times the automated matching may be performed in other ways, such as to receive an indication of one or more task performers (e.g., new task performers for the system) and to match appropriate tasks to those performers.

In the illustrated embodiment, the routine begins at step 805, where an indication is received of a new task or of a subscription, although in other embodiments multiple subscriptions may instead be indicated (e.g., by indicating a user who has multiple active subscriptions whose information is retrieved by the routine). In step 807, the routine determines whether an indication of a new task was received. If not, the routine continues to step 825 to execute a Subscription Matcher routine, such as is described with reference to FIG. 15, and if so continues to step 810. In step 810, the routine identifies one or more task performers whose qualifications satisfy any qualification criteria for the new task. In some embodiment the matching of qualifications may be performed without the routine understanding the meaning or context of the qualifications (e.g., based on identifying qualifications from task criteria and for task performers that are of the same qualification type and that have compatible values or ratings), such as in embodiments in which the qualifications are of types defined by users. The routine then continues in step 815 to retrieve preference information for the identified task performers to determine whether and how to notify them of the new task. In step 820, the routine notifies the identified task performers of the new tasks in accordance with the preference information. While not illustrated here, in other embodiments the automated matcher subroutine could further automatically assign new tasks to one or more human task performers as appropriate, such as based on prior requests by the task performers. In addition, in some embodiments the automated matcher routine may perform one or more of the indicated activities for a fee, such as from the task requester who supplied the new task and/or the task performers who are notified of the task. After steps 820 or 825, the routine continues to step 899 and ends. While the illustrated embodiment may include tasks and tasks performers being matched one at a time, in other embodiments tasks may be instead matched to task performers and/or task performers may instead be matched to tasks in various other manners, such as to allow multiple tasks and task performers to be matched together (e.g., to allow for batch processing).

Figure 15:
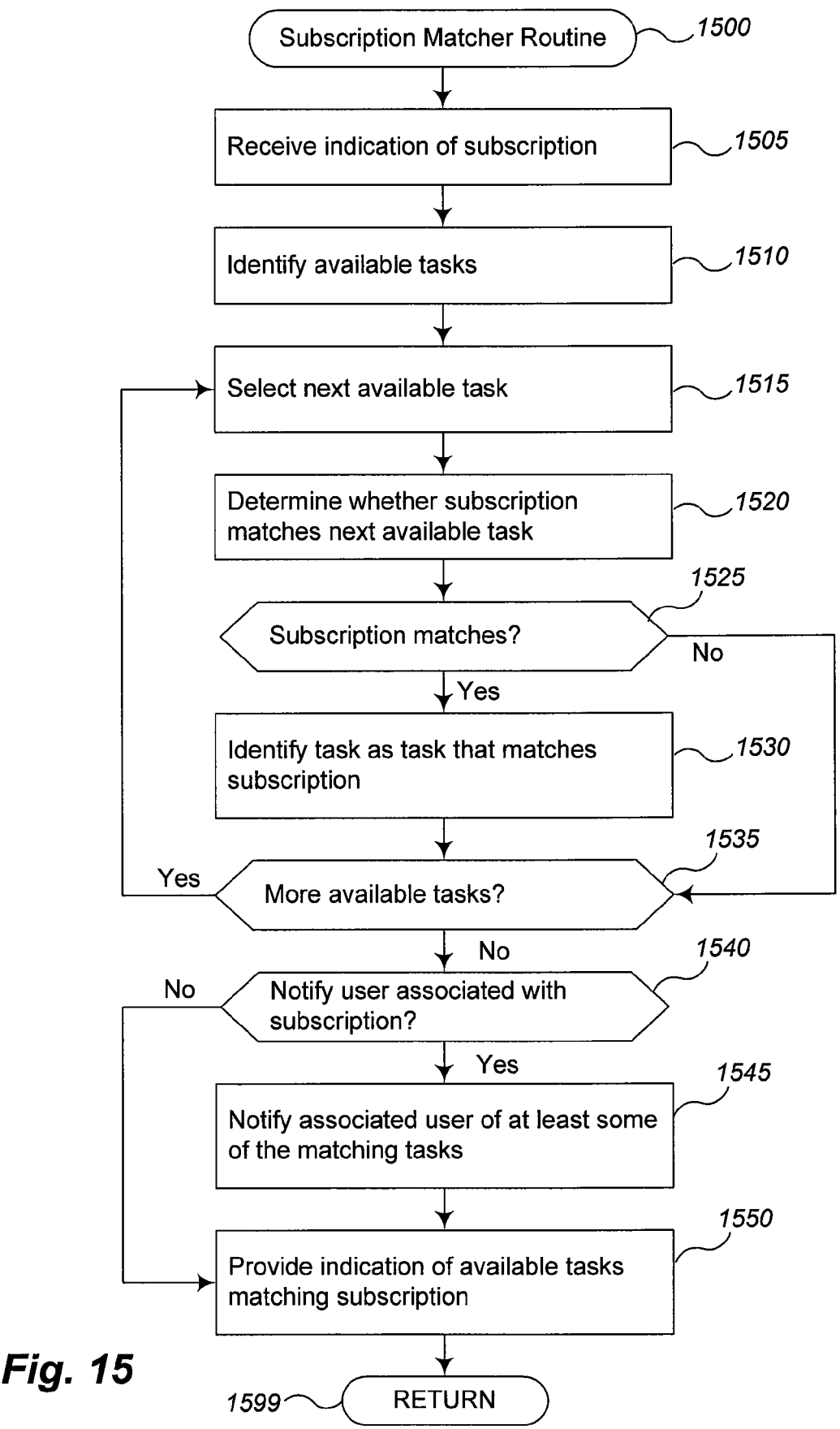
FIG. 15 is a flow diagram of an example embodiment of a Subscription Matcher routine.

FIG. 15 is a flow diagram of an embodiment of a Subscription Matcher routine 1500. The routine receives an indication of a subscription, and identifies tasks that match the indicated subscription, although in other embodiments the routine may operate in other manners (e.g., by receiving an indication of multiple subscriptions, such as for one or more users, or of one or more users who each have one or more subscriptions to which tasks are to be matched). The routine may, for example, be provided by execution of an embodiment of the Task and User Matching Manager module 132 of FIG. 1B or of a separate Subscription Matcher module (not shown). In the illustrated embodiment, the routine may be performed in response to a request from an embodiment of an Automated Matcher routine, such as the one described with reference to FIG. 8, or instead may be performed in other ways and/or at other times. For example, the routine may be performed periodically (e.g., every hour to process a batch of newly submitted tasks) and/or in response to a request received from a user (e.g., when a user requests to obtain information about available tasks).

In the illustrated embodiment, the routine begins at step 1505, where it receives an indication of a subscription. As described in more detail elsewhere, subscriptions may have one or more attributes of tasks that are of interest to a particular task performer, or may otherwise specify information about tasks of interest. In addition, while not illustrated here, in some embodiments it may be determined whether it is currently appropriate to use the subscription, such as if the subscription is currently active and is configured to be used at the current time. In step 1510, the routine obtains information about available tasks, although in other embodiments subscriptions may be applied to other types of tasks (e.g., previously performed tasks), whether instead of or in addition to available tasks.

In steps 1515 to 1535 the routine performs a loop in which it processes each of the available tasks to identify available tasks that match the indicated subscription. In step 1515, the routine selects the next available task, beginning with the first.

In step 1520, the routine determines whether the indicated subscription matches the selected task. This determination may be performed in various ways. For example, in some embodiments, a subscription will be determined to match a task if and only if each attribute of the subscription exactly matches an attribute of the task, while in other embodiments a task may match a subscription if only some subscription attributes are matched and/or if the match of task attributes to some or all of the subscription attributes is inexact. In step 1525, the routine then determines whether the subscription matches the selected task, and if so continues to step 1530 and identifies the task as a task that matches the subscription. If it is instead determined in step 1525 that the task does not match the subscription, or after step 1530, the routine continues to step 1535 and determines whether there are additional available tasks to be processed. If so, the routine returns to step 1515, and otherwise continues to step 1540.

In step 1540, the routine determines whether to notify the user associated with the subscription of the identified tasks, such as based on whether any tasks are identified and/or on notification information associated with the subscription. As previously discussed, in some embodiments a subscription may specify one more notification mechanisms to be used to notify an associated user of matching tasks, as well as information about when such notifications are to occur. If it is determined in step 1540 to notify the associated user, the routine continues to step 1545 and notifies the associated user of at least some of the identified tasks in accordance with the notification mechanism(s) specified in the subscription. Alternatively, a notification mechanism may be selected in other ways in at least some embodiments, such as a mechanism recently used or indicated by the user (e.g., if the user sent an email requesting information about tasks matching a subscription, an email message containing such information may be formulated by the routine as a response), or based on other preferred or default mechanisms for the user (e.g., if the user specified Web-based access as a preferred communication mechanism during initial registration). In addition, some embodiments may not notify the user of every matching task, such as to only notify about a predetermined number of tasks (e.g., the top five) that most closely match the subscription. In addition, characteristics of the particular notification mechanism utilized may also impact the number of matching tasks of which the user is notified (e.g., a limited number of descriptions of matching tasks may be included in a text message to account for message size limitations), as well as the amount of detail about each matching task that is provided (e.g., images or other information associated with a task description may be scaled down or otherwise reduced to account for bandwidth and/or display limitations associated with mobile devices). Such notification mechanism characteristics and/or other factors may also be used to determine how often to notify a user, such as to aggregate information about identified tasks and to report only the information only occasionally, such as to send at least or at most a particular number of messages and/or amount of data per time period (e.g., based on user-specified preferences, the type of electronic message or other communication mechanism being used, etc.). In addition, while not illustrated here, in some embodiments the routine may further retrieve information regarding previously identified tasks about which the user has not yet been notified, and include information about some or all such tasks as part of the notification performed in step 1545.

If it is instead determined in step 1540 to not notify the user associated with the subscription, or after step 1545, the routine continues to step 1550 and provides an indication of the identified matching available tasks. This indication may be provided to, for example, a module that initiated performance of the routine, such that the module may store matching tasks for later provision to the user. In addition, in some embodiments, other modules may be notified so that the tasks may be reserved for and/or assigned to the user, or for other purposes. After step 1550, the routine continues to step 1599 and returns.

Figure 16:
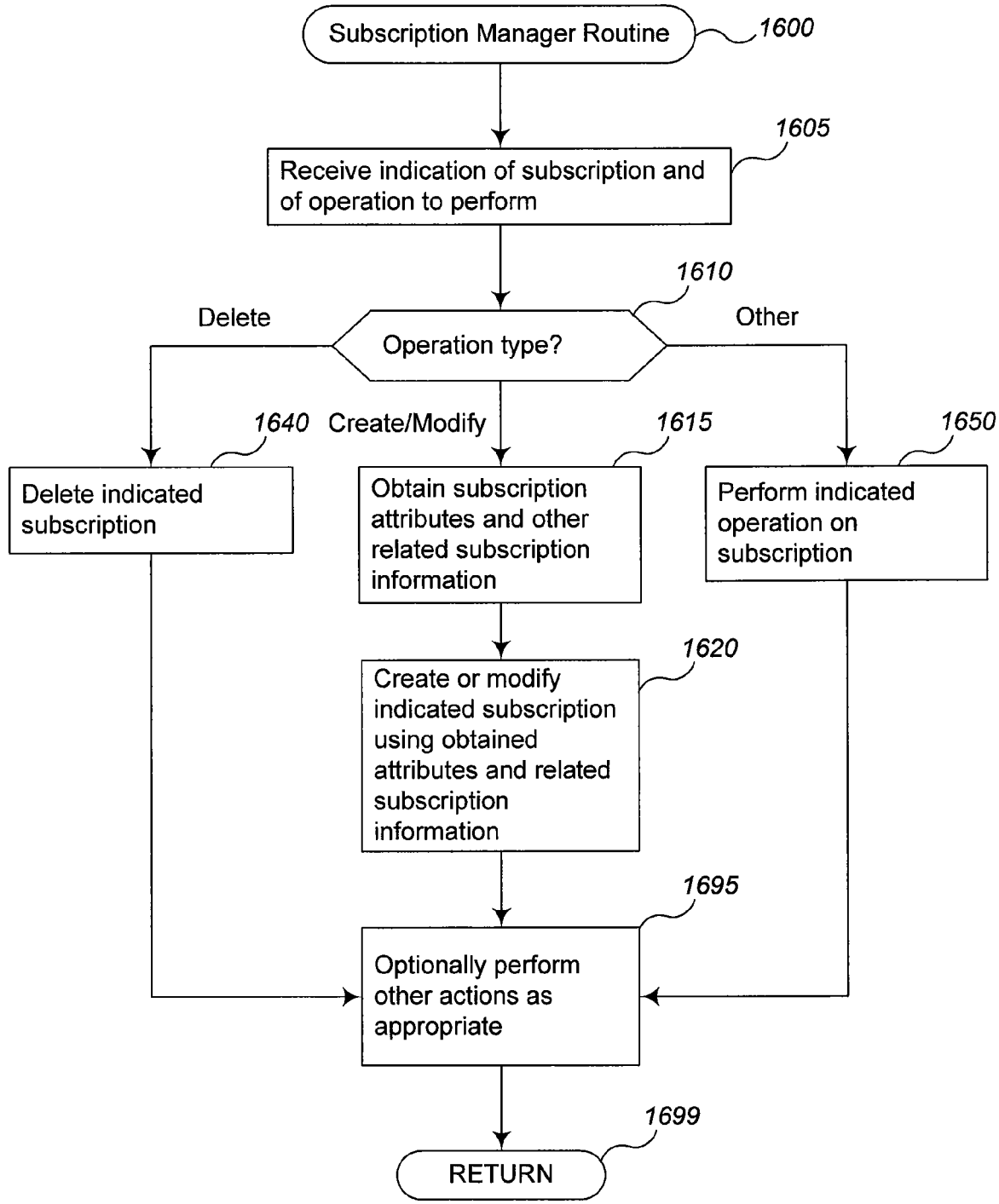
FIG. 16 is a flow diagram of an example embodiment of a Subscription Manager routine.

FIG. 16 is a flow diagram of an embodiment of a Subscription Manager routine 1600. The routine performs operations related to the management of subscriptions, such as creation, modification, and deletion of subscriptions. The routine may, for example, be provided by execution of an embodiment of the module 131 of FIG. 1B or of a separate Subscription Manager module (not shown), such as in response to requests received from a user via a graphical user interface and/or a programmatic API.

In the illustrated embodiment, the Subscription Manager routine 1600 begins at step 1605, where it receives an indication of a subscription and of an operation to perform on that subscription. In step 1610, the routine determines the type of the operation to be performed. If it is determined in step 1610 that the indicated operation is to create a new indicated subscription or to modify an existing indicated subscription, the routine continues to step 1615 and obtains information about attributes to specify for the subscription and/or other information related to the subscription (e.g., indications of the identity of a user that is creating or is otherwise to be associated with the indicated subscription, subscription name, notification mechanisms, etc.). In some embodiments, the subscription attributes and other related information may be obtained by the routine as part of the initial request received in step 1605, while in other embodiments the information may be obtained in other manners (e.g., by displaying a graphical user interface and interactively obtaining the information from the user, by retrieving stored information from other sources such as one or more databases, etc. In step 1620, the routine either creates a new subscription or modifies an existing subscription using the indicated attributes and associated other information, although in other embodiments the routine may instead not perform such actions based on user input or for other reasons (e.g., not receiving payment from the user for an action that has an associated fee). The routine then continues to step 1695 to optionally perform other activities, such as to optionally immediately execute the subscription (e.g., by invoking the Subscription Matcher routine) if requested by the user and/or as otherwise determined in an automated manner.

If it is instead determined in 1610 that the indicated operation is to delete the indicated subscription, the routine continues to step 1640 and deletes the indicted subscription. This may include deleting or otherwise identifying as deleted various information about the subscription, including any indications of tasks as being previously identified for the subscription. If it is instead determined in step 1610 that the indicated operation is some other operation, the routine continues to step 1650 and performs the indicated operation related to the subscription as appropriate. Other operations may include requests to obtain information about a subscription (e.g., to read or otherwise access the attributes of a subscription), to activate or deactivate a subscription, to provide an accounting of statistics or other information related to the operation of a given subscription (e.g., how many tasks have been matched by the subscription in a given time period), to immediately execute the subscription to identify current matching tasks, to schedule one or more future executions of the subscription to identify tasks matching the subscription at that time, etc.

After steps 1620, 1640, or 1650, the routine continues to step 1695 and optionally performs other indicated actions as appropriate. Other actions may include providing a response indicating the success or failure of a performed operation, providing a response that includes information requested by an operation (e.g., to access information about the attributes of a subscription), housekeeping operations (e.g., automatically deleting subscriptions that have not been used for a predetermined time interval), etc. After step 1695, the routine continues to step 1699 and returns.

As previously noted, a variety of types of tasks can be submitted and performed in various embodiments, and may include tasks that involve a variety of types of activities by human task performers, such as analysis of one or more supplied pieces of information (e.g., to translate a supplied word or paragraph, to select which of several supplied photographs best represents a specified subject matter, or to identify whether a supplied human signature is authentic, such as by comparison to a known sample and/or on another basis), or retrieval or identification of desired information. In some embodiments the tasks may each require little time of the human task performer (e.g., at most a few seconds), while in other embodiments tasks may be sufficiently complex to take significant amounts of time (e.g., hours or days). In addition, while in some embodiments each of the tasks may be a cognitive human performance task that uses cognitive and/or other mental capabilities of human task performers, in other embodiments some or all of the tasks may include physical activities by one or more human task performers (e.g., to take and supply a specified type of picture), whether instead of or in addition to one or more cognitive or other mental activities of one or more human task performers.

In addition, in some embodiments each task may be a stand-alone activity that is unrelated to other tasks, while in other embodiments some tasks may each be a small part of a larger collective, such as to allow a large number of unrelated human task performers to perform a time-consuming collective task in parallel in a very short time (e.g., without the individual task performers even being aware that the individual tasks are part of a larger collective task), such as in a manner analogous to grid computing. When individuals tasks are part of a larger collective task, a single task requester may in some situations collect and aggregate or analyze the individual results, while in other situations some or all of the aggregation or analysis activities may instead be one or more other tasks made available through the electronic marketplace. Other information related to users performing tasks is included in pending commonly-owned U.S. patent application Ser. No. 09/976,717, filed Oct. 12, 2001 and entitled "A Hybrid Machine/Human Computing Arrangement."

A non-exclusive list of examples of types of human performance tasks that may be performed via the electronic marketplace include the following: translation or conversion of information of various forms (e.g., text, speech and other audio, images and other video, etc.) between languages and/or information form (e.g., transcription of audio material); selection of one or more groups of visual information (e.g., photographs or other images) and/or audio information (e.g., songs, voice messages, etc.) that satisfy a specified criteria (e.g., to identify groups that are similar, that have specified characteristics, etc.); supplying answers to specified questions (e.g., to obtain information for use in research, for marketing purposes, for use as feedback, for use with computer-human interface and other types of user studies, for use as pre-release and/or post-release reviews of or reactions to products and/or content, etc.) and/or supplying other types of specified information (e.g., a missing description for a specified item available from a Web store); outsourced tasks of various types (e.g., engineering, marketing, sales, customer support, etc.); and analysis of content of various forms of information to identify specified types of content (e.g., spam, pornography and other obscene or offensive material, etc.) and/or to otherwise categorize the information (e.g., according to a predefined taxonomy; based on a determined source or other aspect of the information; etc.). When information is to be analyzed as part of a task, that information can be provided to a task performer in a variety of ways, such as from the TFF system along with other task-related information, by providing a link or other indicator to the task performer to allow the task performer to retrieve the information (e.g., from the TFF system, from the task requester for the task, from a location or source external to the TFF system, etc.).

As one specific example, a task requester may submit tasks on behalf of a store (e.g., a Web store) that each request at least two human task performers to submit a specified type of data that is missing for one or more items offered by the store (e.g., performance specifications for a stereo). The first two human task performers that submit the same (or sufficiently similar) data for a task will each receive payment (e.g., $0.25), thus providing information with some degree of reliability in a manner that minimizes overhead for the task performers and the task requester. As another examples, tasks may include analyzing results of task performance from other task performers, such as to corroborate or verify the accuracy or other aspect of interest of the results (e.g., to have a human task performer with a higher level or qualification and/or additional qualifications review the results from less-qualified task performers), to compare results from multiple task performers for the same or related tasks (e.g., to compare performance of human task performers to automated task performers, such as for research purposes, or to compare performance of different groups of human task performers), to analyze results in an attempt to determine whether the task performer is human or not (e.g., for research purposes, or to verify or corroborate the identity and/or qualifications of a task performer), etc.

As previously noted, in some embodiments a variety of types of user qualifications can be specified and used, and may further in some embodiments each be associated with a specified qualification type. Such qualification types may include a variety of associated information in various embodiments, including a name (e.g., for later reference purposes), a rating scale to indicate allowed values (e.g., any floating point number, true/false, an enumerated ranked set of values, etc.), indications of one or more entities or entity types who may issue specific qualifications of the qualification type to users, expiration conditions (e.g., an expiration date/time) or other indications of how and when qualifications of the type are effective, an indication of the user (e.g., a unique user identifier) who specified the qualification type (e.g., to limit who can modify, delete and/or view information about the qualification type), etc. In some embodiments, each qualification may be stored in or as part of a qualification data structure that may contain some or all of the indicated types of associated information, whether using a qualification data structure specific to a specified qualification type or independent of any specific qualification type. In addition, for embodiments in which multiple instances or versions of the TFF system are operating, or in which other types of systems with overlapping types of functionality may interact, the specified qualification types may further have an associated indication of the system at which the qualification type is specified. Moreover, in some embodiments users may be allowed to define new qualification types for use within the system.

As previously noted, task performer qualifications can also take various forms in various embodiments, including self-assertions by a user of qualifications that they possess, human-generated ratings of human task performers by other humans based on prior task performances by the task performers (e.g., feedback from task requesters who supplied the tasks and/or ratings by other reviewers of the past performances), and credentials supplied by third-party authorities (e.g., educational degrees or other accomplishments from specified educational institutions, awards and other recognitions from specified organizations or contests, recognitions of levels of training or knowledge, etc.). One form of credential that may be used in some embodiments is a reputation or other rating of a user that is supplied by a third party as a service, such as for a fee. A discussion of techniques related to generating and providing user rating information that could be used in some embodiments for user qualifications is included in pending commonly-owned U.S. patent application Ser. No. 10/646,341, filed Aug. 22, 2003 and entitled "Managing Content Based On Reputation," which is hereby incorporated by reference in its entirety.

Task performer qualifications may also include various quantitative measurements by the electronic marketplace of tracked activities of human task performers, including measurements related to a specific task, average and/or cumulative measurements over a specified group of multiple tasks and/or a specified period of time, and information about a rate of change for one or more measurements over one or more specified periods of time. A non-exclusive list of types of measurements that may be used in various embodiments include the number of tasks assigned to a task performer, the number or percentage of tasks assigned to a task performer that are completed, the number or percentage of tasks completed by a task performer that are approved or rejected (e.g., by the task requester), the number or percentage of assigned tasks that are explicitly abandoned (or "dropped") by a task performer before completion, the number or percentage of assigned tasks that are withdrawn from a human task performer before completion (e.g., by the electronic marketplace for failure to complete the task within a specified time limit), the number or percentage of tasks that are offered to a task performer that are refused (if an embodiment includes offering tasks to task performers), an amount of time taken before performing assigned tasks (e.g., an average or distribution over time), etc. In some embodiments, task requesters may also be given qualifications based on quantitative measurements by the electronic marketplace of tracked activities, such as the number of submitted available tasks from a task requester, the number or percentage of submitted tasks that are removed before assignment by a task requester, the number or percentage of completed tasks that are approved or rejected by a task requester, the number or percentage of submitted tasks that are modified by a task requester, the timeliness of a task requester in providing payment when due, etc. In addition, in some embodiments task performers may be able to provide qualifications for task requesters by rating them, such as for task performers that have been involved in performance of tasks submitted by those task requesters. Such ratings may be based on, for example, the reasonableness of the task requester in categorizing their submitted tasks, in providing appropriate compensation for the level of task difficulty, in providing payment after satisfactory task results are provided, etc.

In some embodiments, the electronic marketplace may also provide rankings of task performers relative to other task performers on the basis of one or more of the various types of qualifications, and a task performer's ranking level could further be used as a qualification (e.g., a performer in the top 10% for a specified quantitative measurement). More generally, a performer qualification can in some embodiments include any information about a performer that can be measured or identified.

Thus, as previously noted, a variety of types of information may serve as qualifications in some embodiments. More generally, in some embodiments any user may specify any qualification for any user (including themselves), with the qualification measuring any dimension or aspect, using any rating scale, and may further include objective and/or subjective qualifications. The meaning or context of a qualification may in some embodiments be maintained externally to the TFF system (e.g., by the issuers of the qualifications and/or task requesters that use them as criteria for tasks being submitted), such that the TFF system performs tracking of and matching of qualifications as arbitrary data values without knowledge or use of the meaning of the qualifications. Thus, in such embodiments any user can act as their own issuing authority to issue qualifications, and to later use the qualifications by searching for users that have them and/or tasks that include them in their task criteria. In addition, in some embodiments qualifications may be issued to and used for entities that are not directly associated with users of the TFF system, such as qualifications for various types of third-party entities (e.g., issuers of qualifications).

In addition, in some embodiments the activities of users with other systems may be used as qualifications or in other manners, such as based on importing data from such other systems. For example, in some embodiments the TFF system may be affiliated with or otherwise receive information related to shopping-related activities of users, such as with a Web retailer or other online merchant. Types of information that may be obtained and used from a retailer's system include the user's browsing history, search history, clickstream history, click-through history, purchase or rental history, payment and/or credit history, returns history, history of service-related activities (e.g., frequency and number of calls to customer service), use of discounts and purchase incentives, contributions of content and/or information (including various details about such contributions, such as length, subject matter, frequency of submission, quality as judged by other users, etc.) provided by the user (e.g., reviews of items, lists or groups of items of interest, etc.), participation in various community-based features, reputation within the system (e.g., based on voting or other rating by other users), browser and browsing device used, etc. Similarly, qualification and other information from the TFF system may in some embodiments be able to be exported to other systems for use by those other systems. In addition, when such types of information are available, they can also be used in other ways. For example, if recommendation information is available for a user based on a relationship of the user to other users, such recommendation information may be used as qualification information for the user (e.g., this user is likely to want to do tasks of a certain type) and/or to recommend tasks to a task performer (e.g., other task performers similar to you perform tasks of this type).

A non-exclusive list of various example qualifications includes the following:

C++ programming Level 2 test certification, issued by Professor Bob Smith of Stanford University, test score 95% (Jan. 13, 2005, 10:03 GMT; expires 5 years from issuance)

C++ programming recommendation certificate, issued by Kernighan & Ritchie, "Expert" rating (Jan. 13, 2005, 10:03 GMT; no expiration date)

Able to distinguish pornography from non-pornography according to community standards prevalent in St. Louis, Mo., issued by myself, "I know it when I see it" (Jun. 27, 2006, 14:18 PDT)

Completes tasks requiring a self-issued "Able to distinguish pornography from non-pornography according to community standards prevalent in St. Louis, Mo." qualification with over 90% acceptance rate, issued by TFF system, 1000 tasks completed with acceptance rate of 98% (Jun. 27, 2006, 14:18 GMT, based on performance results in TFF system from Jan. 14, 2005, 9:00 GMT through the present)

Dialysis patient unable to eat solid food, issued by the Mayo Clinic, (no value) (Jan. 15, 2005, 22:47 EST)

Scholastic Aptitude Test taken, issued by Educational Testing Service, Princeton, N.J., scores verbal=508, math=518 (Oct. 1, 2004, expiry date 6 years from issuance)

Qualified to practice law in the state of California, issued by the State Bar of California, "active member" and "member in good standing" (Oct. 3, 2004; date of bar admission May 15, 1994; continued status contingent on compliance with continuing legal education requirement, with next compliance period ending on or before Jan. 31, 2005).

Has published at least two reviews of popular English-language novels in The New York Times Book Review, issued by The New York Times, total number of such reviews published by the reviewer to date (Jun. 15, 2005, 12:01 EDT).

Is a considerate person, issued by Jeanette Smith of Geneva, Switzerland, "très sympa" (Feb. 29, 2004, 12:32 CET).

Information about qualification-related activities can also be tracked and stored in various ways. For example, performance-related qualification scores could be tracked for all tasks, regardless of task type and/or required qualifications. Alternatively, activities could be tracked for particular types of tasks or groups of related tasks (e.g., to determine that a task performer completes tasks with qualification 'A' 95% of the time but completes tasks with qualification 'B' only 80% of the time). Similarly, activities could be tracked for categories of tasks, such as to determine that a task performer completes 'pornography identification' tasks correctly 100% of the time, but only completes 'czech-english translation' tasks satisfactorily 80% of the time.

When searching for information related to qualifications and/or tasks, the TFF system in some embodiments allows a variety of types of searches to be performed. A non-exclusive list of example searches that a user could execute includes the following:

All tasks that I created/accepted, and status/progress of same (e.g., by a task requester and/or task performer)

All tasks currently available for acceptance, including the necessary qualifications for each task and the payment/reward for each (e.g., by a task performer)

All qualification types in the system that have been added in the last 24 hours (e.g., by any user)

All users to whom new qualifications have been issued in the last week (e.g., by any user with sufficient permissions)

All users having a nickname attribute with a value of "Jill" (e.g., by anyone with sufficient permissions to see user nicknames)

Which available tasks have prices <$1? How many task performers currently in the system and not currently working on a task would qualify for one or more of these tasks? (e.g., by a task requester)

How many task requesters of available tasks have qualification B? (e.g., by a task performer, such as a task performer who will only do tasks from certain task requesters)

How many users have qualifications X and (Y or Z) but not W? Of these, which ones have qualification X with a value above 90%? (e.g., by anyone)

Which task performers completed tasks requiring qualification X this week? What percent of their total completed tasks were approved by the requesters? (e.g., by anyone)

Of all qualification types containing "C++" in the name field, what percent were created in the twelve-month period ending Jun. 30, 2004? (e.g., by anyone)

How many qualifications containing the string "St. Louis" in their name were issued last month by or on behalf of Issuer ABC? (e.g., by anyone)

In some embodiments, the system further provides functionality to assist in authenticating or otherwise corroborating information about users, such as identities of users, specified qualifications of users, and other kinds of attributes of users. In particular, various information may be obtained and used to serve as evidence to corroborate one or more pieces of information about users, such as by obtaining information about a user's past activities (e.g., feedback and/or rating information related to the activities), "testimonials" or other assertions from others as to the accuracy of information about a user, information about a user's reputation, information about a user's status within a community or group (e.g., a social networking group), and more generally any observable indicia that can serve to corroborate user information. The corroborative information may be obtained in various ways, including from third-party sources and/or from a user whose information is being corroborated, and the obtaining of the corroborative information may be initiated in various ways, including as initiated by a user who is supplying corroborative information and/or initiated in an automated manner (e.g., based on a need for the corroborative information). In addition, in some embodiments corroboration is further enhanced by using additional techniques, such as by monitoring activities of a user and/or by occasionally challenging a user (e.g., by giving the user a short test) to verify information about the user (e.g., to obtain information to confirm or contradict a user's qualifications and/or identity).

As one example of corroborating users' identities based on evidence or other information from third parties, the third party may be an issuer of credit cards and/or debit cards, with such a card providing evidence that the cardholder name on the card is the actual name of the cardholder. A variety of other types of evidence or information associated with third parties may similarly be used to provide information about a user's identity, including information about a bank account or other financial account of a user, government-issued information for a user (e.g., a driver's license, passport, social security number, voting identity card, etc.), other government records (e.g., property records), etc. In such situations, a user may obtain such evidence from the third party and later provide the evidence to the system, or alternatively the system may in some embodiments directly interact with a third party to obtain such evidence for a user. For example, the system may interact with a third-party card issuer or government agency, or instead with a third party that provides a service involving verifying users' actual identities based on appropriate evidence and then providing assurances of the verified actual identity information to others upon request.

As previously noted, various types of evidence or other corroborative information related to users' identities can be obtained in various ways in various embodiments, and can be used in various ways to identify and/or corroborate a user's identity. For example, in some embodiments information about a user's identity may be obtained by using information stored by a telephone service provider. In some such embodiments, a user may be provided with a toll-free number of a system performing identity corroboration activities, and when the user calls that toll-free number, the entity can gather user identity information provided by the telephone service provider with that call (e.g., a number from which the user is calling and a name associated with that number), such as for use in corroborating an actual name that the user previously provided. Information may be gathered about users in similar manners from other third parties that have similar information, such as by using Caller ID technology with non-toll-free numbers, doing a reverse number lookup on a phone number provided by a user in order to identify the name of the user associated with that phone number, gathering information about a user based on an electronic communication sent by the user (e.g., based on an email address used by the user, a domain name of the user, an instant messaging or other message sender identity, etc.), and/or gathering information stored by other providers of services to the user (e.g., an Internet Service Provider, utility companies, educational institutions, medical facilities, etc.). More generally, in some embodiments the system may provide a predefined API and/or one or more Web services via which others can provide corroborative and other information about users.

In some embodiments, information about users' identities may further be obtained and/or corroborated based on groups to which the users belong and/or other affiliations of the users. For example, a user may be able to demonstrate membership or other affiliation with a group or organization that provides publicly available information about its members or other affiliated users, thus providing some corroboration that the user's asserted identity is accurate based on the asserted identity being in the publicly available membership or affiliation information. Alternatively, a user may be part of a social networking group or other group of users such that one or more other users of the group will attest to an identity of the user. In such embodiments, a user may provide contact and other information about one or more of such other users (e.g., email addresses), and a system performing identity corroboration activities may then use the provided information to assist in corroborating the user's identity, such as by using the contact information to query those other users to provide corroborative statements or other information about the user's identity. In addition, when information from other users is used to corroborate information about a user (e.g., based on a social networking group), an additional factor that may be considered is whether a group of users is merely acting as a self-corroborating body such that users of the group are corroborated only by each other, or whether other external evidence is available to provide additional corroboration.

After corroborative information is obtained, it may be used in various ways. In some embodiments, one or more pieces of corroborative information for a piece of user information (e.g., a user qualification) may be presented or otherwise provided with the user information, such as to allow the recipient of the user information to evaluate its accuracy, credibility and reliability based on the associated corroborative information. In other embodiments, the system may attempt to automatically assess the corroborative information in order to determine a confidence level or value or other assessment of the user information being corroborated, such as based on a type of the corroborative information, a degree of correspondence between the corroborative information and the information being corroborated, and/or on the source of the corroborative information (e.g., to affect the weight given the corroborative information, such as based on a reputation of the source). In addition, in some embodiments some of the types of corroboration-related activities may be performed for a fee, such as from the user whose information is being corroborated.

A particular type of performer qualification that is available in some embodiments relates to performance of a human task performer on one or more qualifying examinations. For example, a task requester who plans to submit multiple tasks of a similar type may first create a task with a known or desired performance result. That task may then be made available via the electronic marketplace as a qualifying examination task for performance by human task performers that are interested in performing other later tasks for the task requester. After a human task performer provides results for the qualifying examination task, those results can be graded relative to the known or desired results in order to determine whether and/or at what level the human task performer can successfully perform the task. A specified level of performance for the qualifying examination task (e.g., having a minimum specified score, or scoring at a minimum percentile relative to other human task performers) can then be used as a performer qualification criteria for later tasks by that task requester. Such qualifying examination tasks can be performed in various ways in various embodiments, including with or without a fee paid to successful performers of the task, with a fee paid by task performers for a task performance attempt and/or completion, as a task available to any task performers or to only task performers that meet other specified criteria (e.g., a first specified number of human task performers to successfully pass the test, to human task performers who have other specified qualifications, etc.), and as a task that is explicitly identified to task performers as a qualifying examination or that is not identified as such.

In addition to performer qualification criteria, task requesters can also specify a variety of other types of criteria for tasks. For example, in some embodiments task requesters may specify criteria related to when a task is to be performed, such as an expiration time period for initial assignment to a human task performer and/or an expiration time limit for a human task performer to provide results of task performance after a task has been assigned to them. A task requester may also in some embodiments specify information about a format in which results are to be supplied, including by supplying information to the task performer related to the results format (e.g., a response form to be completed by the human task performer, or an executable results program that the human task performer is to use to provide results and/or to perform the task). The performer qualification criteria and other types of criteria can also be specified in various forms, including as an exact match and as a minimum or maximum threshold, and for various activities related to a task (e.g., to allow task assignment; to verify performance results as being satisfactory; to determine whether a value of a task performer's qualification is sufficient, such as based on a generated confidence level or value for appropriateness of the qualification value; to determine whether a task performer's qualification is sufficiently corroborated, such as based on a generated confidence level or value based on a degree or amount of corroboration; etc.). Such thresholds may also be specified by other users (e.g., task performers) and/or automatically by the TFF system in other situations and embodiments.

In addition, in some embodiments task requesters may supply additional task-related information to assist task performers in identifying appropriate or interesting tasks, such as one or more categories for the task (e.g., based on a type of the task) and/or one or more keywords corresponding to the task. Such category and/or keyword information can then later be used by task performers when searching for and/or browsing for tasks of interest. In other embodiments, such category and/or keyword information may instead be automatically generated by the electronic marketplace based on analysis of information related to the task (e.g., by using a textual description of the task provided by the task requester, by using historical information about tasks supplied by task requesters, by using information that is supplied with the task to be analyzed, by using information about criteria specified for the task, etc.).

As previously noted, in at least some embodiments the task requests may also each specify one or more fees to be paid by the task requester to one or more task performers for successful performance of a task. In such embodiments, the fee can be specified to be paid under any of a variety of circumstances, including in a manner related to a specified state of a task (e.g., to the first task performer whose performance results are explicitly accepted by the task requester, to the first task performer whose performance results are automatically accepted by the electronic marketplace, to the first task performer who supplies performance results to the electronic marketplace, to the first task performer to whom a requested task is assigned, etc.). In other situations, multiple task performers may receive payment for performance of a task, such as the first X task performers that provide results (where X is a specified number by the task requester), multiple task performers whose results are in agreement and form a specified level (e.g., a majority) of performance results from X task performers, etc.

In other embodiments, payment for task requests can be determined in other ways, such as based on bidding by task performers (e.g., as part of a standard or Dutch auction), as a variable rate that is dependent on a degree or amount of success in providing satisfactory performance results, etc. In addition, in some embodiments the task requester may allow the electronic marketplace to specify the associated payment for a task (e.g., for a fee), such as based on a category of the task, on dynamic pricing based on current conditions at the time of task request, as part of a premium service for which the electronic marketplace guarantees some aspects of the results (e.g., a maximum time to receive performance results, a minimum level of performance results, etc.). Moreover, in some embodiments the system provides information to task requesters to assist them in manually pricing tasks, such as by providing historical pricing information for tasks of the same type or for other related tasks, by providing summary information about current pricing and current pricing trends, etc.

After payment is determined to be provided to one or more task performers for a task, the payment can be made in a variety of ways. In some embodiments the electronic marketplace or an associated system may provide accounts to task requester and/or task performer users, and if so payments may be made from those accounts of task requesters and/or to those accounts of task performers. In other embodiments, the electronic marketplace may also interact with third-party systems in order to effect payment, such as credit card companies, banks, etc. In addition, in some embodiments a variety of other types of payments could be made, whether in addition to or instead of payments from task requesters to task performers, such as payments to the electronic marketplace from task requesters and/or task performers for any of the functionality provided by the electronic marketplace, and/or such as payments to task requesters from task performers for performing tasks of the task requesters. More generally, in some embodiments payments and other rewards can be specified to flow from any one or more parties to any one or more other parties, whether task performers, task requesters, the TFF system, external parties, etc. A discussion of payment-related techniques that could be used to make payments in some embodiments is included in U.S. patent application Ser. No. 10/894,347, filed Jul. 19, 2004 and entitled "Automatic Authorization Of Programmatic Transactions," which is hereby incorporated by reference in its entirety.

After a task request has been submitted to the electronic marketplace, task performers can obtain information about available tasks in a variety of ways. In some embodiments, task performers will make requests to the electronic marketplace to identify tasks that are currently available that meet specified indicia, such as all currently available tasks or tasks whose specified qualification criteria are satisfied by the current qualifications of the task performer. While some such task information requests may be made interactively in some embodiments, in other embodiments at least some such requests may instead be made in a programmatic manner, such as by using a specialized program or instructions (e.g., a client-side program, macro, plug-in, etc.) that is designed to retrieve such information for a task performer (e.g., that is obtained from the electronic marketplace or from a task requester for their tasks). In addition to searching for a task based on qualifications of the task performer, the task performers can also specify a variety of other types of information about tasks to identify, such as tasks available from specified task requesters, tasks in specified categories or having specified keywords, tasks having specified associated payments or other associated criteria (e.g., expiration date), tasks from task requesters who satisfy specified requester qualification criteria, etc.

In addition to searching for tasks, task performers can also request that tasks be assigned to them in various ways, such as by identifying one or more specific tasks of interest and/or by identifying tasks that meet specified conditions (e.g., based on task criteria, an associated reward for a task, information about or an identity of a task requester who submitted the task, etc.). After a task has been assigned to a task performer, the task performer may then interact with the electronic marketplace (whether interactively or programmatically) to provide performance results information based on performance of the task. In addition, in some embodiments a task performer may specify in various ways that they desire to receive a string of assignments of related tasks, such as tasks of a specified task type. By creating such a "pipeline" of incoming tasks, the task performer may be able to perform the tasks more efficiently (e.g., if sufficient tasks are assigned to a task performer to allow them to constantly have a queue of available tasks to be performed), and correspondingly may be charged a fee in some embodiments for receiving such functionality. The creation of such a string of task assignments may be performed in various ways, such as by registering a notification and/or assignment request with the TFF system for a specified type of task, by repeatedly executing a search or assignment request with the TFF for a specified type of task, by using an application program to automatically perform such repeated searches, etc.

In some embodiments, the determination of whether a task is to be assigned to a task performer is based at least in part on information specified for the task by the task requester. For example, each task may allow a specified number (e.g., one) of simultaneous or sequential assignments of a task to task performers. Moreover, in some embodiments an assignment of a task is made in such a manner as to lock that assignment (e.g., for a specified period of time) so that it is not available to other task performers, while in other embodiments such locking may not be performed. Thus, for example, if a task requester desired results as soon as possible and was willing to pay only the first human task performer who provided satisfactory results, the task requester could specify that the task be made available to any number of human task performers and that it not be locked upon assignment, resulting in a race between task performers to be the first to supply successful results. Alternatively, the task requester may instead desire satisfactory results from only a single task performer but may provide for the task to be locked after it is assigned to a human task performer to allow them a specified amount of time (e.g., a minute or a day) to provide satisfactory results before the task will be made available to other task performers.

As another example, the task requester may desire responses from multiple task performers (e.g., to enable comparison of multiple responses as an automated accuracy check), and if so may allow a specified number of simultaneous assignments (e.g., corresponding to the number of desired responses). When responses from multiple human task performers are obtained, they can be used in various ways, such as to generate an average of the various results, to identify results that are agreed upon by all or by a majority or by a median number, etc. In addition, in such situations the multiple task performers can be paid in various ways, such as to provide the same payment to all task performers who provided results, to provide payment only to task performers whose results were determined to be accurate or otherwise used (e.g., based on them being in a majority of the results), to pay differing amounts to different task performers (e.g., based on determined accuracy of the results, or promptness of providing the results), etc.

After a task performer has completed performance of a task and submitted the results of task performance to the electronic marketplace, the results are handled in a manner specified by the task requester. For example, in some embodiments such task results for a task may be immediately forwarded to the task requester for the task, while in other embodiments the task results may be stored until the task requester retrieves them (e.g., after receiving notification from the electronic marketplace of their availability). In addition, in some embodiments the task requester may have specified one or more criteria related to evaluating whether the performance results are satisfactory, and if so the electronic marketplace system may automatically perform such result verification based on those criteria before providing the results to the task requester. In some embodiments, the task requester will further receive additional information related to performance of the task, such as information about the identity of the task performer, while in other embodiments such additional information may not be available to the task requester.

As previously noted, in some embodiments payment to the human task performers will also be triggered by one or more activities related to the performance results, such as the supplying of the task results by the task performer or the approval of the task results by the task requester and/or automated task verification activities. In addition, in some embodiments after task performance results are provided by task performers, the task requesters for those tasks may further be queried to provide human-generated ratings for the task performers (e.g., for use in qualification determinations for those task performers), such as related to adequacy and timeliness of the performance results, while in other embodiments the electronic marketplace could instead receive any such feedback information from the task requesters even when not explicitly solicited. Similarly, in some embodiments task performers may provide rating and other feedback information for task requesters that may be used for qualification determinations for those task requesters (whether in response to queries or otherwise), such as related to promptness and adequacy of payment, sufficiency of the description of the task, etc.

In embodiments in which quantitative measurements are made of task performers and/or task requesters, such as for use as qualifications for those users, the electronic marketplace system further performs a variety of types of tracking activities in order to gather information for those quantitative measurements. In particular, in some embodiments each activity of a task performer and/or task requester relative to a task is recorded and can be used as a quantitative measurement. In addition, at least some such tracking information can also be used for other purposes in at least some embodiments, such as to determine availability of and load on the electronic marketplace (e.g., to determine whether additional computing resources are needed or whether current computing resources are underutilized).

In addition to providing task information to task performers in response to requests, the electronic marketplace may in some embodiments provide functionality to automatically match task performers and new tasks as they become available, such as for a fee (e.g., a fixed amount, or a percentage of any payment provided to the task performer if they complete a task for which they are notified). For example, if a human task performer has previously supplied qualification information and/or preference information regarding tasks of interest (e.g., tasks in specified categories, having specified key words, from specified task requesters, from requesters having specified qualifications, etc.), such as during an initial registration process and/or later as part of one or more task information subscriptions for the task performer, the electronic marketplace can perform automated matching for new tasks that are submitted in order to determine whether the human task performer satisfies any specified criteria for the task and would desire to be notified of the task. If so, the electronic marketplace can notify the task performer in a variety of ways, such as based on previously provided preference information regarding how and when they are to be notified. In addition, in some embodiments the automated matching may further automatically assign new tasks to appropriate task performers (e.g., in accordance with preference information specified by the performers), including locking the task assignments if appropriate for the task. In other embodiments, task performers may receive similar functionality using third-party functionality, such as an automated program that obtains information about new tasks from the electronic marketplace (e.g., based on polling) and performs the automated matching functionality for those new tasks on behalf of one or more of the task performers.

Matching of tasks and task performers may be provided in a variety of ways. For example, in some embodiments matching will be performed in a bi-directional manner, such as when tasks have criteria for task performers and task performers have conditions for tasks (e.g., attributes of the task and/or of the task requester that submitted the task). In addition, a variety of other types of information may similarly be considered when performing matching. For example, in some embodiments a match may be time-sensitive (e.g., based on an urgency of a task) and/or price-sensitive (e.g., when the price for performing the task varies over time, such as to increase the price over time until a task is performed or to instead decrease the price over time). Similarly, in some embodiments a variety of other types of information may be considered, such as legal constraints (e.g., to enforce a minimum or maximum limit on the number of tasks assigned to a task performer, such as for contractual or tax reasons, or to restrict performance of tasks in some embodiments and situations to task performers in a certain geographical area due to tax or national security reasons). In addition, some types of tasks may be restricted to certain types of task performers, such as only new task performers (e.g., to assist new task performers who may lack extensive qualifications) and/or only experienced task performers.

In addition, in some embodiments and/or for some types of tasks (e.g., tasks for which a task requester has requested and/or purchased an enhanced, or "concierge," level of service), the system may facilitate task performance by attempting to locate a task performer to perform the task in various ways. For example, the system may in some embodiments assist task performers to enhance their qualifications, such as by recommending to them to acquire new qualifications (e.g., based on current and/or projected demand for qualifications, or based on comparisons to other similar task performers with whom they may be competing for tasks), and may further assist the task performers in acquiring the new qualifications in some embodiments (e.g., by offering a qualification test to acquire the qualification, providing information on how to acquire a qualification from a third-party qualification issuer (or "issuing entity"), etc.). When an exact match for a task performer is not available, the system may also provide additional functionality to assist a task requester, such as to identify task performers who are closest to being a match and providing a ranked list based on the closeness of those task performers. The system may similarly rank tasks for task performers (e.g., in response to a search), such as to identify the tasks that are the closest match and/or that possess other attributes of interest (e.g., having the highest reward) first. In addition, the system may in some embodiments attempt to identify external sources of qualification information and import additional qualification information, such as to identify a match that was not initially known due to a lack of complete qualification information.

In addition, while tasks may in some embodiments have associated categories and/or keywords that are supplied by task requesters, in other embodiments the electronic marketplace system automatically categorizes tasks and/or generates keywords for tasks based on analysis of information about the tasks, such as by analyzing similarities in attributes using data mining and other related analyses techniques. In a similar manner, in some embodiments the electronic marketplace may organize related task performers and/or related task requesters into groups based on similarities in qualifications and other attributes. Such organization and categorization of tasks, task performers and/or task requesters assists users of the electronic marketplace in identifying tasks and other parties of interest, such as other parties with whom to work or with whom to avoid working.

As previously noted, in some embodiments each task may be a simple stand-alone activity for which a task performer receives a task description (and optionally additional information to analyze) and provides results of task performance. In other embodiments, however, some or all of the tasks may instead have multiple stages and/or multiple related successive activities by the task performer, including having multiple interactions (e.g., with the task requester, the TFF system and/or one or more other executing applications) during and/or between the stages or successive activities. In such embodiments, payment can be provided to a task performer in various ways, such as based on completion of all stages/activities or instead based on completion of each of one or more intermediate stages/activities.

In addition, while in some embodiments each of the task performers may be unrelated to (and even unknown to) other task performers, in other embodiments multiple task performers may instead be affiliated or related to each other in various ways, such as by being part of a single organization, by working together (e.g., as a group) when performing some or all tasks (e.g., to coordinate performance of related tasks and/or to share task-related knowledge), etc. In at least some such embodiments, tasks may be submitted by one or more task requesters for performance by a group of multiple task performers (e.g., by a specified group, by a group that has at least a minimum number of members and/or that has at most a maximum number of members, by a group that has one or more specified qualifications for the group, etc.), and/or a group of multiple task performers may accept one or more tasks for performance by one or more members of the group even if the task requesters had not specified that those tasks were for performance by a group. In addition, when multiple users work together as a group, the group may in some embodiments by treated by the TFF system in a manner similar to a single user, such as to allow the group to be issued qualifications and/or to have various types of associated information, as well as to in some embodiments automatically determined aggregate qualifications for a group based on the individual qualifications of group members.

Similarly, while in some embodiments each of the task requesters may be unrelated to (and even unknown to) other task requesters, in other embodiments multiple task requesters may instead be affiliated or related to each other in various ways, such as by being part of a single organization, by working together (e.g., as a group) for some or all tasks to be performed (e.g., to coordinate performance requests for related tasks, such as by identifying them as being related and/or specifying criteria related to performance of a group of tasks), etc. In a related manner, in some embodiments groups of tasks may be identified as being related (e.g., based on indications received from the task requesters for the tasks), such as to coordinate performance of the tasks in the group in various ways (e.g., by collecting or aggregating performance results for all of the tasks, by assigning them to one or more task performers in a manner to facilitate the coordination of the performance, etc.). In addition, in some embodiments task requesters and/or task performers may be recruited for participation in the system in a variety of ways, including on the basis of existing group membership or other affinity information (e.g., to identify people likely to have time to work as task performers, such as based on their status as being potentially retired due to their membership in a seniors-oriented group).

In some embodiments, additional security mechanisms are further employed to restrict access to at least some information for at least some users. For example, some information about tasks may not be made available to at least some task performers, such as to hide information about the existence of tasks or about certain task details from task performers who are not qualified to perform the task, to whom the task is not assigned, or who otherwise meet criteria specified by a task requester. Furthermore, some information about a task may be made available to a potential task performer only when certain conditions are satisfied, such as completion of a non-disclosure agreement or satisfaction of other specified criteria. Similarly, at least some information about the task requesters and/or task performers may be hidden from at least some other task performers and/or task requesters, such as to shield identities of users (e.g., to provide partial or total anonymity between a task requester who submits a task and a task performer who performs the task, or to limit information about a task performer or task requester to potential competitors), or to limit access to information about quantitative measurements or other qualifications in order to minimize attempts by participants in the marketplace to artificially manipulate rankings and other qualification information. In particular, in some embodiments at least some qualifications of task performers may be private to the task performers and/or to task requesters who issued those qualifications to those task performers, such as to allow the task requesters to limit performance of their tasks to task performers in a manner that is not visible to other task performers who do not have those qualifications.

In some embodiments, the system further attempts to provide meta-information about other information in the system (e.g., results of task performance, appropriateness of a user's qualification, appropriateness of corroboration of a user's qualification, etc.), such as to provide a confidence value to a task requester regarding a likely appropriateness (e.g., accuracy, reliability, reproducibility, etc.) of results of task performance, to provide a confidence value to a user regarding a likely appropriateness (e.g., accuracy, reliability, reproducibility, etc.) of a qualification of a user (e.g., of a rating value for the user for the qualification), to provide a confidence value to a user regarding a likely appropriateness (e.g., accuracy, reliability, reproducibility, etc.) of corroboration of a qualification of a user, etc. Such confidence values may be generated or otherwise determined in various ways for task results, such as based on information obtained from other task performers than those who provided the results (e.g., by having multiple task performers perform a task and comparing the results, by having more-qualified task performers review the initially obtained task results, etc.), on comparison of the results to other results received for similar or related tasks, on automatically verifying whether the results satisfy criteria specified for the task, etc. Such confidence values may be generated or otherwise determined in various ways for users' qualifications and for corroboration of users' qualifications, including based on information provided by or otherwise associated with those users and/or based on information provided by or otherwise associated with other users.

In some embodiments, the system further assists task requesters to obtain useful results in various ways, such as by providing insurance to recoup payments made for results that are not received or that turn out to be unsatisfactory, by providing an escrow service in which payments are held until they can be verified as satisfactory, by providing for appropriate contractual terms (e.g., binding arbitration) or other mechanisms to resolve disputes, etc. Some or all of these functionalities may be provided for a fee in some embodiments, such as a fee charged to the task requesters and/or to the task performers involved in a transaction benefiting from the functionality provided. In addition, in some embodiments the system attempts to improve its performance over time by learning preferences of task requesters and/or task performers, such as by monitoring their activities and/or gathering feedback from them regarding prior activities.

The system and/or the described techniques can also be used in other manners in some embodiments. As previously noted, the system may export various information in some embodiments for use by other systems, such as user qualification information and other types of user information. In addition, use of qualification information may be used for purposes of dating or other social or business networking in some embodiments, such as by submitting tasks having qualification criteria intended to match users whose qualifications satisfy the qualification criteria—in this example, the task may be performed by identifying the one or more task performers who satisfy the task's associated qualifications or other criteria. In a similar manner, users matching specified criteria could similarly be found for other purposes in other embodiments, such as to identify appropriate users for a research study, polling, opinion taking, surveys, etc.

As previously noted, in some embodiments the TFF system assists in managing at least some types of interactions with users, such as to allow task requesters and/or task performers to specify how certain types of task-related interactions are to occur. In particular, in some embodiments task requesters are allowed to specify how interactions are to occur with task performers who are performing their tasks, and in particular to specify one or more task interaction control ("TIC") types for each of their submitted tasks. In at least some such embodiments, each TIC type is associated with a distinct combination of multiple types of processing to be performed when presenting task-related information to a task performer and/or when obtaining results of the task performance from the task performer. When the TFF system interacts with a task performer to manage the performance of a task having a specified TIC type, the TFF system implements the combination of processing types for the specified TIC type to control those interactions.

In some embodiments, at least four types of user interaction processing may be specified for each TIC type, including a specified manner of manipulating information associated with a task before it is provided to a task performer (e.g., to prepare the information to be presented to the task performer), a specified manner of providing the manipulated information to the task performer (e.g., to control the presentation of the manipulated task information to the task performer), a specified manner of receiving or otherwise obtaining results of task performance from the task performer (e.g., to control how the task results are specified by and sent by the task performer), and a specified manner of manipulating obtained task results before they are provided to the task requester (e.g., to prepare the information to be presented or otherwise provided to the task requester). In this manner, each of the types of user interaction processing may be specified independently of the others, such as to transmit task information to a task performer using a first data format and/or first transmission protocol and to receive task results from the task performer using a distinct second data format and/or distinct second transmission protocol, and/or to have task information specified in a first format and to have task results specified in a different format.

In addition, in at least some embodiments each specified manner of performing one of the types of user interaction processing may be implemented by a component containing executable information to implement that specified manner of processing. For example, each specified manner of manipulating task information before it is provided to a task performer may be implemented by an appropriate task information manipulation component, each specified manner of sending manipulated task information to a task performer may be implemented by an appropriate task information provider component, each specified manner of receiving task results from a task performer may be implemented by an appropriate task results receiver component, and each specified manner of manipulating received task results may be implemented by an appropriate task results manipulation component.

Some illustrative examples of the user interaction processing type of manipulating task information before it is provided to a task performer include the following: using XSLT ("eXtensible Style Language Transformation") to transform task data in XML format to HTML ("HyperText Markup Language") format (e.g., for display to the task performer as a Web page formatted in a specific manner) or to another format (e.g., a different XML format); wrapping task data that is in a format presentable on the task performer's computing device (e.g., in "Flash" format to be presented by a Macromedia player on the task performer's computing device, or included as part of a Java applet executable on the task performer's computing device) in another format (e.g., HTML) for transmission to the task performer; encrypting the task information before it is sent to the task performer (e.g., in a manner so that it can be decrypted by the computing device of the task performer); modifying the form of the task information (e.g., to convert XML-based data to a chart/graph/table for presentation); manipulating the content of the task information (e.g., to transform text in one language to another), whether in addition to or instead of manipulating the information format; and acting as a pass-through mechanism that does not modify the task information. The task information to be manipulated can also take a variety of forms, including text, numerical data, one or more images, video data, audio information, etc.

Some illustrative examples of the user interaction processing type of providing task information to the task performer include the following: sending a Web page or other document type to the task performer for display or other presentation by a Web browser or other appropriate application program on a computing device of the task performer (e.g., using HTTP, WAP (or "Wireless Application Protocol"), SSL (or "Secure Sockets Layer"), Secure HTTP, etc.); and sending executable code (e.g., a Java applet) to the computing device of the task performer in a manner to invoke an appropriate environment to execute the code (e.g., using JNLP (or "Java Network Launching Protocol") to execute a Java applet). In some embodiments, the user interaction processing type of providing task information to the task performer may include selecting a protocol to be used in sending the task information and/or may include causing a particular type of application on the task performer's computing device to receive and handle the task information (e.g., by causing that program to be invoked).

Some illustrative examples of the user interaction processing type of obtaining results of task performance from the task performer include the following: receiving the task results via a provided Web service-based interface that a program on the task performer's computing device invokes to send the task results; receiving the task results as CGI data (e.g., via HTTP GET and/or POST commands), such as from a form on a Web page displayed to the task performer; and receiving task results sent from an executing program on the task performer's computing device (e.g., a program invoked using a specified user interaction processing type of providing task information to the task performer), such as using a variety of communication techniques (e.g., CORBA, RPC, Java RMI (or "Remote Method Invocation"), by using ReST (or "REpresentational State Transfer") to send XML data over HTTP, etc.).

Some illustrative examples of the user interaction processing type of manipulating obtained task results before they are provided to the task requester may include processing similar to that of manipulating task information before it is provided to a task performer. In addition, the manipulating of obtained task results before they are provided to the task requester may include the following: using XSD ("XML Schema Definition") or DTD ("Document Type Definition") to convert task results data in CGI form to XML form; decrypting task results that were encrypted at the computing device of the task performer; modifying the form of or manipulating the content of the task results in various ways; and acting as a pass-through mechanism that does not modify the task results.

In some embodiments, multiple alternatives are provided by the TFF system for each of the types of user interaction processing, such as by implementing each alternative as a distinct component. Thus, for example, the alternatives for the manipulation of task information processing type may each be implemented by a corresponding task information manipulation component, and may include one or more distinct components that each have XSLT instructions for transforming data in XML format in a specified manner, a component including executable information to wrap task data in Flash format in an HTML wrapper, and a pass-through component that provides as output the same task information that it receives as input. Similar alternatives may be provided by the TFF system for each of the user interaction processing types.

In addition, in some embodiments the TFF system provides one or more predefined TIC types that are each associated with a distinct combination of components that includes at least one component of each of the user interaction processing types. In this manner, a task requester may specify a TIC type for a task being submitted by selecting one of the predefined TIC types. In addition, in some embodiments a task requester may specify multiple TIC types for a task (e.g., with the TIC types using differing types of processing for providing manipulated task information to a task performer), such as to allow task performers with computing devices having a greater variability of capabilities to perform the task. In addition, in some embodiments the TFF system may further facilitate the performance of a task by automatically selecting one of multiple specified TIC types for a task for use by a task performer, such as based on known or identifiable capabilities of the computing device of the task performer.

In addition to selecting predefined TIC types, the TFF system in some embodiments further allows users to define their own TIC types, such as for their own use and/or the user of other users. In some embodiments the TIC type definition may include the user selecting a predefined component for each of the user interaction processing types, while in other embodiments a user may further be allowed to supply his/her own components for each of one or more of the user interaction processing types (e.g., components designed to handle data that is formatted in a manner specific to a task type created by the user). In addition, in some embodiments the user-supplied components may perform the user interaction processing in different manners than those of predefined alternatives (e.g., a user-supplied component that combines the processing of two or more of the user interaction processing types, such as to both send task information to a task performer and receive task results information from the task performer) and/or may perform various additional types of processing. Moreover, while in some embodiments the selected components for a TIC type interoperate in a predefined serial manner (with the task information manipulation component receiving the raw task data and sending the manipulated task information to the task information providing component, and with the task results obtaining component receiving the raw task results and sending them to the task results manipulation component), in other embodiments a user may be allowed to specify additional logic or relationships to define how the components interoperate. In addition, in some embodiments the selection of a component may depend on the components used before and/or after the component being selected, and thus the types of components made available to a user defining a new TIC type may vary based on selections already made and/or information specific to the task.

For illustrative purposes, some embodiments are described below in which specific types of user interactions are managed in specific ways, including by using various specific types of task information processing information in specific ways. However, those skilled in the art will appreciate that the techniques of the invention can be used in a wide variety of other situations, including with other types of task information processing and to manage other types of user interactions, and that the invention is not limited to the exemplary details provided.

FIGS. 12A-12J illustrate an example of using multiple user interaction processing types to manage interactions related to performance of a task. In particular, FIG. 12A illustrates an example task that is submitted to the TFF and associated with a TIC type (not shown), with the task information specified in XML format in this example. In addition, the task in this example includes a question of type "multi-choice" (as shown on line 2), which is a multiple-choice question in which a task performer will select one of 5 specified images that best satisfies indicated conditions, in a manner similar to that previously discussed with respect to FIG. 2A. In this example, the task conditions are related to selecting an image best matching a specified subject (as indicated by the text in line 4 of the task that will be presented to the task performer), and the task includes indications of 5 images of type "image/jpeg" on lines 6-35.

FIG. 12B shows an example of an XSD file that includes information that can be used by the TFF system or other entity to validate that tasks having questions of type "multi-choice" are properly structured and include the appropriate data. For example, lines 30-35 of the file show the allowed types and data elements used in the "Question" section of the task illustrated in FIG. 12A, and in particular show that the "Question" data element has child elements of "Title", "Text" and "Choices" which have allowed types of "string", "string" and "ChoicesType", respectively. Other portions of the file provide other related information, such as lines 23-29 that further define the "ChoicesType" data type.

FIGS. 12C-12G next illustrate an example of task information manipulation processing type information for use in preparing the task information illustrated in FIG. 12A for presentation to a task performer, such as based on that task information manipulation processing type being specified for the TIC type associated with the task. In this example embodiment, the task information manipulation processing type information is implemented as an XSLT component that can be used to convert an XML input file to an output HTML file. The information in the XSLT component may be used by an XSLT processor program to find particular statement patterns in the XML input file that are then transformed in a specified manner in a new output file created by the XSLT processor. For example, line 4 of FIG. 12C shows that in this example the output file format will be HTML. Line 7 shows that the input XML file statement to be matched is "/Question", and lines 8-23 show corresponding HTML tags to be included in the output file. The following lines illustrated in FIG. 12C and those in FIGS. 12D-12G then illustrate how the task information from the task is manipulated to form an appropriate output HTML file to be presented to a task performer as a Web page.

After the HTML output file is sent to a computing device of the task performer (e.g., by a manipulated task information provider processing component, not shown, that sends the data using the HTTP protocol, such as based on the manipulated task information provider processing type being specified for the TIC type associated with the task), FIG. 12H illustrates the display of the HTML output file to the task presenter as a Web page, such as on a Web browser on the computing device of the task performer. In this example, the displayed Web page shows a question 1225 posed to the task performer, with multiple user-selectable image choices 1205*a-e* displayed as possible answers to the question. In particular, in this example each of the choices 1205 includes a displayed image and a user-selectable radio button control 1215 that the task performer can select. After the selection is made, which in this example is of Image 4, the task performer clicks on the "Submit" button 1220 at the bottom of the screen to cause the results of the task performance to be sent back to the TFF system.

After the task results information is received at the TFF system (e.g., by a processing component, not shown, that obtains task results by receiving CGI data from the task performer, such as based on the task results obtainer processing type being specified for the TIC type associated with the task), FIG. 12I illustrates an example of task results manipulation processing type information for use in preparing the task results to be provided to the task requester that submitted the task, such as based on that task results manipulation processing type being specified for the TIC type associated with the task. In particular, in this example the processing information is implemented as another XSLT file component that can be used to convert the task results from the task performer to XML format so that they can be programmatically provided to the task requester. For example, line 4 shows that the output of the XSLT file will be "xml" data, line 5 specifies that "/CGIData" is to be matched in the results information, and lines 6-11 specify that the value of the "@value" parameter for the selected image is to be written to the output XML file as the desired data. FIG. 12J then illustrates the output XML file that results from the operation of the task results manipulation processing, with line 3 showing that the answer selected by the task performer was labeled "Image4".

Figure 13:
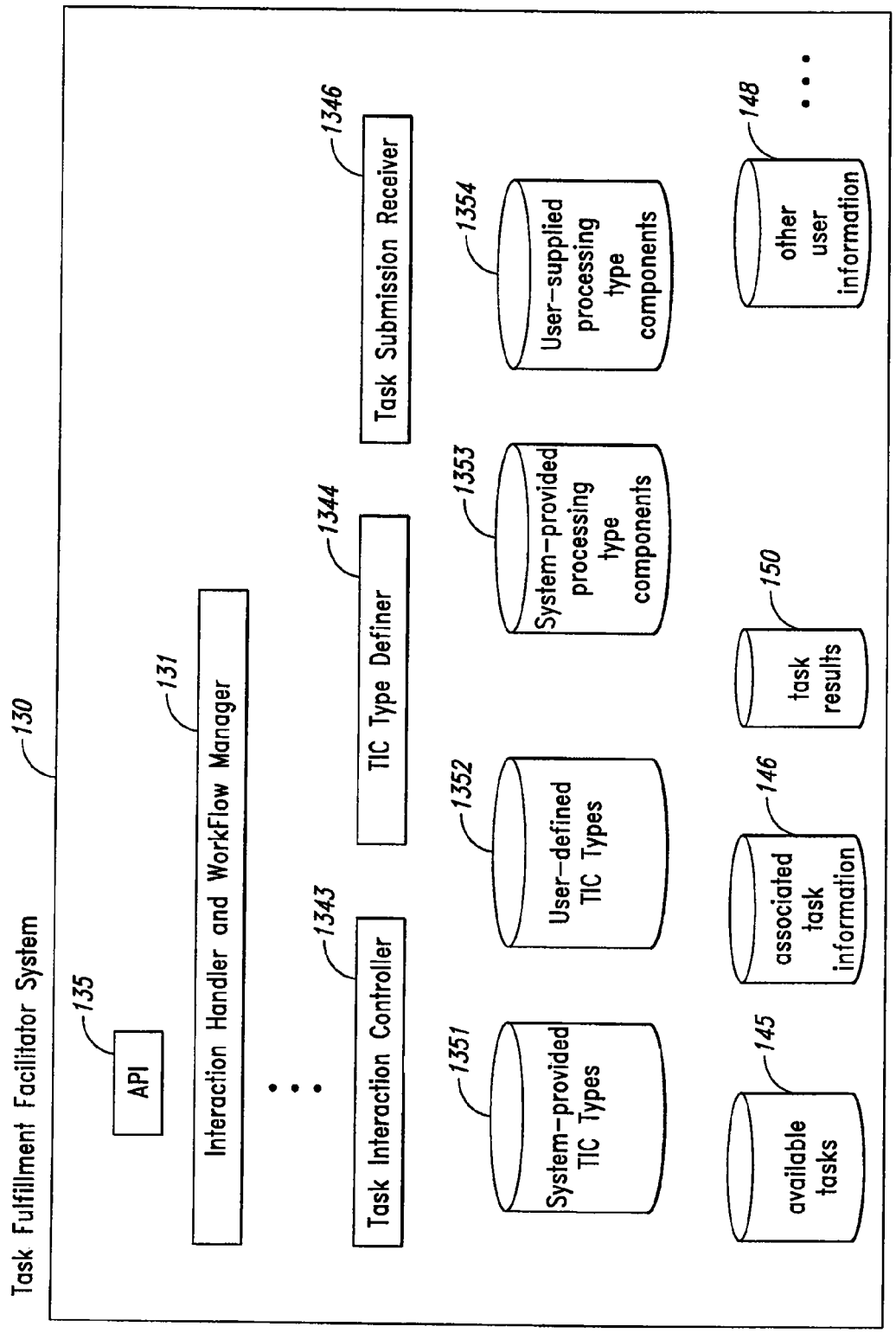
FIG. 13 is a block diagram illustrating an example system for providing an embodiment of the described electronic marketplace.

FIG. 13 illustrates an example embodiment of the TFF system 130 similar to that previously discussed with respect to FIG. 1B, but with additional modules to provide the described functionality related to the use of TIC types. In particular, FIG. 1B included a User Interaction Manager module 134 to assist in managing at least some types of interactions with users, and FIG. 13 includes three additional modules 1343, 1344 and 1346 in the illustrated embodiment to provide functionality related to the use of TIC types (e.g., as sub-modules of or a specific implementation of the User Interaction Manager module). In particular, the TFF system 130 in the embodiment illustrated in FIG. 13 includes a Task Interaction Controller module 1343, a TIC Type Definer module 1344, and a Task Submission Receiver module 1346. Various of the other modules and information discussed with respect to FIG. 1B are not included in FIG. 13 for the sake of brevity, but may be included and interact with the illustrated modules as appropriate in other embodiments.

In the illustrated embodiment, the Task Submission Receiver module receives submissions of tasks from task requesters and associates one or more TIC types with each of the submitted tasks, such as based on a specification of the TIC type for a task by the task requester submitting the task. In situations in which the task requester submits one or more tasks in an interactive manner, the Task Submission Receiver module may assist the identification of an appropriate TIC type by providing options for the TIC type to the task requester, such as based on the type of task(s) and/or information associated with the task requester. The TIC type options may include predefined TIC types and/or TIC types previously defined by the task requester, and in some embodiments the Task Submission Receiver may further allow a task requester to define a new TIC type for use with a task being submitted, such as based on interactions with the TIC Type Definer module. In other embodiments, the association of one or more TIC types with a task may instead be performed at times other than task submission, such as after the submission. After tasks are submitted and associated with one or more TIC types, information about the associated TIC types is included with the other information about the task in the database 145. During performance of the task, at least one of the associated TIC types will be used to control the task performance, and the associated TIC types may further be used in some embodiments to assist in initially selecting appropriate task performers for the task (e.g., based on those task performers having capabilities to receive task information and provide task results in a manner consistent with the processing types specified for the associated TIC types).

The Task Interaction Controller module in the illustrated embodiment controls the performance of tasks based on the TIC types associated with the tasks. In particular, when a task is to be performed by a task performer, the Task Interaction Controller module selects one of the TIC types associated with the task, and uses the types of information processing specified for the TIC type to control the task performance. In the illustrated embodiment, definitions of predefined system-provided TIC types (if any) are included in the database 1351, and definitions of user-defined TIC types (if any) are included in the database 1352. Each of the TIC type definitions specify multiple processing types to be used with the TIC type, and in some embodiments may specify logic or parameters to control how the multiple processing types interoperate. In some embodiments, each of the processing types is associated with an associated component or other grouping of processing information, with predefined system-provided components (if any) stored in the illustrated embodiment in database 1353 and user-defined components (if any) stored in the illustrated embodiment in database 1354. Thus, to control performance of a task based on an associated TIC type, the Task Interaction Controller module retrieves the TIC type definition from databases 1351 or 1352, retrieves the components specified in the TIC type definition from databases 1353 and/or 1354, and executes those components in an appropriate manner to control the task performance. An appropriate TIC type associated with a task can be selected by the Task Interaction Controller module can be selected for use in various ways, such as based on the selected TIC type being the only TIC type associated with the task, on the selected TIC type being specified by the task performer, on the selected TIC type being preferred or needed for use with the computing device of the task performer based on the device's capabilities, etc.

The TIC Type Definer module in the illustrated embodiment allows users (e.g., task requesters) to define new TIC types for use in controlling tasks to be submitted, and may further in some embodiments allow users to supply or otherwise define new components for use with a TIC type being defined (e.g., to process information specified in a format and/or task type specific to a task requester, or to provide additional capabilities, such as to encrypt and decrypt information sent to and received from a task performer in a specified manner). In other embodiments, users may not be allowed to define their own TIC types, and thus the TIC Type Definer module may not be present in those embodiments. The TIC type definition may be performed in various ways, such as by successively displaying or otherwise providing to a user each of the available alternatives for each of a series of types of information processing, such as based on predefined system-provided components. In embodiments and situations in which dependencies exist between different components or processing types, the module may further limit the provided alternatives based on the prior selections. After a new TIC type is defined, the module stores the definition in the database 1352, and further stores any user-supplied components in the database 1354.

In other embodiments, some of the types of illustrated functionality and/or information may not be provided, and other types of information and/or functionality may be available. In addition, the illustrated functionality may be combined in more or fewer modules, and the illustrated types of information may be stored in other manners.

Figure 9:
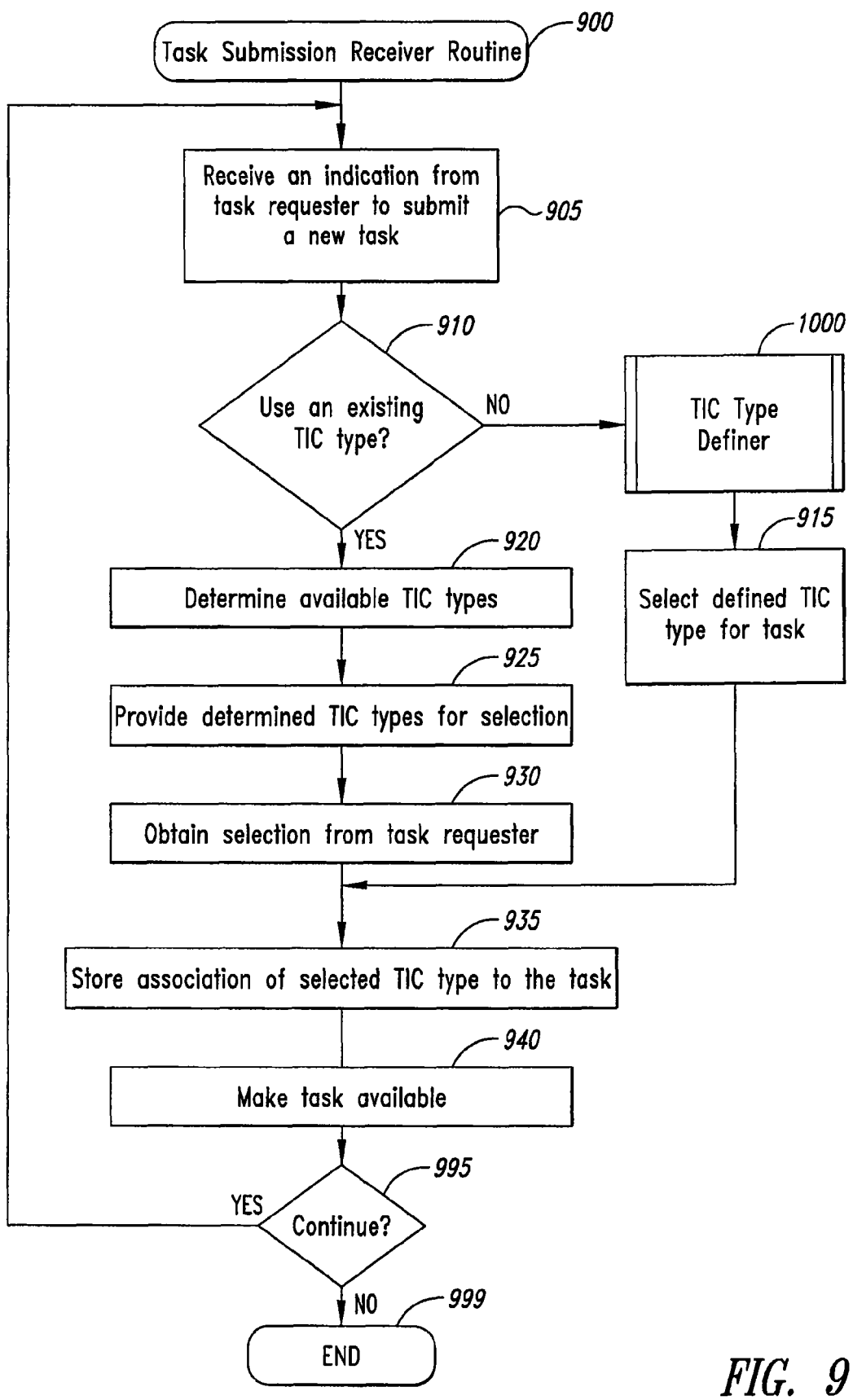
FIG. 9 is a flow diagram of an embodiment of a Task Submission Receiver routine.

FIG. 9 is a flow diagram of an embodiment of a Task Submission Receiver routine 900. The routine may, for example, be provided by execution of an embodiment of the Task Submission Receiver module 1346 of FIG. 13, such as to receive task submissions and associate one or more TIC types with the tasks. In the illustrated embodiment, the routine interacts with a user in an interactive manner to associate a TIC type with a task, although in other embodiments a user may submit an indication of a task and of one or more TIC types in a non-interactive manner.

The routine begins at step 905, where an indication is received from a task requester to submit one or more new tasks. The routine determines in step 910 whether to use one or more existing TIC types (e.g., predefined system-provided TIC types), such as based on an indication received from the task requester, and if so continues to step 920 to determine available TIC types. Available TIC types may be determined in various ways, such as based on all defined TIC types, TIC types determined to be appropriate for the task and/or the user submitting the task, etc. The routine then continues to step 925 to provide the determined TIC types to the task requester, and in step 930 obtains a selection from the task requester of one or more of the TIC types. If it was instead determined in step 910 not to use an existing TIC type, the routine continues instead to execute the TIC Type Definer routine in step 1000 to define one or more new TIC types, and in step 915 selects the newly defined TIC type(s) for use with the task being submitted.

After steps 930 or 915, the routine continues to step 935 to associate the selected TIC type(s) with the task(s) being submitted, and continues to step 940 to make the tasks available for performance (e.g., by storing information about the tasks in an available tasks database). The routine then continues to step 995 to determine whether to continue. If so, the routine returns to step 905, and if not the routine continues to step 999 and ends.

Figure 10A:
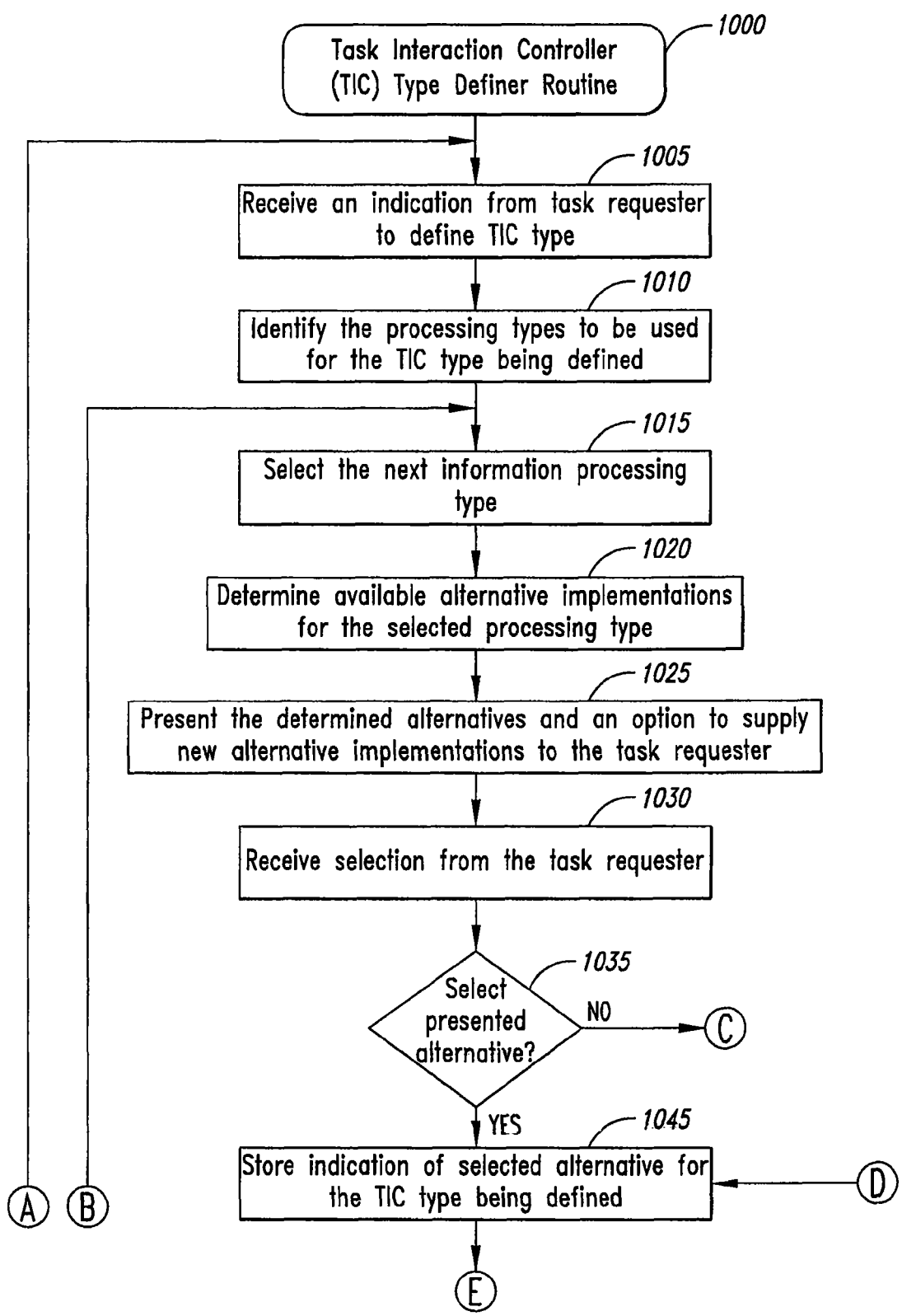
FIGS. 10A and 10B are a flow diagram of an embodiment of a Task Interaction Controller Type Definer routine.
Figure 10B:
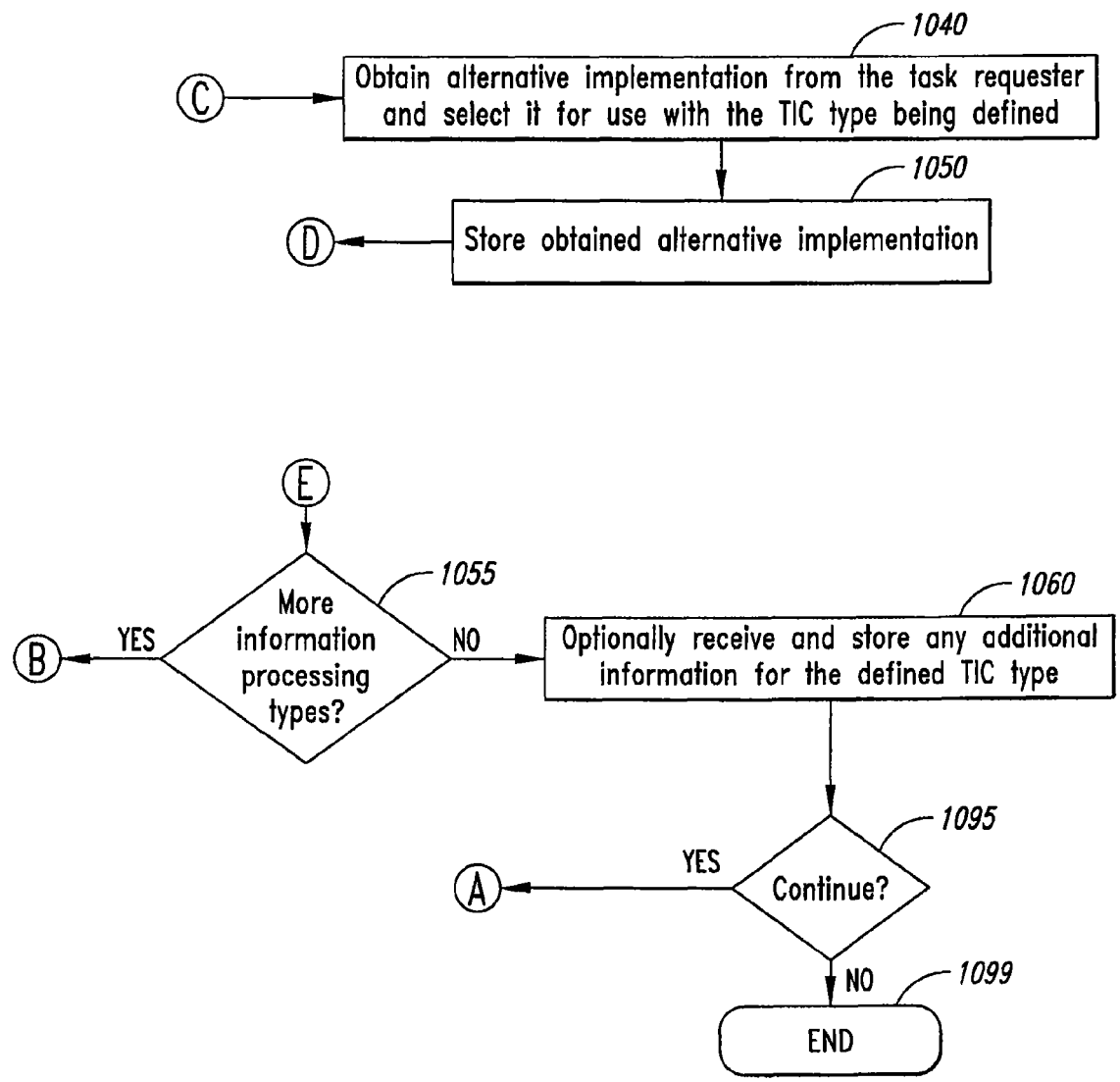

FIG. 10 is a flow diagram of an embodiment of a Task Interaction Controller Type Definer routine 1000. The routine may, for example, be provided by execution of an embodiment of the TIC Type Definer module 1344 of FIG. 13, such as to define new TIC types by users. In the illustrated embodiment, the routine interacts with a user in an interactive manner to define a new TIC type, although in other embodiments a user may instead submit a definition of one or more new TIC types in a non-interactive manner.

The routine begins at step 1005, where an indication is received from a user (e.g., a task requester) to define a new TIC type. The routine continues to step 1010 to identify the processing types to be used for the TIC type being defined, such as based on a default set of processing types used for all TIC types or instead in another manner. The routine then continues to step 1015 to select the next information processing type to be specified for the new TIC type being defined, beginning with the first. In step 1020 the routine then determines available alternatives for the selected information processing type, such as all alternatives or instead in a manner based on other information from the new TIC type (e.g., other alternatives already selected, the user defining the new TIC type, etc.). The routine then continues to step 1025 to present the available alternatives to the task requester along with an option to instead supply a new alternative implementation, although in other embodiments such user-supplied alternatives may not be used or may be specified by the task requester at other times or in other manners.

The routine then continues to step 1030 to receive a selection from the task requester, and in step 1035 determines whether the task requester selected one of the previously available alternatives. If not, the routine continues to step 1040 to obtain an alternative implementation from the task requester (e.g., by receiving a component with executable information to implement the alternative) and selects it for use with the new TIC type being defined, and in step 1050 stores the obtained alternative for later user. After step 1050, or if it was instead determined in step 1035 that the task requester selected an existing alternative, the routine continues to step 1045 to store an indication of the selected alternative as being specified for the new TIC type. The routine then determines in step 1055 whether there are more information processing types to specify for the new TIC type, and if so returns to step 1015 to select the new information processing type to specify. If not, the routine stores a definition of the new TIC type for later use, and then continues to step 1060 to optionally specify any received additional information for the new TIC type (e.g., information about the conditions under which the TIC type may be used and who may use it). While not illustrated here, the routine may in some embodiments also return an indication to the task requester for the new defined TIC type, such as a unique identifier for later use in referencing the new TIC type. The routine then determines in step 1095 whether to continue. If so, the routine returns to step 1005, and if not continues to step 1099 and ends.

Figure 11:
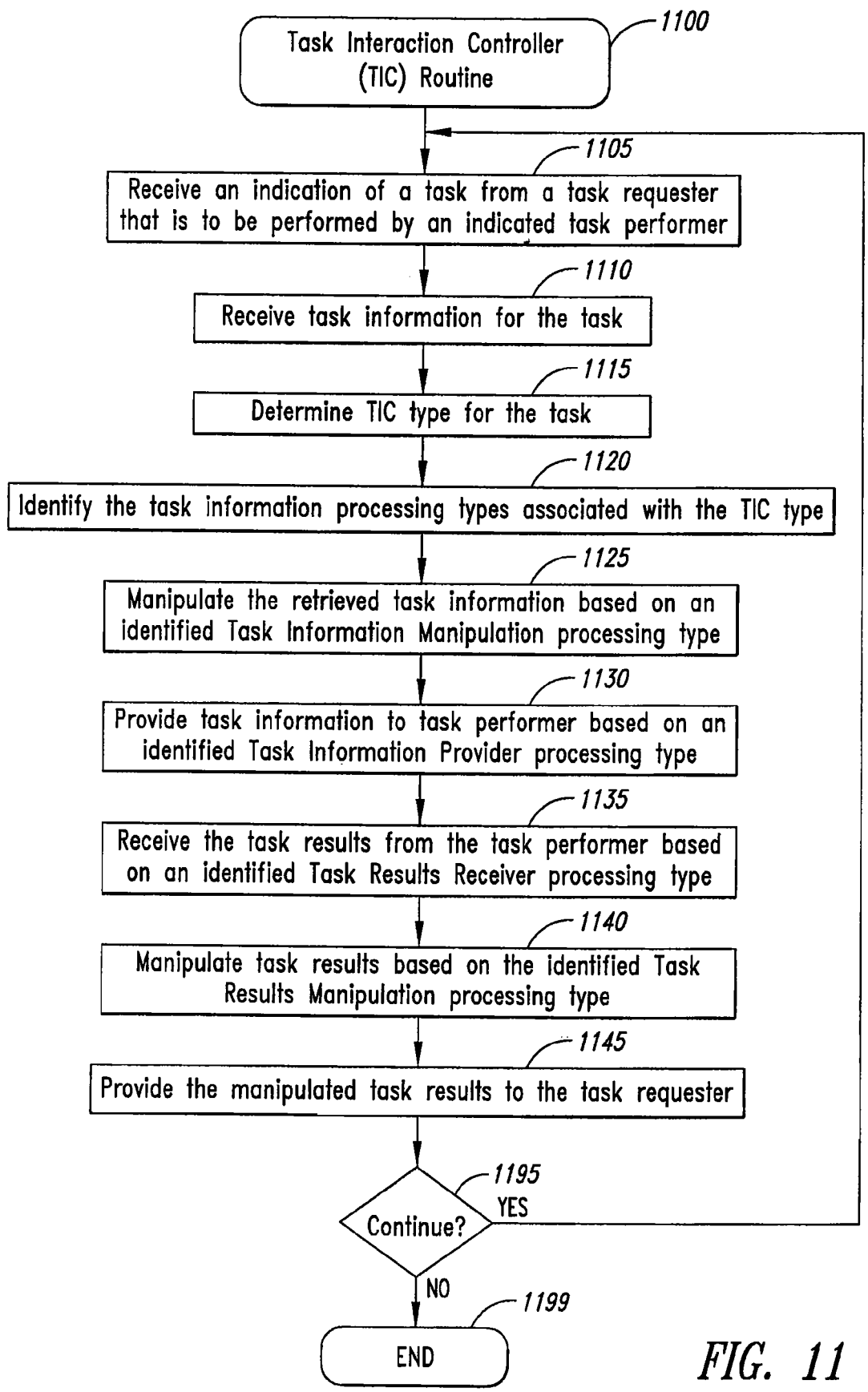
FIG. 11 is a flow diagram of an embodiment of a Task Interaction Controller routine.

FIG. 11 is a flow diagram of an embodiment of a Task Interaction Controller routine 1100. The routine may, for example, be provided by execution of an embodiment of the Task Interaction Controller module 1343 of FIG. 13, such as to control performance to tasks based on TIC types associated with the tasks.

The routine begins at step 1105, where an indication is received of a task to be performed by a task performer, such as based on a request by the task performer. The routine continues to step 1110 to retrieve task information for the task, and in step 1115 determines a TIC type for use in controlling performance of the task, such as based on an association of the TIC type with the task and/or a selection of the TIC type by the task performer. The routine then continues to step 1120 to determine multiple task information processing types specified for the determined TIC type—in the illustrated embodiment, each TIC type specifies a component or other group of processing information for each of four task information processing types, although in other embodiments other numbers or types of processing types may instead be used.

In steps 1125-1140, the routine then performs each of the types of processing specified for the determined TIC type. In step 1125, the routine manipulates the retrieved task information in a specified manner based on a specified task information manipulation processing type for the TIC type, and in step 1130 the routine provides the manipulated task information to the task performer in a specified manner based on a specified task information providing processing type for the TIC type. After the task performer performs the task, the routine receives the results of the task performance in a specified manner in step 1135 based on a specified task results receiver processing type for the TIC type, and in step 1140 manipulates the received task results in a specified manner based on a task results manipulation processing type for the TIC type. While the illustrated embodiment indicates a synchronous flow in which the routine waits for and obtains task results after sending the task information, in other embodiments the routine could be structured in other manners, such as to continue with other processing while waiting for task results (if any) to be sent. In addition, in some situations task performers may not provide task results for a task after they accept an assignment to perform the task, which may be indicated to the routine in an explicit message from the task performer to withdraw from task performance or instead by not receiving task results within a specified period of time, and if so the routine would continue to handle other task-related requests and information.

After step 1140, the routine continues to step 1145 to provide the manipulated task results to the task requester in a specified manner, although in other embodiments the task results may instead be stored until the task requester proactively retrieves them. After step 1145, the routine continues to step 1195 to determine whether to continue. If so, the routine returns to step 1105, and if not continues to step 1199 and ends.

While the use of TIC types and associated use of various types of information processing have been described in conjunction with the TFF system, those skilled in the art will appreciate that these techniques may similarly be used in variety of other situations, including in other types of systems in which questions are provided and answers are gathered, or more generally in which information is provided and received. In addition, in some embodiments and situations only some of the illustrated types of information processing may be used, such as to use processing for providing information or for receiving information but not for both. Accordingly, TIC types can be used in a variety of other embodiments.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for providing a task fulfillment system that acts as an intermediary to facilitate performance by task performer users of tasks submitted by task requesters, the method comprising:

receiving indications of multiple available tasks submitted by task requesters for performance by task performer users, each task having attributes that include multiple of a category of the task, a type of the task, a keyword associated with the task, a qualification associated with the task, a task requester who submitted that task, a time period for performance of the task, and a price associated with the task; and for each of multiple task performer users, receiving one or more instructions from the task performer user to create a subscription for the task performer user to use in providing information to the task performer user about tasks of interest, the one or more instructions indicating multiple task attributes of interest to the task performer user to use with the created subscription, the indicated multiple task attributes being based at least in part on an indication to use one or more task attributes of a collection of tasks as at least some of the indicated multiple task attributes for the subscription, the collection of tasks being identified by the task performer user while browsing one of multiple browsing locations made available via a user interface provided by the task fulfillment system, the one browsing location corresponding to one or more categories of tasks; and after creating the subscription for the task performer user, repeatedly using the created subscription at multiple distinct times to provide information to the task performer user about available tasks of interest, by automatically identifying one or more available tasks for the task performer user based on each of the identified tasks having attributes that match the multiple task attributes of the created subscription, the automatic identifying of the one or more available tasks being performed by one or more computer processors configured to provide the task fulfillment system; and notifying the task performer user that one or more of the identified tasks match the created subscription and are available for performance, the notifying being automatically performed by the one or more configured computer processors.

2. The method of claim 1 wherein, for each of at least one of the task performer users, the received instructions from the task performer user to create the subscription indicates a type of notification to use in the providing of the information to the task performer user about the tasks of interest, and wherein the notifying of the task performer user is performed using the indicated type of notification.

3. The method of claim 2 wherein, for one of the at least one task performer users, the indicated notification type includes an indication of a type of electronic message and of an electronic address to which electronic messages of the indicated type are to be sent, the indicated electronic message type being at least one of email, instant message, Short Message Service ("SMS") message, text message, Really Simple Syndication ("RSS") communication feed message, and automated phone message, and wherein the notifying of the one task performer user includes automatically sending one or more electronic messages of the indicated type to the indicated electronic address such that the electronic messages indicate information about the one or more tasks identified for the one task performer user.

4. The method of claim 2 wherein, for one of the at least one task performer users, the indicated notification type includes an indication to display information in an indicated manner via the user interface provided by the task fulfillment system, the user interface being provided by a Web site of the task fulfillment system, and wherein the notifying of the one task performer user includes displaying information via the Web site to the one task performer user about the one or more tasks identified for the one task performer user.

5. The method of claim 2 wherein, for one of the at least one task performer users, the received instructions from the one task performer user to create the subscription indicates an agreement by the one task performer user to perform at least some tasks of interest about which the one task performer user is notified by using the subscription, and wherein the notifying of the one task performer user includes indicating to the task performer user that at least one identified task is automatically assigned to the task performer user to be performed before an indicated deadline.

6. The method of claim 1 wherein, for each of at least one of the task performer users, the received instructions from the task performer user further indicate one or more attributes of the task performer user that include at least one of one or more qualifications held by the task performer user, a geographic location of the task performer user, one or more properties of a computing device utilized by the task performer user, an age of the task performer user, and a period of time during which the task performer user is available to perform tasks, such that the automatic identifying of available tasks for the task performer user is further based on each of the identified tasks having attributes that match the indicated one or more attributes of the task performer user.

7. The method of claim 1 wherein, for each of the multiple available tasks, the attributes of the task include each of a category of the task, a type of the task, a keyword associated with the task, a qualification associated with the task, a task requester who submitted the task, a time period for performance of the task, a price associated with the task, a time of day for performance of the task, a total time for performance of the task, and a quality of performance of the task, and wherein the multiple task attributes indicated for at least one of the subscriptions include each of a category of the task, a type of the task, a keyword associated with the task, a qualification associated with the task, a task requester who submitted the task, a time period for performance of the task, a price associated with the task, a time of day for performance of the task, a total time for performance of the task, and a quality of performance of the task.

8. The method of claim 1 further comprising, for each of at least one of the task performer users, after the creating of the subscription for the task performer user, receiving instructions from the task performer user to temporarily suspend use of the created subscription such that the task performer user is not notified of identified tasks that match the created subscription while the use of the created subscription is temporarily suspended.

9. The method of claim 1 further comprising, for each of at least one of the task performer users, receiving results of performance by the task performer user of at least one of the tasks about which the task performer user was notified using the created subscription for the task performer user, providing payment to the task performer user for performing the at least one tasks, and providing the received results to one or more task requesters who submitted the tasks.

10. The method of claim 1 wherein, for each of one or more of the multiple task performer users, the using of the created subscription to provide information to the task performer user about available tasks of interest is performed in exchange for payment from the task performer user and/or from at least one of the task requesters that submitted the identified available tasks.

11. A computer-implemented method for facilitating performance by task performers of tasks from task requesters, the method comprising:
    receiving indications of multiple tasks submitted by task requesters to a task fulfillment system as being available for performance by task performers, the task fulfillment system acting as an intermediary to facilitate performance by the task performers of the tasks submitted by the task requesters, the task fulfillment system having a user interface for use by the task performers in identifying tasks, at least some of the multiple submitted tasks each having one or more attributes;
    for each of one or more of the task performers, creating a subscription for the task performer that is based on one or more instructions received from the task performer and that specifies one or more attributes of tasks that are of interest to the task performer, the received one or more instructions indicating to use one or more task attributes of a collection of tasks as at least some of the specified attributes of tasks for the subscription, the collection of tasks being identified based on interactions of the task performer with the user interface that correspond to one or more categories of tasks; and
    for each of at least one of the one or more task performers, providing information to the task performer about one or more tasks of interest by, receiving an indication of the created subscription for the task performer;
    using the created subscription to automatically select one or more of the multiple submitted tasks for the task performer based at least in part on matching attributes for the selected tasks to the specified attributes of the subscription, the automatic selecting of the one or more tasks using the created subscription being performed by one or more configured computer processors; and
    notifying the task performer of at least one of the selected tasks, the notifying being performed by the one or more configured computer processors, and wherein the providing of the information to the task performer about one or more tasks of interest is performed repeatedly at multiple distinct times by using the created subscription to select tasks available at those times.

12. The method of claim 11 further comprising, for each of one or more of the at least one task performers, receiving results of performance by the task performer of one or more of the at least one selected tasks about which the task performer is notified, and providing the received results to one or more task requesters that submitted those one or more selected tasks.

13. The method of claim 11 wherein, for each of the one or more task performers, at least one of the one or more attributes of tasks specified by the subscription for the task performer are supplied for the subscription by the task performer.

14. The method of claim 11 wherein, for each of the one or more task performers, at least one of the one or more attributes of tasks specified by the subscription for the task performer are automatically determined based at least in part on one or more prior activities of the task performer.

15. The method of claim 11 wherein, for each of the one or more task performers, the one or more instructions received from the task performer include an indication to use one or more task attributes included in search criteria specified by the task performer as at least some of the specified attributes of tasks for the subscription.

16. The method of claim 11 wherein, for each of the one or more task performers, the collection of tasks whose one or more task attributes are used for the subscription for the task performer is identified by the task performer while browsing one of multiple browsing locations made available via the user interface provided by the task fulfillment system.

17. The method of claim 11 wherein, for each of the one or more task performers, the one or more instructions received from the task performer include an indication of at least one task such that at least some attributes of the at least one task are for use as at least some of the specified attributes of tasks for the subscription.

18. The method of claim 17 wherein, for one of the one or more task performers, the one or more instructions received from the task performer include indications of multiple distinct tasks, such that attributes that are common to the multiple distinct tasks are used as at least some of the specified attributes of tasks for the subscription.

19. The method of claim 11 wherein, for each of one or more of the at least one task performers, the subscription created by the task performer further includes an indication of a notification mechanism specified by the task performer, and the notifying of the task performer is performed using the specified notification mechanism.

20. The method of claim 19 wherein, for each of the one or more task performers, the specified notification mechanism includes using one or more indicated electronic message types that include at least one of email messages, instant messages, text messages, Short Message Service ("SMS") messages, Really Simple Syndication ("RSS") feed communications, and automated telephone messages, and wherein the notifying of the task performer includes automatically sending one or more electronic messages of the indicated electronic message types that include information about the at least one selected tasks.

21. The method of claim 11 wherein, for one of the at least one task performers, the notifying of the task performer of the at least one selected tasks includes providing the one task performer with a user-selectable option to select to perform one or more of the at least one selected tasks.

22. The method of claim 11 wherein, for one of the at least one task performers, the notifying of the one task performer of the at least one selected tasks includes sending one or more electronic messages and is performed in accordance with one or more conditions specified in the subscription for the one task performer, the one or more conditions indicating at least one of a frequency of sending the electronic messages, one or more time periods during which to send the electronic messages, a number of tasks whose information is to be indicated in each of the electronic messages, and an amount of information to include about each task in the electronic messages.

23. The method of claim 11 wherein, for each of one or more of the at least one task performers, the notifying of the task performer of the at least one selected tasks is performed in response to a request received from the task performer for information about tasks.

24. The method of claim 11 wherein, for each of one or more of the at least one task performers, the notifying of the task performer of the at least one selected tasks is performed automatically after the selecting of the tasks and without a request from the task performer for information about tasks.

25. The method of claim 11 wherein, for each of one or more of the at least one task performers, the matching of the attributes for the selected tasks to the specified attributes of the subscription for the task performer includes identifying at least one attribute of each of the selected tasks that is similar to and/or identical to at least one of the specified attributes of the subscription.

26. The method of claim 11 wherein, for each of one or more of the at least one task performers, the tasks selected using the created subscription for the task performer include multiple tasks, the selecting of those multiple tasks includes automatically determining a degree of match for each of those multiple tasks to the subscription, and the notifying of the task performer of the at least one selected tasks includes presenting those multiple selected tasks in a manner that reflects the determined degrees of match.

27. The method of claim 11 wherein, for each of one or more of the at least one task performers, the one or more attributes of tasks specified by the subscription for the task performer include multiple of a keyword associated with a task, a price of a task, a qualification associated with a task, a task requester that submitted a task for performance, a category for a task, a type of a task, a time of day at which a task is made available for performance, and a time period for performance of a task.

28. The method of claim 11 further comprising, for each of one or more of the at least one task performers, obtaining payment from the task performer for at least one of creating the subscription for the task performer and of notifying the task performer of tasks selected using the created subscription.

29. The method of claim 11 further comprising, for each of one or more of the at least one task performers, receiving indications of one or more additional distinct subscriptions for the task performer, and wherein the using of the created subscription to automatically select one or more tasks for the task performer is further performed for each of the one or more additional subscriptions.

30. The method of claim 11 wherein, for each of one or more of the at least one task performers, the subscription for the task performer further specifies that at least some tasks selected by using the subscription are to be automatically assigned to the task performer for performance, and the notifying of the task performer of the at least one selected tasks includes notifying the task performer that one or more of the at least one selected tasks are automatically assigned to the task performer for performance.

31. The method of claim 11 further comprising, for each of one or more of the at least one task performers, the notifying of the task performer of the at least one selected tasks includes reserving one or more of the at least one selected tasks for the task performer for a limited time such that other task performers are not allowed to select the reserved tasks for performance.

32. The method of claim 11 further comprising, for each of one or more of the at least one task performers, receiving an indication from the task performer to temporarily suspend use of the subscription for the task performer, such that the notifying of the task performer is not performed while the temporary suspension of the use of the subscription persists.

33. The method of claim 11 further comprising, for each of one or more of the at least one task performers, providing information about the created subscription of the task performer to other task performers.

34. The method of claim 33 wherein the providing of the information about the created subscriptions of the one or more task performers to other task performers is performed in such a manner as to allow each of the other task performers to subscribe to use one or more of those created subscriptions.

35. The method of claim 33 wherein the providing of the information about the created subscriptions of the one or more task performers to other task performers includes rating each of the created subscriptions using one or more measures of usefulness, and presenting information about the created subscriptions in a manner that reflects the ratings of the created subscriptions.

36. The method of claim 33 wherein the providing of the information about the created subscriptions of the one or more task performers to other task performers is performed in exchange for compensation provided to the one or more task performers.

37. A non-transitory computer-readable medium whose stored contents configure a computing device to facilitate performance by task performers of tasks from task requesters, by performing a method comprising:
receiving indications of multiple tasks submitted by task requesters as being available for performance by multiple task performers, at least some of the tasks each having one or more attributes;
for each of at least one of the multiple task performers, creating a subscription for the task performer based on one or more instructions received from the task performer, the created subscription specifying one or more attributes of tasks that are of interest to the task performer, the creating of the subscription being performed by a task fulfillment system that acts as an intermediary to facilitate performance by the multiple task performer users of the multiple tasks submitted by the task requesters, the one or more instructions being received based on one or more interactions of the task performer with a user interface of the task fulfillment system and indicating a collection of tasks that correspond to one or more categories and that have one or more task attributes to be used as at least some of the specified attributes of tasks for the subscription; and
for each of the at least one task performers, providing information to the task performer about one or more tasks of interest by,
receiving an indication of the created subscription for the task performer;
using the created subscription to automatically select one or more of the multiple tasks for the task performer based at least in part on matching attributes for the selected tasks to the specified attributes of the subscription, the automatic selecting of the one or more tasks using the created subscription being performed by the configured computing device; and
notifying the task performer of at least one of the selected tasks,
wherein the providing of the information to the task performer is performed repeatedly at multiple distinct times by using the created subscription to select tasks available at those times.

38. The non-transitory computer-readable medium of claim 37 wherein the method further comprises, for each of one or more of the at least one task performers, receiving results of performance by the task performer of one or more of the at least one selected tasks about which the task performer is notified, and providing the received results to one or more task requesters that submitted those one or more selected tasks.

39. The non-transitory computer-readable medium of claim 37 wherein, for each of the one or more task performers, at least one of the one or more attributes of tasks specified by the subscription for the task performer are automatically determined based at least in part on one or more prior activities of the task performer.

40. The non-transitory computer-readable medium of claim 37 wherein, for each of one or more of the at least one task performers, the subscription created by the task performer further includes an indication of a notification mechanism specified by the task performer, and the notifying of the task performer is performed using the specified notification mechanism.

41. The non-transitory computer-readable medium of claim 37 wherein, for one of the at least one task performers, the notifying of the task performer of the at least one selected tasks includes providing the one task performer with a user-selectable option to select to perform one or more of the at least one selected tasks.

42. The non-transitory computer-readable medium of claim 37 wherein, for each of one or more of the at least one task performers, the one or more attributes of tasks specified by the subscription for the task performer include one or more of a keyword associated with a task, a price of a task, a qualification associated with a task, a task requester that submitted a task for performance, a category for a task, a type of a task, a time of day at which a task is made available for performance, and a time period for performance of a task.

43. The non-transitory computer-readable medium of claim 37 wherein, for each of one or more of the at least one task performers, the subscription for the task performer further specifies that at least some tasks selected by using the subscription are to be automatically assigned to the task performer for performance, and the notifying of the task performer of the at least one selected tasks includes notifying the task performer that one or more of the at least one selected tasks are automatically assigned to the task performer for performance.

44. The non-transitory computer-readable medium of claim 37 wherein the computer-readable medium is a memory of the configured computing device, and wherein the contents are instructions that when executed program the computing device to perform the method.

45. A computing device configured to facilitate performance by task performers of tasks from task requesters, comprising:
one or more processors; and
one or more modules configured to, when executed by the one or more processors,
receive indications of multiple tasks submitted by task requesters as being available for performance by multiple task performers, at least some of the tasks each having one or more attributes;
for each of at least one of the multiple task performers, create a subscription for the task performer based on one or more instructions received from the task performer, the created subscription specifying one or more attributes of tasks that are of interest to the task performer, the creating of the subscription being performed by a task fulfillment system that acts as an intermediary to facilitate performance by the multiple task performer users of the multiple tasks submitted by the task requesters, the one or more instructions being received based on one or more interactions of the task performer with a user interface of the task fulfillment system and indicating one or more task attributes of a collection of tasks corresponding to one or more categories, the indicated one or more tasks attributes being used as at least some of the specified attributes of tasks for the subscription; and
for each of the at least one task performers, provide information to the task performer about one or more tasks of interest by,
receiving an indication of the created subscription for the task performer;
using the created subscription to automatically select one or more of the multiple tasks for the task performer based at least in part on matching attributes for the selected tasks to the specified attributes of the subscription, the automatic selecting of the one or more tasks using the created subscription being performed by the configured computing device; and
notifying the task performer of at least one of the selected tasks,
and wherein the providing of the information to the task performer is performed repeatedly at multiple distinct times by using the created subscription to select tasks available at those times.

46. The computing device of claim 45 wherein the one or more modules are further configured to, for each of one or more of the at least one task performers, receive results of performance by the task performer of one or more of the at least one selected tasks about which the task performer is notified, and provide the received results to one or more task requesters that submitted those one or more selected tasks.

47. The computing device of claim 45 wherein, for each of the one or more task performers, at least one of the one or more attributes of tasks specified by the subscription for the task performer are automatically determined based at least in part on one or more prior activities of the task performer.

48. The computing device of claim 45 wherein, for each of one or more of the at least one task performers, the subscription created by the task performer further includes an indication of a notification mechanism specified by the task performer, and the notifying of the task performer is performed using the specified notification mechanism.

49. The computing device of claim 45 wherein, for one of the at least one task performers, the notifying of the task performer of the at least one selected tasks includes providing the one task performer with a user-selectable option to select to perform one or more of the at least one selected tasks.

50. The computing device of claim 45 wherein, for each of one or more of the at least one task performers, the one or more attributes of tasks specified by the subscription for the task performer include one or more of a keyword associated with a task, a price of a task, a qualification associated with a task, a task requester that submitted a task for performance, a category for a task, a type of a task, a time of day at which a task is made available for performance, and a time period for performance of a task.

51. The computing device of claim 45 wherein, for each of one or more of the at least one task performers, the subscription for the task performer further specifies that at least some tasks selected by using the subscription are to be automatically assigned to the task performer for performance, and the notifying of the task performer of the at least one selected tasks includes notifying the task performer that one or more of the at least one selected tasks are automatically assigned to the task performer for performance.

52. The computing device of claim 45 wherein the one or more modules each includes software instructions for execution by at least one of the one or more processors.

53. The computing device of claim 45 wherein the one or more modules consists of a means for receiving indications of multiple tasks submitted by task requesters as being available for performance by task performers, at least some of the tasks each having one or more attributes, and for providing information to each of at least one of the multiple task performers about one or more tasks of interest by receiving an indication of a subscription for the task performer that is created by the task performer and that specifies one or more attributes of tasks that are of interest to the task performer, by using the created subscription to automatically select one or more of the multiple tasks for the task performer based at least in part on matching attributes for the selected tasks to the specified attributes of the subscription, the automatic selecting of the one or more tasks using the created subscription being performed by the configured computing device, and by notifying the task performer of at least one of the selected tasks.

54. A computer-implemented method for facilitating performance by task performers of tasks from task requesters, the method comprising:

receiving indications of multiple tasks submitted by task requesters as being available for performance by task performers, at least some of the tasks each having one or more attributes; and for each of at least one of the multiple task performers, providing information to the task performer about one or more tasks of interest by, creating a subscription for the task performer based on one or more instructions received from the task performer, the created subscription specifying one or more attributes of tasks that are of interest to the task performer and further specifying that at least some tasks selected by using the subscription are to be automatically assigned to the task performer for performance;

receiving an indication of the created subscription for the task performer;

using the created subscription to automatically select one or more of the multiple tasks for the task performer based at least in part on matching attributes for the selected tasks to the specified attributes of the subscription, the automatic selecting of the one or more tasks using the created subscription being performed by the configured computing device; and notifying the task performer of at least one of the selected tasks and that one or more of the at least one selected tasks are automatically assigned to the task performer for performance, and wherein the providing of the information to the task performer is performed repeatedly at multiple distinct times by using the created subscription to select tasks available at those times.

55. The method of claim 54 further comprising, for each of one or more of the at least one task performers, receiving results of performance by the task performer of one or more of the at least one selected tasks about which the task performer is notified, and providing the received results to one or more task requesters that submitted those one or more selected tasks.

56. The method of claim 54 wherein, for each of the one or more task performers, at least one of the one or more attributes of tasks specified by the subscription for the task performer are automatically determined based at least in part on one or more prior activities of the task performer.

57. The method of claim 54 wherein, for each of one or more of the at least one task performers, the subscription created by the task performer further includes an indication of a notification mechanism specified by the task performer, and the notifying of the task performer is performed using the specified notification mechanism.

58. The method of claim 54 wherein, for one of the at least one task performers, the one or more tasks selected using the created subscription of the one task performer include a plurality of tasks, and the notifying of the one task performer of at least one of the selected tasks includes providing the one task performer with a user-selectable option to select to perform one or more other of the selected tasks that are distinct from the one or more selected tasks automatically assigned to the task performer for performance.

59. The method of claim 54 wherein, for each of one or more of the at least one task performers, the one or more attributes of tasks specified by the subscription for the task performer include one or more of a keyword associated with a task, a price of a task, a qualification associated with a task, a task requester that submitted a task for performance, a category for a task, a type of a task, a time of day at which a task is made available for performance, and a time period for performance of a task.

\* \* \* \* \*

UNITED STATES PATENT AND TRADEMARK OFFICE
CERTIFICATE OF CORRECTION

| | | |
|---|---|---|
| PATENT NO. | : 7,881,957 B1 | |
| APPLICATION NO. | : 11/537508 | |
| DATED | : February 1, 2011 | |
| INVENTOR(S) | : Peter D. Cohen et al. | |

It is certified that error appears in the above-identified patent and that said Letters Patent is hereby corrected as shown below:

Title Page, Page 2, lines 45-47; Item 56
"Hagel, J. et al., "Go Slowly with Web Services," Feb. 15, 2002, CIO.com retrieved from http://www.cio.com/archive/021502/key-note.html, 4 pages." should read, --Hagel, J. et al., "Go Slowly with Web Services," Feb. 15, 2002, CIO.com retrieved from http://www.cio.com/archive/021502/keynote.html, 4 pages.--.

Title Page, Page 2, lines 48 and 49; Item 56
Item (56) References Cited, Other Publications, the reference, "Hagel, J. et al., "Your Next IT Strategy," *Harvard Business Review RI109G:*105-113, Oct. 2001, 11 pages." should read, --Hagel, J. et al., "Your Next IT Strategy," *Harvard Business Review RO109G:*105-113, Oct. 2001, 11 pages.--.

Signed and Sealed this
Fifth Day of July, 2011

David J. Kappos
*Director of the United States Patent and Trademark Office*